US012121176B2

(12) United States Patent
Bertash et al.

(10) Patent No.: US 12,121,176 B2
(45) **Date of Patent: *Oct. 22, 2024**

(54) SYSTEM, APPARATUS AND METHOD FOR PREPARING A BEVERAGE CARTRIDGE

(71) Applicant: CUPPER LLC, Bradenton, FL (US)

(72) Inventors: Michael Bertash, Bradenton, FL (US); Morgan Bertash, Bradenton, FL (US)

(73) Assignee: CUPPER LLC, Bradenton, FL (US)

( * ) Notice: Subject to any disclaimer, the term of this patent is extended or adjusted under 35 U.S.C. 154(b) by 155 days.

This patent is subject to a terminal disclaimer.

(21) Appl. No.: 17/871,957

(22) Filed: Jul. 24, 2022

(65) Prior Publication Data

US 2022/0361705 A1 Nov. 17, 2022

Related U.S. Application Data

(63) Continuation-in-part of application No. 17/251,629, filed as application No. PCT/US2019/039853 on Jun.

(Continued)

(51) Int. Cl.

*A47J 31/40* (2006.01)
*B65B 29/02* (2006.01)
*B65D 85/804* (2006.01)

(52) U.S. Cl.

CPC ........... *A47J 31/407* (2013.01); *B65B 29/022* (2017.08); *B65D 85/8046* (2013.01)

(58) Field of Classification Search

CPC ..... B65B 29/022; B65B 29/025; B65B 29/02; B65B 1/36; B65B 7/2842; B65D 85/8046; A47J 31/407

(Continued)

(56) References Cited

U.S. PATENT DOCUMENTS

| | | | | |
|---|---|---|---|---|
| 414,529 A * | 11/1889 | Hall et al. | .............. | B28D 1/045 125/12 |
| 2,243,895 A * | 6/1941 | Brown | ................ | A47J 31/3638 99/289 R |

(Continued)

FOREIGN PATENT DOCUMENTS

| | | |
|---|---|---|
| CN | 103086013 A | 5/2013 |
| CN | 103519691 A | 1/2014 |

(Continued)

OTHER PUBLICATIONS

PCT/US2019/039853, International Search Report and Written Opinion dated Oct. 23, 2019, 8 pages—English.

(Continued)

*Primary Examiner* — Dariush Seif
(74) *Attorney, Agent, or Firm* — Andrew F. Young; NOLTE LACKENBACH SIEGEL

(57) ABSTRACT

A system for beverage cartridge preparation allows users to self-select, self-fill, and self-seal single use beverage cartridges for convenience. A frame assembly supports a cartridge handling system and a cartridge filling system. The cartridge filling system includes a fillable container and a portion dispensing system. The cartridge handling system includes a movement guide system moving the beverage cartridges, a sealing system for sealing the beverage cartridges after filling, and a motion system for actuating the cartridge handling system, the portion dispensing system, and the sealing system. The movement system includes mobility relative to operative members of the filling and handling systems and one or more single use beverage cartridges. Adaptive cartridge shapes and components are provided to fit a particular preparation system.

4 Claims, 51 Drawing Sheets

Related U.S. Application Data

28, 2019, which is a continuation-in-part of application No. 15/778,610, filed as application No. PCT/US2016/063702 on Nov. 23, 2016, now Pat. No. 10,925,430, application No. 17/871,957 is a continuation-in-part of application No. 17/141,839, filed on Jan. 5, 2021, which is a continuation of application No. 15/778,610, filed as application No. PCT/US2016/063702 on Nov. 23, 2016, now Pat. No. 10,925,430.

(60) Provisional application No. 62/692,781, filed on Jun. 30, 2018, provisional application No. 62/258,561, filed on Nov. 23, 2015.

(58) Field of Classification Search
USPC .......................................................... 53/268
See application file for complete search history.

(56) References Cited

U.S. PATENT DOCUMENTS 2,860,817 A * 11/1958 Bell .................... B65G 59/102 221/104
2,972,216 A * 2/1961 Schmidt .................... B65B 7/28 221/188
3,092,944 A * 6/1963 Wise .................... A23G 9/288 53/276
3,179,041 A * 4/1965 Luthi .................... B65B 39/145 53/529
3,279,927 A * 10/1966 Reid .................... B65B 25/06 53/514
3,293,823 A * 12/1966 Anderson ............ B65B 7/2842 53/307
3,357,155 A * 12/1967 Carruthers ............... B65B 1/24 53/526
3,501,890 A * 3/1970 Hunt .................... B65B 1/24 53/529
3,561,352 A * 2/1971 Hirsch .................. B30B 9/3082 53/529
3,579,350 A * 5/1971 Rudd et al. ............ B65B 9/042 53/529
3,924,384 A * 12/1975 Kinney ................. B65B 7/2807 53/485
3,932,978 A * 1/1976 Kinney .................. G07F 13/10 221/222
3,965,656 A * 6/1976 Gerben .................. B65B 7/164 53/329.4
3,994,117 A * 11/1976 Kinney .................... B65B 7/28 141/172
4,168,599 A * 9/1979 King .................... B65B 7/2807 53/529
4,188,863 A * 2/1980 Grossi ................ A47J 31/3619 99/289 R
4,194,341 A * 3/1980 Kihnke .................... B65B 7/16 53/329.3
4,285,187 A * 8/1981 Schjeldahl ............. B65B 43/59 198/748
4,397,133 A * 8/1983 Hume .................. B65B 7/2807 53/313
4,465,111 A * 8/1984 Nalbach .................... B65B 1/22 198/690.1
4,558,802 A * 12/1985 Molison .................. G07F 11/54 221/104
4,666,723 A * 5/1987 Invernizzi ........... A23G 3/2007 426/232
4,703,765 A * 11/1987 Paules .................... B65B 61/08 83/350
4,751,948 A * 6/1988 Hertig .................... G01F 11/24 141/93
4,989,753 A * 2/1991 Brogna .................. G07F 13/10 221/121
5,001,889 A * 3/1991 Mueller .................. B65B 39/10 53/502
5,041,297 A * 8/1991 Dowaliby ................. B65B 1/36 53/529
5,119,973 A * 6/1992 Miller ................ B01F 35/7179 222/144.5
5,277,102 A * 1/1994 Martinez ................ G07F 13/02 99/287
5,401,156 A * 3/1995 Anderson ............. A23B 4/064 425/149
5,570,562 A * 11/1996 Anderson .............. B65B 1/363 53/514
5,649,412 A * 7/1997 Binacchi ................ B65B 9/023 426/77
5,787,687 A * 8/1998 Mueller .................. B65B 43/58 53/473
5,791,127 A * 8/1998 Rossi .................... B65B 29/025 53/202
6,053,359 A * 4/2000 Goulet ................... B65G 47/22 221/221
6,219,996 B1 * 4/2001 Searle .................. B65B 7/2807 141/311 A
6,418,701 B1 * 7/2002 Navarro .................. B65B 39/12 53/367
6,688,460 B2 * 2/2004 Kim ....................... G07F 13/10 141/174
6,711,877 B2 * 3/2004 Zschoche ............ B65G 47/846 198/465.2
D606,363 S * 12/2009 Aardenburg ................... D7/400
D653,905 S * 2/2012 Bodum .......................... D7/412
D679,132 S * 4/2013 Winberry ....................... D7/376
8,485,232 B1 * 7/2013 Oropeza ................ B65B 39/00 141/73
8,584,901 B2 * 11/2013 Dooley ................. A47J 31/401 222/242
8,602,068 B2 * 12/2013 Williams ................ B65B 37/20 131/108
8,635,173 B2 * 1/2014 Khosravy ............. G06Q 10/10 706/12
8,683,920 B1 * 4/2014 Oropeza .................. B65B 1/06 141/73
9,032,698 B2 * 5/2015 Minnette ............... B29C 66/344 53/471
D732,390 S * 6/2015 Trombetta ..................... D9/500
9,169,112 B2 * 10/2015 Chase .................. B67D 1/0027
9,376,304 B2 * 6/2016 Trulaske ............. B67D 1/1272
9,414,710 B2 8/2016 De Graaff et al.
9,688,465 B2 6/2017 Trombetta et al.
9,814,346 B2 * 11/2017 De'Longhi ......... A47J 31/3619
9,845,170 B2 * 12/2017 Evans ....................... B65B 5/08
2002/0010528 A1 * 1/2002 Bartholomew ....... B01F 33/846 700/239
2003/0012850 A1 * 1/2003 Turmel ............. B65D 85/8043 426/77
2004/0129145 A1 * 7/2004 Denisart ............ A47J 31/3628 99/275
2005/0217213 A1 * 10/2005 Lozinski ................. A47J 31/44 53/559
2005/0257695 A1 * 11/2005 Dobranski ............. A01D 90/10 99/485
2006/0201113 A1 * 9/2006 Conti .................... B65B 29/025 53/529
2006/0207619 A1 * 9/2006 Conti .................... B65B 63/022 131/322
2007/0062154 A1 * 3/2007 Conti ...................... B65B 9/213 53/553
2007/0130882 A1 * 6/2007 Conti ...................... B65B 47/04 53/529
2008/0047972 A1 * 2/2008 Bartholomew ....... B01F 33/844 222/144.5
2008/0299262 A1 * 12/2008 Reati ...................... B65B 61/20 83/84
2008/0314003 A1 * 12/2008 Goglio .................... B65B 11/50 53/574
2010/0138053 A1 * 6/2010 Kollep .................. A47J 31/467 700/282

(56) References Cited

U.S. PATENT DOCUMENTS

2010/0256797 A1* 10/2010 Conti .................... B65B 29/022 700/122
2010/0320225 A1* 12/2010 Kirschner ............... G01F 11/18 222/1
2011/0016834 A1* 1/2011 Rapparini ............. B65B 29/022 53/510
2011/0117248 A1* 5/2011 Rivera .................. B65B 29/022 426/77
2012/0091238 A1* 4/2012 Os ........................... G01F 11/24 241/101.5
2012/0190521 A1* 7/2012 Rivera .................... B65B 47/06 493/58
2013/0101717 A1* 4/2013 de Graaff .................. B65B 1/12 141/108
2013/0239817 A1* 9/2013 Starr ..................... A47J 31/407 99/280
2014/0141128 A1* 5/2014 Trombetta ................ B65B 1/32 426/77
2014/0202120 A1* 7/2014 Scrivani .................... B65B 1/12 53/558
2014/0272048 A1* 9/2014 Hristov ............... A47J 31/3628 426/433
2014/0290493 A1* 10/2014 Rivera .................. A47J 31/407 99/295
2014/0298999 A1* 10/2014 Lloret Such ........ A47J 31/3628 99/295
2014/0348994 A1* 11/2014 Deuber ................. A47J 31/407 99/295
2014/0352254 A1* 12/2014 Rea ......................... B65B 29/02 53/167
2015/0020481 A1* 1/2015 Hodler .................. B23P 21/004 53/435
2015/0050404 A1* 2/2015 Ferrier ................ A47J 31/3633 99/295
2015/0158609 A1* 6/2015 Villain .................. B65B 31/028 426/112
2015/0264955 A1* 9/2015 Rivera .................. A47J 31/057 426/433
2016/0009427 A1* 1/2016 Rea ......................... B65B 35/18 53/282
2016/0144987 A1* 5/2016 Scrivani .................... B65B 7/01 53/487
2016/0214747 A1* 7/2016 Carisi ................ B65D 85/8061
2016/0236842 A1* 8/2016 Scrivani ................ B65B 31/043
2016/0288936 A1* 10/2016 Manaresi ................ B65B 61/20
2016/0347483 A1* 12/2016 Rea ........................... B65B 1/04
2016/0347484 A1* 12/2016 Rea ........................... B65B 1/36
2017/0037979 A1* 2/2017 Baraccani ............. F16K 11/074
2017/0043943 A1* 2/2017 Lamb ................. B65D 85/8043
2017/0096243 A1* 4/2017 Manaresi ............ B29C 66/8322
2017/0096324 A1* 4/2017 Dresser ................ B67D 1/1236
2017/0121044 A1* 5/2017 Castellari .................. B65B 7/01
2017/0144785 A1* 5/2017 Bartoli .................... B65B 29/02
2017/0217607 A1* 8/2017 Slurink ..................... B65B 3/30
2017/0275085 A1* 9/2017 Rapparini ............... B65B 29/02
2017/0283101 A1* 10/2017 Gorbatenko ............ B65B 51/10
2017/0325622 A1* 11/2017 Rossetto ................... A23F 5/26
2017/0327254 A1* 11/2017 Cerati ................... B65B 29/022
2019/0038067 A1* 2/2019 Dos Santos ........... A47J 31/407
2019/0135466 A1* 5/2019 Gorbatenko .......... B65B 29/022

FOREIGN PATENT DOCUMENTS

JP 2000-229698 A 8/2000
WO WO2011/039709 A2 4/2011
WO WO 2015/056240 A1 4/2015
WO WO2019/237131 A1 12/2019

OTHER PUBLICATIONS

PCT/US2016/063702, International Search Report and Written Opinion dated Feb. 24, 2017, 14 pages—English.
U.S. Appl. No. 17/251,629, filed Dec. 11, 2020.
PCT/US19/39853 filed Jun. 28, 2019.
U.S. Appl. No. 62/692,781, filed Jun. 30, 2018.
U.S. Appl. No. 15/778,610, filed May 23, 2018.
PCT/US16/063702 filed Nov. 23, 2016U.
U.S. Appl. No. 62/258,561, filed Nov. 23, 2015.
U.S. Appl. No. 17/141,839, filed Jan. 5, 2021.

* cited by examiner

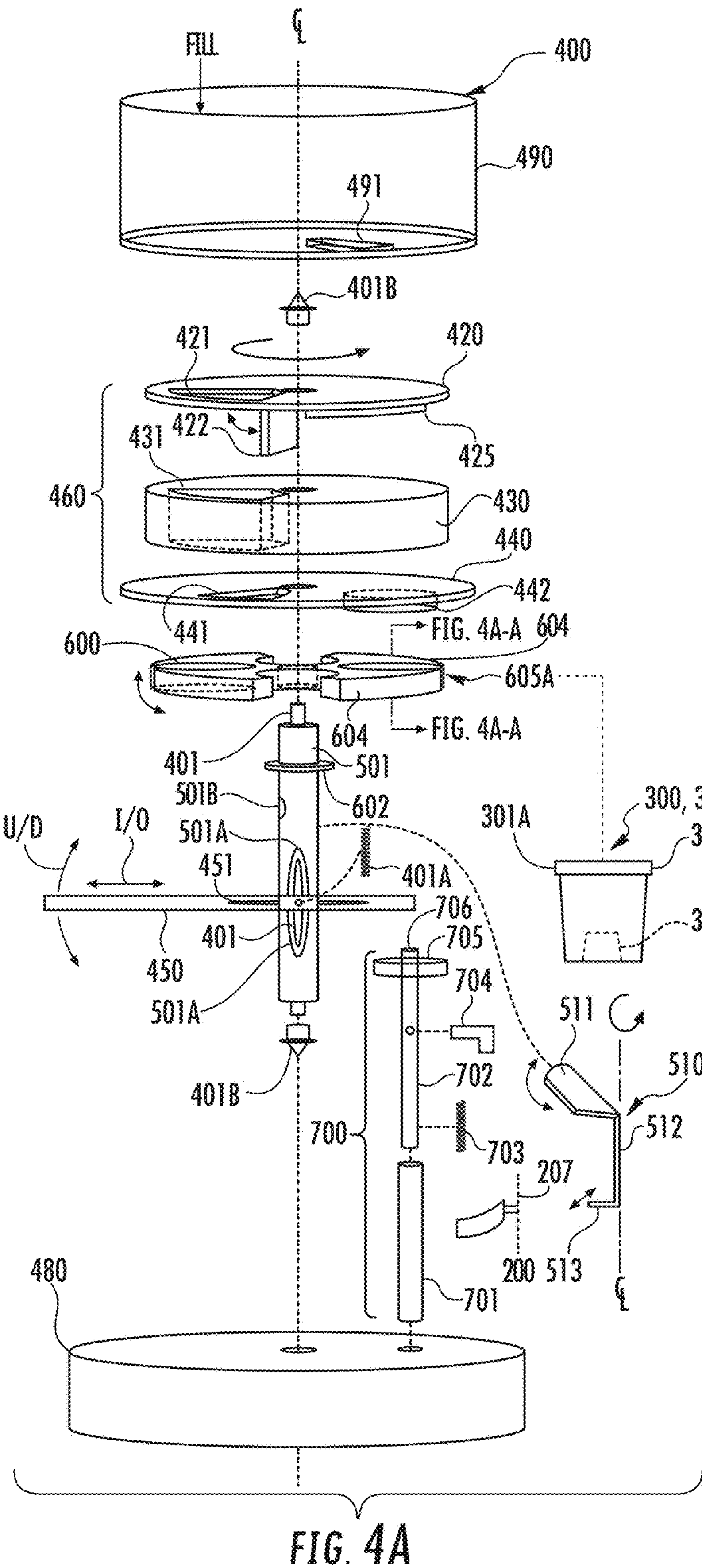
FIG. 4A
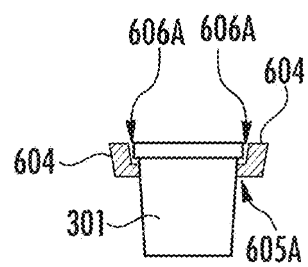
FIG. 4A-A 2590
2592A
2591
2552
2551
POSITION 1

2501
2552
2551A
2551A
2550
2590
2592
2751
2592A
2501B
2501B
2551
2501C 2590
2552
2551
2592A
DROP
POSITION 2

2590
2592A
2551A
2551
2552
2551A
CLOSE
POSITION 3
POSITION 4

2590
2591
2592A
2551
CLOSED

SYSTEM, APPARATUS AND METHOD FOR PREPARING A BEVERAGE CARTRIDGE

CROSS REFERENCE TO RELATED APPLICATIONS

This application relates to and claims priority as a continuation-in-part (CIP) from U.S. Ser. No. 17/251,629 filed Dec. 11, 2020, the entire contents of which are incorporated herein by reference.

Application U.S. Ser. No. 17/251,629 filed Dec. 11, 2020 relates to and claims priority from PCT/US2019/039853 filed Jun. 28, 2019, the entire contents of which are incorporated herein fully by reference which further claims priority from U.S. Ser. No. 62/692,781 filed Jun. 30, 2018, the entire contents of which are incorporated herein by reference. PCT/US2019/039859 filed Jun. 28, 2019 is a continuation-in-part (CIP) of U.S. Ser. No. 17/778,610 filed May 23, 2018 (Now U.S. Pat. No. 10,925,30) which in turn claims priority form PCT/US2016/63702 filed Nov. 23, 2016 which claims priority form U.S. Prov. Ser. No. 62/258,561 filed Nov. 23, 2015, the entire contents of each of which are incorporated herein by reference.

This application also relates to and claims priority as a continuation-in-part (CIP) from U.S. Ser. No. 17/141,839 filed Jan. 5, 2021 (pending) which claims priority from and is a continuation (CON) of U.S. Ser. No. 15/778,610 filed May 24, 2018 and issued as U.S. Pat. No. 10,925,430 on Feb. 23, 2021, the entire contents of which are incorporated herein by reference; which claims priority from and is a § 371 national phase of Ser. No. PCT/US2016/063702 filed Nov. 23, 2016, which in turn claims priority from U.S. Prov. Ser. No. 62/258,561 filed Nov. 23, 2015, the entire contents of each of which are incorporated herein by reference.

FIGURE SELECTED FOR PUBLICATION

FIG. 56.

BACKGROUND OF THE INVENTION

Field of the Invention

The present invention relates to systems, apparatus and methods for manual preparation of single use beverage cartridges. More particularly, the present invention provides systems, methods, and apparatus that allows the preparation of single use beverage cartridges in a convenient counter-suitable construction while sealing cartridges for longer term storage.

Description of the Related Art

Industrial applications of brewing cartridges include the those cartridges provided in the form of pre-made K-Cup® (a trademark of Keurig Green Mountain, Inc., Vermont USA) and Pods® (a trademark of Nescafe) by the for use in industrial and personal-use brewing systems. Recently consumer-based individual use brewing devices have been developed which allow the use of conventional cartridges in a home-based environment. Typically, the providing company decides upon a particular blend of brewing material (coffee, tea, and beverage). On large scale operations, and with limited options, it is impossible for an individual consumer or user to select their own individual flavors and tastes. Ultimately, the consumer must choose from limited industrial-selected options and is deprived of the ability to self-determine their preferred mix.

The use of individually-fillable re-useable cartridge components also exist, with a type of openable-hinged cover or separate cover. These devices are awkward to fill by hand, often creating spills. As a result, a consumer desiring a custom blend has only the option of an expensive multi-use cartridge that poorly seals and may open intentionally.

It is understood that commercially available single-use cartridges such as a K-Cup® and Nescafe Pods® are very expensive on a per-volume basis relative to the commodity cost of the contents. For example, a 64 oz container of common coffee may have a cost of $5.00 at discount, whereas a single-use cartridge sold commercially may have a unit cost of $0.75-1.00 each. Similar expense comparisons also exist for other brewing components, e.g., coffees, teas, sweet fluids such as hot chocolate, nutraceuticals, flavoring blends and mixes, etc.

Accordingly, there is a need for a system, an apparatus, and/or a method for preparing and fully sealing single-use custom-blendable cartridges that may operate within known consumer systems and overcome at least one of the detriments noted above.

ASPECTS AND SUMMARY OF THE INVENTION

In response, it is now recognized that a beverage cartridge preparation system and method of using the same can allow a consumer to provide a self-selected brewing component that addresses one of the concerns noted herein and provides an improved consumer experience and convenience.

The present invention provides a system for beverage cartridge preparation allows users to self-select, self-fill, and self-seal single use beverage cartridges for convenience. A frame assembly supports a cartridge handling system and a cartridge filling system. The cartridge filling system includes a fillable container and a portion dispensing system. The cartridge handling system includes a movement guide system moving the beverage cartridges, a sealing system for sealing the beverage cartridges after filling, and a motion system for actuating the cartridge handling system, the portion dispensing system, and the sealing system. The movement system includes mobility relative to operative members of the filling and handling systems and one or more single use beverage cartridges. Adaptive cartridge shapes and components are provided to fit a particular preparation system.

The present invention additionally provides a system for beverage cartridge preparation that allows users to self-select, fill, and seal single use cartridges with improved convenience and for long term storage. The system includes a cartridge handling system and a cartridge filling system operative relative to a cartridge to be filled. The cartridge handling system is mobile relative to operative members of the cartridge filling system. Adaptive mechanisms allow manual filling, optional-packing or not-packing, and sealing of a plurality of cartridge shapes.

The present invention additionally provides a system or apparatus or method for beverage cartridge preparation that allows mobility relative to step-by-step operative members of the cartridge filling system and one or more single use cartridges to be filled and sealed. Adaptive cartridge shapes and components are provided to fit a particular preparation system. Adaptive and alternative mechanisms for the systems and aspects herein allow convenient manual filling, and sealing of a plurality of single cartridges.

According to one aspect of the present invention, there is provided a manually operated beverage cartridge filling and sealing device.

According to another aspect of the present invention, there is provided a system that contains single or multiple containers for one or more beverage ingredients (coffee, tea, or other flavored powdered fillers).

According to another aspect of the present invention, there is provided a system wherein each canister has adjustable output to distribute to a target beverage cartridge with a predetermined amount of beverage ingredient filler.

According to another aspect of the present invention, there is provided a system wherein the adjustable output canister gives a user an ability to adjust and select a beverage filler, or mix of fillers or blends, that results in changes in strength and flavors.

According to another aspect of the present invention, there is provided a system wherein the device utilizes one or more of a supply of beverage cartridge containers that are filled by a user with a user-pre-determined amount of a beverage filler.

According to another aspect of the present invention, there is provided a system wherein a filled beverage cartridge is sealed with a cover in a non-limiting manner, which may include, but is not limited to, thermal sealing, sonic sealing, electronic-field (EF) sealing, adhesive sealing, friction sealing, crimp (bending) sealing, and other sealing methods known to those in the package sealing technological arts.

According to another aspect of the present invention, there is provided a system, for preparing a beverage cartridge, comprising: a frame assembly providing a support base portion spaced from a top support portion; a cartridge handling system on the support base portion for positioning the beverage cartridge in one of a receiving position, a filling position, an assembly position, and a sealing position relative to the support base portion; a cartridge filling system positioned proximate the cartridge handling system and containing at least one fillable container for retaining for dispensment during a filling use a brewing component into the beverage cartridge; the at least one fillable container on the top support portion; the cartridge filling system, further comprising: a portion dispensing system that dispenses a selectable portion of the brewing component from the at least one fillable container to the beverage cartridge in the filling position; the cartridge handling system, further comprising: a movement guide system that guides a rotational support assembly shaped to removably retain at least one the beverage cartridge relative to the fillable container and the filling position for a filling with the selectable volume of the brewing component during the use; a sealing system containing a sealing press assembly operative to seal a filled the beverage cartridge positioned by the rotational support assembly in the sealing position; a motion system containing a pivoting and displaceable handle assembly operative to drive the movement guide system and the portion dispensing system to dispense the selectable portion filling the beverage cartridge and to actuate the sealing system to seal the filled beverage cartridge during the use.

According to another aspect of the present invention, there is provided a system wherein alternative cartridge shapes may be filled and sealed, and may as a non-limiting example have a uniquely shaped lower portion of a cartridge side-wall which may be provided to fit only a selected cartridge preparation system.

According to another aspect of the present invention, there is provided a system wherein a portion of a cartridge may be provided that is adaptive to a conventional single cup or pod beverage machine thereby allowing the use of a prepared beverage cartridge with conventional brewing systems and preparation machines.

According to another aspect of the present invention, there is provided a system wherein a resulting prepared sealed beverage cartridge may be provided from a plurality of pre-packaged beverage containers containing beverage ingredients which produce a beverage containing one or more beverage ingredients.

According to an alternative embodiment of the present invention, a system for preparing a beverage cartridge, comprising: a frame member providing a support base spaced from a top support portion; at least one removable sealed container on said top support portion for securely retaining and dispensment of a brewing component during a use into said beverage cartridge; a cartridge handling system on said support base for positioning an empty said beverage cartridge in one of filling position, an optional packing position in some embodiments, and a sealing position along said support base; a cartridge filling system positioned above said cartridge handling system and relative to said removable sealed container for accessing said brewing component during a filling use; said cartridge handling system further comprising: at least one movement guide apparatus for moving a portion of said cartridge handling system relative to said removable sealed container and returning to a filling position with a selected volume of said brewing component; a filling apparatus for guiding said selected volume of said brewing component from said cartridge handling system into an interior of said beverage cartridge while said beverage cartridge is in said filling position; a motion apparatus containing a pivoting handle mechanism and operative to drive a said cartridge handling system of a filled said beverage cartridge to optionally pack said brewing component while said beverage cartridge is in said optional packing position; and a sealing apparatus also operative relative to said motion apparatus, and operative to provide a sealing of said beverage cartridge while said beverage cartridge is in said sealing position.

According to another alternative embodiment of the present invention, a system for preparing a beverage cartridge, further comprising: at least one urging spring member in said motion apparatus providing a lifting of said pivoting handle system relative to a pivot point; said pivot point being positioned between said support base and said top support; and at least one connecting member joining said at least one urging spring member to said pivoting handle system thereby enabling said pivoting handle system to pivot about said pivot point and providing a motion of said portion of said cartridge handling system relative to said removable sealed container.

According to another alternative embodiment of the present invention, a system for preparing a beverage cartridge, further comprising: a cover member for sealing said beverage cartridge following said steps of filling and optionally packing; said cover member being one of a foil cover, a friction sealing cover, a plastic cover, a paper cover, an adhesive cover, a crimping cover, and a combination of one or more of said covers; and said sealing apparatus further comprising operative means to seal said cover member to a top portion of said beverage cartridge using at least one of a friction sealing, a thermal sealing, a sonic sealing, an adhesive sealing, and combinations of more than one of these sealing steps.

According to another alternative embodiment of the present invention, a system for preparing a beverage cartridge, further comprising: a mobile cartridge support for supporting said beverage cartridge relative to said filling apparatus, said optional packing apparatus, and said sealing apparatus; and a movement guide mechanism providing a guided positioning of said mobile cartridge support relative to said filling position, said optional packing position, and said sealing position along said support base during said use.

According to another alternative embodiment of the present invention, a system for preparing a beverage cartridge, further comprising: a cartridge size guide for adaptively positioning within said mobile cartridge support to adaptively size an opening in said mobile cartridge support to receive and support differently shaped beverage cartridges.

According to another alternative embodiment of the present invention, a system for preparing a beverage cartridge, further comprising: an optional cartridge packing adjustment member for adaptively adjusting a size or volume of said packer apparatus member to pack said dispensed brewing component within differently shaped beverage cartridges.

According to another alternative embodiment of the present invention, a system for preparing a beverage cartridge, further comprising: a filling adjustable insert for adaptively positioning within said cartridge filling system and for adaptively sizing a received and a dispensed amount of said brewing component from said removable containers to said filling apparatus so as to adapt said system to differently shaped beverage cartridges.

According to another alternative embodiment of the present invention, a kit for preparing a beverage cartridge, comprising: a bounding container for containing a system for preparing a beverage cartridge during one of a transport, a sale, and a storage thereof; a frame member providing a support base spaced from a top support portion; at least one removably sealed container on said top support portion for securely retaining and dispensment of a brewing component during a use into said beverage cartridge; a cartridge handling system on said support base for positioning an empty said beverage cartridge in one of filling position, an optional packing position, and a sealing position along said support base; a cartridge filling system positioned above said cartridge handling system and relative to said removably sealed container for accessing said brewing component during a filling use of said system for preparing; at least one brewing cartridge; said cartridge handling system further comprising: at least one movement guide apparatus for moving a portion of said cartridge handling system relative to said removable sealed container and returning to a filling position with a selected volume of said brewing component; a filling apparatus for guiding said selected volume of said brewing component from said cartridge handling system into an interior of said beverage cartridge while said beverage cartridge is in said filling position; a motion apparatus containing a pivoting handle mechanism and operative to drive a packing apparatus portion of said cartridge handling system into a filled said beverage cartridge to optionally pack said brewing component while said beverage cartridge is in said optional packing position; and a sealing apparatus also operative relative to said motion apparatus, and operative to provide a sealing of said beverage cartridge while said beverage cartridge is in said sealing position.

According to another alternative embodiment of the present invention, there is provided a kit for preparing a beverage cartridge, further comprising: a cover member for sealing said beverage cartridge following steps of filling and optionally packing; said cover member being one of a foil cover, a friction sealing cover, a plastic cover, a paper cover, a crimping cover, and a combination of one or more of said covers; and said sealing apparatus further comprising operative means to seal said cover member to a top portion of said beverage cartridge using at least one of a friction sealing, a thermal sealing, a sonic sealing, an adhesive sealing, and combinations of more than one of these sealing steps.

According to another alternative embodiment of the present invention, there is provided a kit for preparing a beverage cartridge, further comprising: a mobile cartridge support for supporting said beverage cartridge relative to said filling apparatus, said packing apparatus, and said sealing apparatus; and a movement guide mechanism providing a guided positioning of said mobile cartridge support relative to said filling position, said packing position, and said sealing position along said support base during said use.

According to another alternative embodiment of the present invention, there is provided a kit for preparing a beverage cartridge, further comprising: a cartridge size guide for adaptively positioning within said mobile cartridge support to adaptively size an opening in said mobile cartridge support to receive and support differently shaped beverage cartridges.

According to another alternative embodiment of the present invention, there is provided a kit for preparing a beverage cartridge, further comprising: a cartridge packing adjustment member for adaptively adjusting a size of said packer apparatus member to pack said dispensed brewing component within differently shaped beverage cartridges.

According to another alternative embodiment of the present invention, there is provided a kit for preparing a beverage cartridge, further comprising: a filling adjustable insert for adaptively positioning within said cartridge filling system and for adaptively sizing a received and a dispensed amount of said brewing component from said removable containers to said filling apparatus so as to adapt said system to differently shaped beverage cartridges.

According to another alternative embodiment of the present invention, there is provided a method for providing a filling of a beverage cartridge, comprising the steps of: providing a frame member providing a support base spaced from a top support portion; providing at least one removably sealed container on said top support portion for securely retaining and dispensment of a brewing component during a use into said beverage cartridge; providing a cartridge handling system on said support base for positioning an empty said beverage cartridge in one of filling position, a packing position, and a sealing position along said support base; providing a cartridge filling system positioned above said cartridge handling system and relative to said removably sealed container for accessing said brewing component during a filling use of said system for preparing; providing at least one brewing cartridge; said cartridge handling system further comprising: at least one movement guide apparatus for moving a portion of said cartridge handling system relative to said removable sealed container and returning to a filling position with a selected volume of said brewing component; a filling apparatus for guiding said selected volume of said brewing component from said cartridge handling system into an interior of said beverage cartridge while said beverage cartridge is in said filling position; a motion apparatus containing a pivoting handle mechanism and operative to drive a packing apparatus portion of said cartridge handling system into a filled said beverage cartridge to pack said brewing component while said beverage cartridge is in said packing position; and a sealing apparatus also operative relative to said motion apparatus, and operative to provide a sealing of said beverage cartridge while said beverage cartridge is in said sealing position.

According to another alternative and non-limiting aspect of the present invention, there is provided a system for preparing a beverage cartridge, comprising: a cartridge handling system and a cartridge filling system, positioned along a common central axis, the cartridge handling system operative to rotationally support a beverage cartridge to be filed relative to the the common central axis, the cartridge filling system further comprising: a fill cavity assembly and a dispensing reservoir, the dispensing reservoir rotationally fixed relative to the central axis on a top side thereof and bounding a volume for containing a material to be dispensed, the dispensing reservoir having a reservoir opening for dispensing the material to be dispensed therethrough during a use, the fill cavity assembly being rotationally operative relative to the common central axis and the dispensing reservoir during a use, the fill cavity assembly including a top plate assembly having a top plate opening proximate the reservoir opening and being adjustably secured to a fill plate assembly defining a fill plate cavity opening cooperating with the top plate opening during the use, means for adjusting a volume of the fill plate cavity relative to the top plate opening including a dam member whereby a volume of the fill plate cavity is adjustable by the dam member extending from the top plate assembly, a bottom plate assembly secured on the common central axis and contacting the fill plate assembly opposite the top plate assembly, and the bottom plate assembly bounding a bottom plate opening available to the fill plate cavity during the use.

According to another alternative and non-limiting aspect of the present invention, there is provided a system for preparing a beverage cartridge, further comprising: a trap door assembly pivotable relative to the central axis and containing a trap door and a trap door mechanism fixed on a trap door shaft, and the trap door slidably contacting the bottom plate assembly and operatively covering or revealing the bottom plate opening during the use for dispensement of the material to be dispensed into the beverage cartridge.

According to another alternative and non-limiting aspect of the present invention, there is provided a system for preparing a beverage cartridge, further comprising: a beverage cartridge carrier rotationally pivotable relative to the common central axis during the use, the beverage cartridge carrier pivotable between the bottom plate assembly and a support base for the system, and the beverage cartridge carrier further comprising: at least one supporting member supporting the beverage cartridge to be filled.

According to another alternative and non-limiting aspect of the present invention, there is provided a system for preparing a beverage cartridge, further comprising: a beverage cartridge carrier rotationally pivotable relative to the common central axis during the use, the beverage cartridge carrier pivotable at a level between the bottom plate assembly and a support base for the system, and the beverage cartridge carrier further comprising: at least one supporting member supporting the beverage cartridge to be filled.

According to another alternative and non-limiting aspect of the present invention, there is provided a system for preparing a beverage cartridge, further comprising: a lever arm assembly for operating the cartridge handling system and the cartridge filling system relative to the common central axis during the use.

According to another alternative and non-limiting aspect of the present invention, there is provided a system for preparing a beverage cartridge, further comprising: a lid sealing assembly, further comprising: a lid press member extending downwardly away from the bottom plate assembly, toward the base support, above a rotational level of the beverage cartridge and radially distant from the common central axis.

According to another alternative and non-limiting aspect of the present invention, there is provided a system for preparing a beverage cartridge, wherein: the lid sealing assembly, further comprises: a cup lifting assembly extending upwardly from the support base and radially distant from the common central axis.

According to another alternative and non-limiting aspect of the present invention, there is provided a system for preparing a beverage cartridge, wherein: the lever arm assembly rotationally engages the cartridge handling system and cartridge filling system, the lever arm assembly further optionally engages the cup lifting assembly during the use.

According to another alternative and non-limiting aspect of the present invention, there is provided a system for preparing a beverage cartridge, wherein: the beverage cartridge includes a bottom side recess geometry, and the cup lifting assembly protruding geometry shaped for cooperative engagement with the bottom side recess geometry during the use.

According to another alternative and non-limiting aspect of the present invention, there is provided a system for preparing a beverage cartridge, further comprising: a trap door assembly pivotable relative to the central axis and containing a trap door and a trap door mechanism fixed on a trap door shaft, and the trap door slidably contacting the bottom plate assembly and operatively covering or revealing the bottom plate opening during the use for dispensement of the material to be dispensed into the beverage cartridge.

According to another alternative and non-limiting aspect of the present invention, there is provided a system for preparing a beverage cartridge, wherein: the top plate assembly and the fill plate assembly pivotably mounted to a a first pivot axis member collinear with the common central axis, the trap door assembly operably mounted to a second pivot axis member collinear with the common central axis, and the beverage cartridge carrier rotationally pivotable relative to a third pivot axis member collinear with the common central axis.

According to another alternative and non-limiting aspect of the present invention, there is provided a system for preparing a beverage cartridge, wherein: the lever assembly operatively engages the first pivot axis member in an angular tilting manner relative to a tilting pivot, and the lever assembly operatively engages the second pivot axis member during the use.

According to another alternative and non-limiting aspect of the present invention, there is provided a system for preparing a beverage cartridge, further comprising: an ejection mechanism operative to remove the beverage cartridge from the a beverage cartridge carrier after a filling and during the use, and the ejection mechanism further includes a curved contact for a sliding contact and lifting engagement of the filled beverage cartridge following the use during a rotation of the beverage cartridge carrier.

According to another alternative and non-limiting aspect of the present invention, there is provided a system for preparing a beverage cartridge, wherein: the at least one supporting member includes a beverage cartridge support profile cooperatively shaped to correspond to an exterior profile of the beverage cartridge, whereby the beverage cartridge carrier provides a secure support.

According to another alternative and non-limiting aspect of the present invention, there is provided a system for preparing a beverage cartridge, wherein: the beverage cartridge carrier further comprises at least four supporting members operative to support respectively four beverage cartridges to be filled.

According to another alternative and non-limiting aspect of the present invention, there is provided a system for preparing a beverage cartridge, further comprising: a directional control system on the beverage cartridge carrier, a spring-urged engagement mechanism in the directional control system engaging a non-interfering surface of the beverage cartridge carrier during a use rotation thereof, and engaging respective engagement profiles on the non-interfering surface, whereby the beverage cartridge carrier rotates in only one direction about the comment central axis during the use.

According to another alternative and non-limiting aspect of the present invention, there is provided a system for preparing a beverage cartridge, further comprising: a beverage cartridge carrier secured relative to the common central axis during the use, the beverage cartridge carrier positioned at a level between the bottom plate assembly and a support base for the system, and the beverage cartridge carrier further comprising: at least one supporting member supporting the beverage cartridge to be filled in a releaseably guiding manner.

According to another alternative and non-limiting aspect of the present invention, there is provided a system for preparing a beverage cartridge, wherein: the support base, further comprises a rotating member having a one direction catch mechanism ensuring direction about the common central axis in one direction, and a lower common level and an upper level on the support base, the upper level being radially arrayed relative to the common central axis, and a sloped transition between the lower common level to the upper level sufficient to guide a beverage cartridge to be sealed during the use, whereby during the use, a rotation of the support base urges relative to the supporting member drives a respective the beverage cartridge from the lower common level to the upper level.

According to another alternative and non-limiting aspect of the present invention, there is provided a system for preparing a beverage cartridge; further comprising: a lid sealing assembly, further comprising: a lid press member extending downwardly away from the bottom plate assembly, toward the base support, above a level of the beverage cartridge and radially distant from the common central axis, and the lid press member positioned to receive an external lid for sealing and to urge the lid onto the beverage cartridge as the beverage cartridge is urged onto the upper level of the base plate.

According to another adaptive and alternative and non-limiting aspect of the present invention, there is provided a system, for preparing a beverage cartridge, comprising: a frame assembly providing a support base portion spaced from a top support portion, a cartridge handling system on the support base portion for positioning the beverage cartridge in one of a receiving position, a filling position, an assembly position, and a sealing position relative to the support base portion, a cartridge filling system positioned proximate the cartridge handling system and containing at least one fillable container for retaining for dispensment during a filling use a brewing component into the beverage cartridge, the at least one fillable container on the top support portion, the cartridge filling system, further comprising: a portion dispensing system that dispenses a selectable portion of the brewing component from the at least one fillable container to the beverage cartridge in the filling position, the cartridge handling system, further comprising: a movement guide system that guides a rotational support assembly shaped to removably retain at least one the beverage cartridge relative to the fillable container and the filling position for a filling with the selectable volume of the brewing component during the use, a sealing system containing a sealing press assembly operative to seal a filled the beverage cartridge positioned by the rotational support assembly in the sealing position, a motion system containing a pivoting and displaceable handle assembly operative to drive the movement guide system and the portion dispensing system to dispense the selectable portion filling the beverage cartridge and to actuate the sealing system to seal the filled beverage cartridge during the use.

The above, and other alternative and adaptive aspects, features, and advantages of the present invention will become apparent from the following description read in conjunction with the accompanying drawings, in which like reference numerals designate the same elements.

BRIEF DESCRIPTION OF THE DRAWINGS

FIG. 4A is a partial exploded view of selected internal components of the proposed invention in wide array.

FIG. 10B, continues from FIG. 10A, wherein FIG. 10B is an exemplary schematic layout of selected elements and positions in axial alignment in the proposed invention performing a cup- or cartridge-filling process. It will be understood that selected steps on each column occur relative to the relative position of the lever to the respective axes of rotation.

DETAILED DESCRIPTION OF THE PREFERRED EMBODIMENTS

Figure 1:
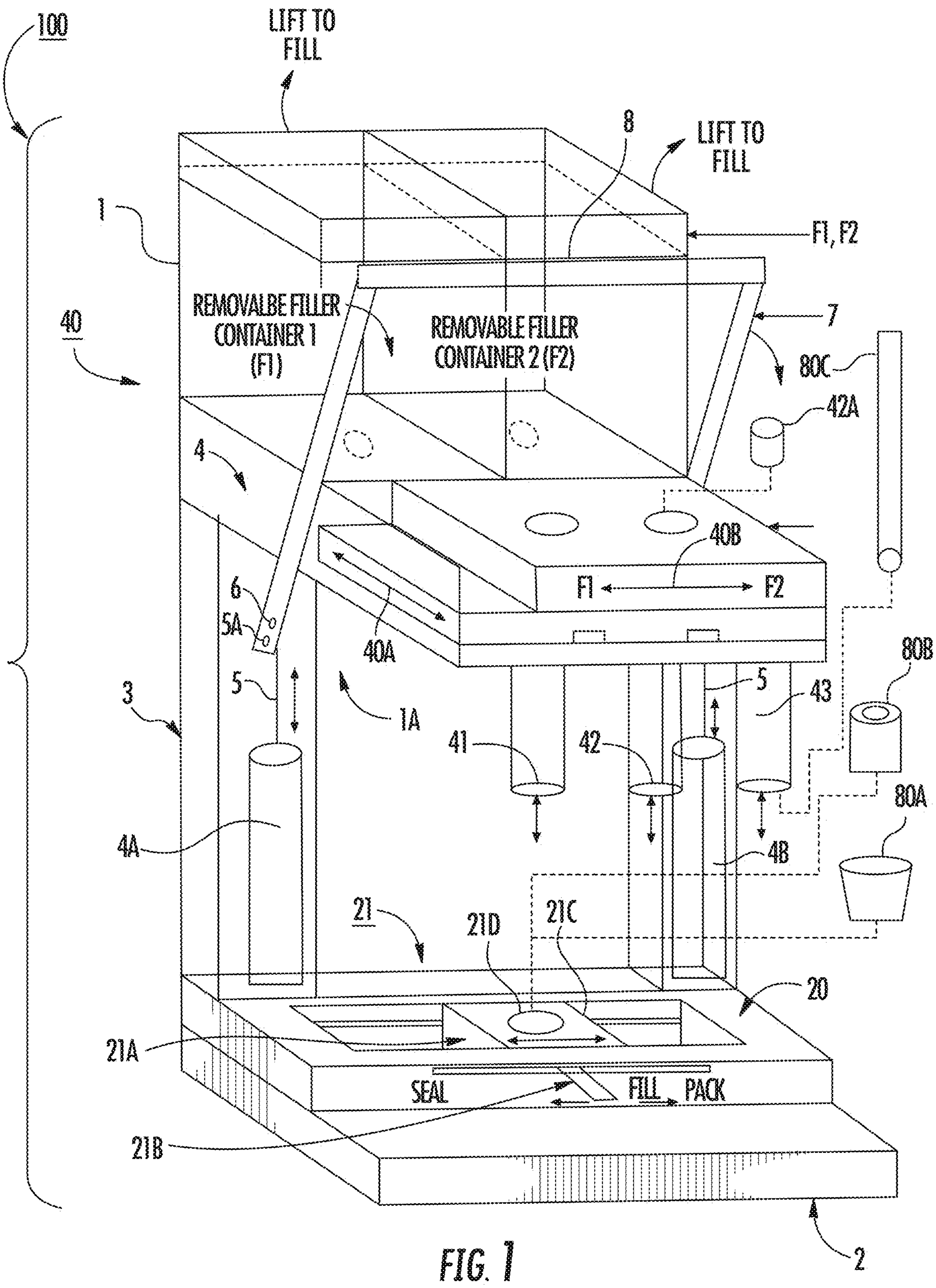
FIG. 1 is a perspective front illustration of an alternative system for preparing a beverage cartridge provided in a bounded kit arrangement with one or more cartridges, guides and components.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

FIG. 1 provides a system and apparatus 100 for preparing a beverage cartridge 80A which may be any type of conventional empty cartridge or an innovative or custom type of cartridge or cup shape or cup form without limitation thereto. A frame 1 for system 100 includes a base 2 and a back support member 3 projecting upward therefrom relative to a support surface and to provide a top support 4 for supporting one or more respective removable filler and dispenser containers F1, F2.

It will be understood that respective removable filler and dispenser containers F1, F2 are not limited in number (more than one is permitted) and they may be removable from or secured to frame 1 and top support 4. Additionally, each may be of any convenient and adaptive shape without limitation so as to improve nesting on frame 1 and preferably an air-tight seal therewithin. Similarly, upon nesting with top support 4, containers F1, F2 may sealing secure therewith so as to dispense upon an operation of a pivoting handle 7 with a grip member 8 during a use and then return to a sealed-condition between dispensements of the contents.

Frame 1 and back support 3 further provides two opposed dampening sprigs 4A, 4B secured on base 2 and positioned in a pivoting arrangement with an extended bar member (shown) of handle 7 relative to respective side pivot points 6 (left-side shown), 6 (right-side not shown) on either side of system 100 as shown. Connecting rods 5A (left-side shown), 5B (right-side not shown), respectively join dampened spring member 4A, 4B to portions of the bar members extending from handle 7 between respective pivot points 6, 6 forming, preferably, a second order lever so as to increase a mechanical pressing advantage. It will be understood by those of skill in the art that alternative lever-movement-pressing mechanisms may be provided without departing from the scope and spirit of the present invention such that the related components may be understood to function as a pressing system, as will be discussed.

Containers F1, F2, etc. rest on top support 4 and dispense therebelow to a cartridge filling system 40 operative to dispense a desired content to a selected cartridge member.

On base 2, a cartridge preparation stage 20 is provided supporting a cartridge handling system 21 having three designated stations, fill, pack, and seal (as shown) and a mobile support carrier 21A that may be slidably positioned along relative stations (shown in the 'fill' station). A lever member 21A is operatively communicating with an internal movement guide means 21C and joined with mobile support carrier 21A to allow a convenient user movement by actuation of lever member 21A between stages.

It will be understood that an opening 21D in mobile support carrier 21A may be shaped to support and accommodate any conventional or alternative cartridge or cup to be filled. While not required, to assist in this process an exemplary cartridge adaptor 80B is shown that may fit within opening 21D to receive and support smaller or alternatively shaped cartridges during a filling-packing-sealing process. Alternatively, the proposed system 100, in a kit form, may further include alternative mobile supports 21A that may be swapped-out depending upon a desired final-use-cartridge shape or geometry. In this manner, the present system 100 may be readily adapted to all conventionally-known cartridge geometries, and may also be readily adapted to alterative cartridge geometries (for example, an alternatively shaped cartridge bottom geometry).

Operatively connected to the press system and operative relative to an up-down position of handle 7 are a filler apparatus 42 for flowing contents into a cartridge, a packer apparatus 43 for pressing and packing contents into a cartridge in a pack. As was noted above, to allow ready adaptation to alternative cartridge geometries, an exemplary cartridge-adaptor member 80C is shown. As shown, cartridge-adaptor member 80C is shaped with a smaller-sized geometry for use with ones of sealer, filler, packer apparati 41, 42, 43, and in a preferred form may replace packer apparatus 43 for readily packing the dispensed contents into a small-sized cartridge (for example, a Nescafe® pod) supported by an adaptor 80B as a guide within mobile support 21A in cartridge handling system 21. In such exemplary use, the cartridge-adaptor member 80C is positioned within, or fully replaces, packer apparatus 43. A similar substation for alternative-adaptor members 80C, not shown, may allow system 100 to be adapted to accommodate all conventionally known cartridges as well as custom supplied members.

Cartridge filling system 40 will be understood, in this alternative embodiment to have one or more traveling sliders to aid in a sealed dispensment of a filler material from respective containers F1, F2, etc. These traveling sliders are shown as traveler components 40A (for a side-side motion as shown to enable a designation between one or more removable containers), and 40B (for an inward-outward motion as shown to enable a pick-up of material to-be-dispensed from the removable containers and a transport to a position proximate the filler apparatus 42 so as to slide down into a cartridge 80A secured within opening 21D in mobile support 21A). While any guiding means may be employed to ensure the guided travel of traveling components 40A, 40B, illustrated (but not numbered) are several guiding key-ways relative to top support 4, back support 3, and frame 1 to allow a forward-outward motion for retrieving contents from containers F1, F2, etc., and for positioning the contents relative to filler apparatus 42 to downward dispensment into an empty cartridge for filling. This is accomplished in a convenient manner so that no contents are spilled, and so that the dispensing occurs downward when filler apparatus is closely proximate the opening of a cartridge-to-be-filled. This is accomplished upon one triggered motion f handle 7. Next, mobile support 21A is repositioned from the 'fill' location to the 'pack' location via the movement guide means 21C and lever member 21B, relative to packer apparatus 43, and when positioned lever 7 is actuated again, urging packer apparatus 43 toward opening 21D and pressing the contents suitably within the cartridge. Then, next, mobile support 21A is repositioned from the 'pack' location via the movement guide means 21C and lever 21B along to the 'seal' station proximate to the sealer apparatus 41 positioned o the cartridge filling system 40. Thereupon, on motion of handle 7, a sealing cover (not shown, but of any form) is positioned on an upper rim of the filled-packed cartridge and a sealing occurs.

It will be understood that the sealing may occur in any form suitable for fully sealing the contents in the cartridge. As a non-limiting example, sealer apparatus 41 may include a thermal sealing feature, and a user may position a pre-supplied sealing cover (paper, foil, plastic etc.) there with, so that upon operation of lever 7, the sealing cover is sealingly secured to cartridge forming a unitary beverage cartridge whole for storage or later use. Alternatively, sealer apparatus may be provided with a pre-supplied crimp cover, so that upon operation of lever 7, the sealer apparatus 41 provides a crimping action. Similar arrangements can be provided by those of skill in the art for adhesive sealing, friction-sealing, or any other conventional sealing technology without departing from the scope and spirit of the present invention.

Figure 2A:
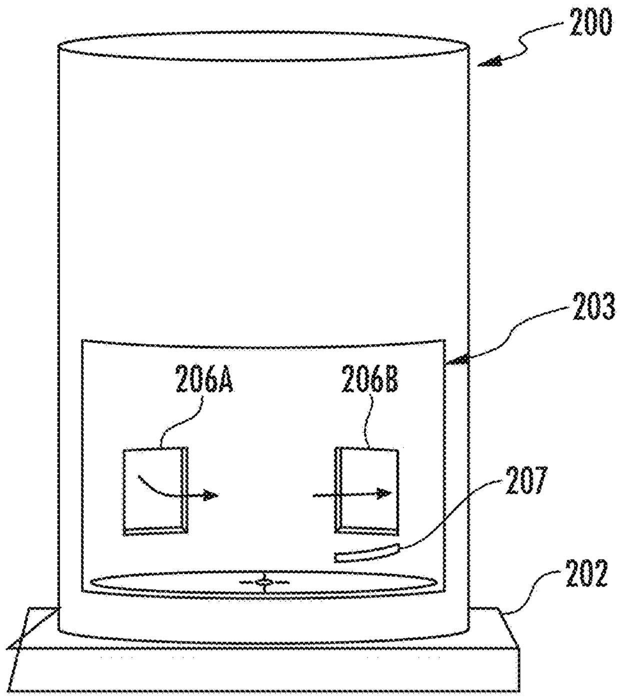
FIG. 2A is an exemplary front view of an outer housing of the proposed invention having a general contour about a center pivot axis indicator.
Figure 2B:
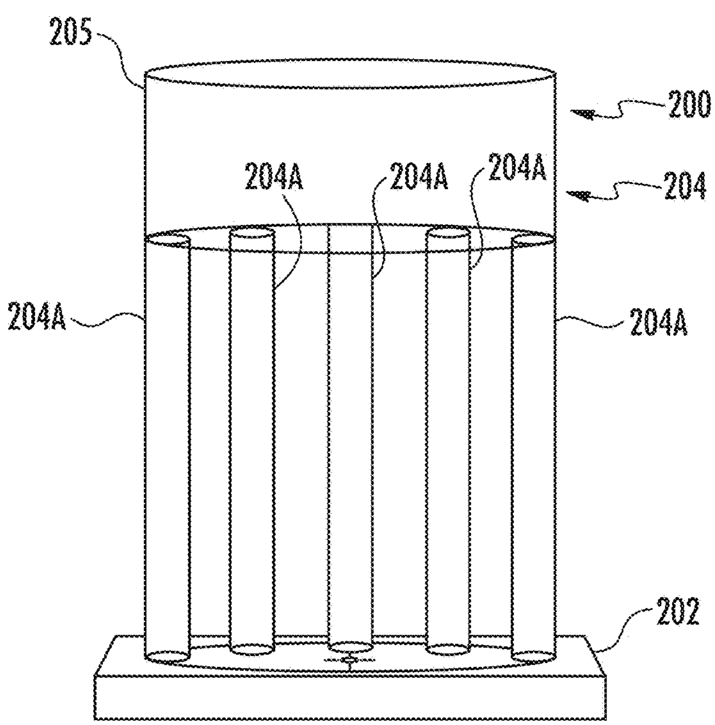
FIG. 2B is an exemplary inner support illustration of the housing of the proposed invention noting general support column and container location relative to a center pivot axis indicator.

Additionally, referring now to FIGS. 2A and 2B where an exemplary front view (FIG. 2A) of a housing 200 of the proposed invention having a base member 202, a generally bounding outer shell 201 for containing the inner components (to be discussed) and for allowing access to the components via access portals generally arranged thereon (discussed but only generally shown as non-limiting examples 206A, 206B). It will be understood that depending upon the arrangement and operation of the present invention, housing 200 may have differently shaped, and different numbers of, or no, access portals 206A, 206B and may rely only on a general initial opening 203 provides access to the internal components as will be discussed. An illustrated central pivot axis indicator of a pivoting stage (discussed later) is provided for illustrated purposes but will be understood as illustrative only.

Additionally, provided in housing 200 is a positioned ejection mechanism 207, shown in this embodiment as projecting inwardly from an interior wall of opening 203 to contact a cartridge cup 301 (discussed below) and to eject cup 301 from the housing 200, in this embodiment via opening portal 206B. Ejection mechanism 207 is shown here (FIG. 2A, and later in relative axial position in FIG. 4A) as a shaped guiding arm member that contacts cup 301 during rotation of the cup carrier (discussed below) so as to lift a sealed-cup 301 from the opening of the cup carrier sufficient to clear the cup rim edges, and to guide the cup 301 away from the cup carrier outwardly from the rotation axis and out of the system for later storage. It will be understood, that while ejection mechanism 207 is illustrated here as a curved guiding and lifting arm having an arc shape, that there is no limitation thereto, and that ejection mechanism 207 may contain multiple parts or features that engage a filled-and-sealed cup 301 for removal from the cup carrier and ejection thereby.

In FIG. 2B an exemplary inner support system 204, having one or more support members 204A, extending from base member 202 and generally supporting a storage area 205 for storage of a beverage material and other items as will be discussed. It will be understood, that the inner support system 204, members 204A, and storage area 205 are also arranged relative to the central pivot axis indicator as shown for the operation of the to-be-discussed components. One of skill in the art, having considered FIGS. 2A, 2B will understand that the general arrangement and support system is reflective of the overall invention, but is adapted for use with a rotating cartridge (cup) handing system and filling system (to be discussed below) thereby allowing access to a general central region, with exterior axis-portals (and exit portals) (all not shown) to allow the input of an empty cartridge-to-be-filled, a sealing lid, movement of the cartridge for filling and sealing, and ejection of the filled-and-sealed cartridge following a filling operation (all as to be discussed). It will also be understood, that alternative shapes, sizes, and structures may be provided having a difference in appearance (e.g., square, rectangular, circular, ovoidal, pyramidal, etc.) without departing from the scope and spirit of the present invention.

Figure 3A:
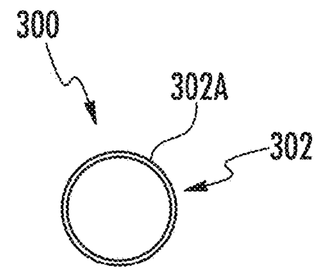
FIG. 3A is a top view of a lid member formed of a generally laminar material.
Figure 3B:
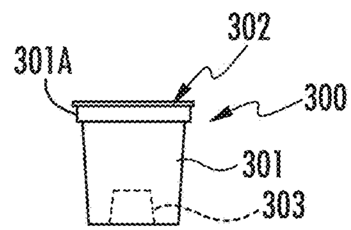
FIG. 3B is a side view of an exemplary adaptive cup or cartridge assembly of the proposed invention in combination with the lid.
Figure 3C:
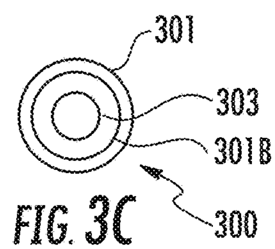
FIG. 3C is a bottom view of the exemplary adaptive cup or cartridge as shown in FIG. 3B.

Additionally, referring now to FIGS. 3A, 3B, and 3C wherein a beverage cup or beverage cartridge system 300 is provided with a cup member 301 having a shape suitable for use a flat lip 301A, a sealing lid member 302 shown here as generally round and flat and having an adhesive portion 302A adjacent the outer rim thereof for sealing with a top surface of flat lip 301A of cup member 301. In one embodiment (FIG. 3C) a bottom 301B of cup member 301 is provided with a recess geometry 303 as shown. In FIG. 3B the exemplary geometry 303 is a generally cylindraceous form having tapered walls. It will be understood that recess geometry 303 may have any shape without limitation, and is provided as an aid for lifting and sealing cup member 301 to lid member 302 in a reliable manner, and one which may be customized upon a manufacturer's intention to prevent the use of non-authorized cartridge or cup systems 300 in the present invention.

While not limited hereto, one exemplary cup or cartridge may have a volume of approximately 2.0 cubic inches (30 milliliters), a height of approximately 2.0 inches, and may contain different powder filters, support shapes, sealing features, etc., as know to those of skill in the art, and without limitations.

Referring now to FIGS. 4A and 4B to FIG. 8B a perspective illustrative layout is provided for array of selected elements (not all) and arrangements of the present inventive handling and filling system 400. As will be understood from the discussion below, the general arrangement will be understood as providing three collinear axes of rotation or movement about a common center line (CL) relative to a bottom support base 480.

There is a first centermost column axis 401 connecting a lever arm 450 and a fill cavity assembly 460 (to be discussed) including a top plate assembly 420, a fill plate assembly 430, and a bottom plate assembly 440. Lever arm 450 is pinned to centermost column 401 by a pin 401A, with the ability to rotate in the vertical dimension. The fill cavity assembly 460 is also pinned to centermost column 401 (by a pin, not shown, interior to fill pate assembly or otherwise), and rotates with centermost column axis 401. This rotation is constrained with stops (not shown) or with boundaries of opening 203, to approximately 90 degrees (90°). A catch mechanism (not shown) is alternatively provided to constrict movement to trace either leftwardly or rightwardly motion (clockwise or counterclockwise) upon a desire of the manufacturer.

There are two opposed pivot guides 401B, 401B engaging the respective columns axes herein and pivotably guide by supporting on support base 480 and the main centerline (shown here noting on a beverage holder 490 for storing a powdered material (e.g., coffee, tea, flavorings etc. in a powdered or granular form for dispensment) and dispensing through an opening 491 via a gravity feed-process. For example, when top plate assembly 420 having an opening 421, is aligned with opening 491 of beverage holder 490, grains of the powdered beverage fall through, as will be discussed.

Figure 4B:
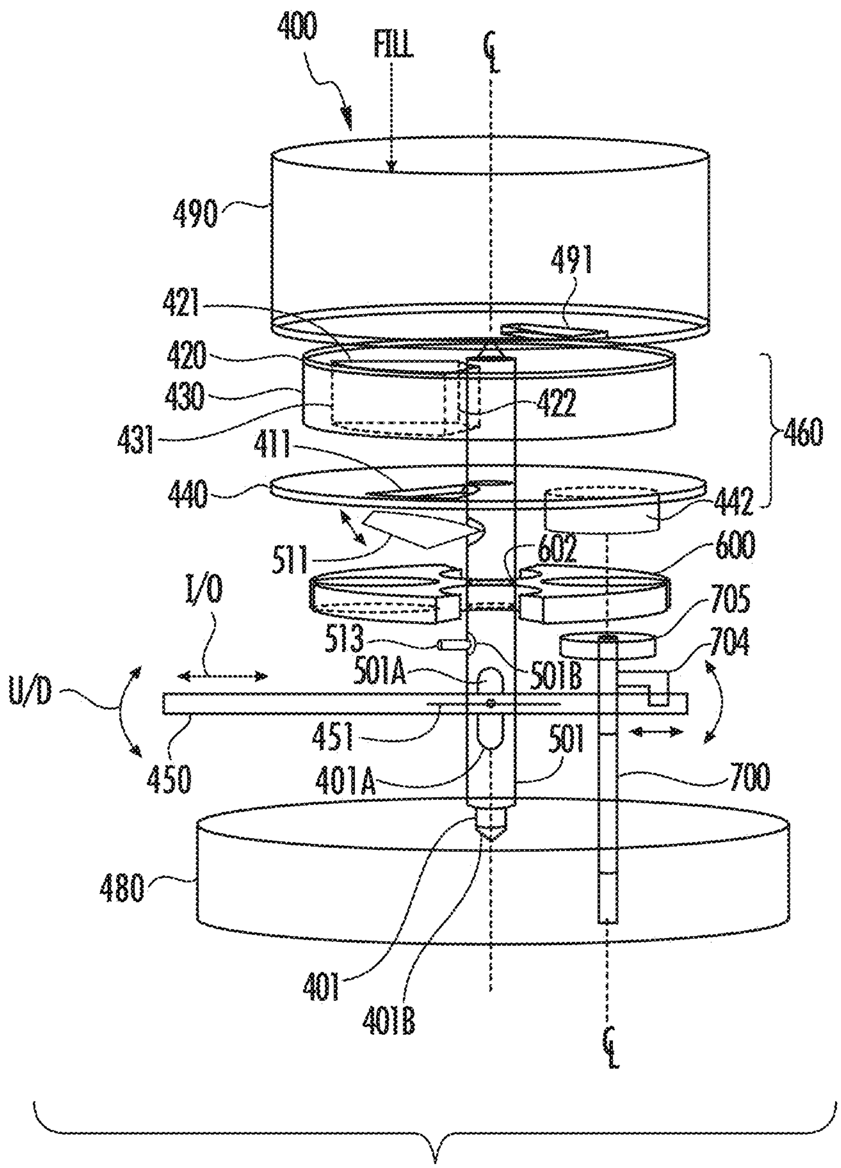
FIG. 4B is a partial exploded view of selected internal components of the proposed invention in a further assembled, but still partial exploded, array. As section along cup carrier 600 is shown at FIG. 4A-4A noting the supporting contour of cup supporting members 602 engaging cup or cartridge 301.

A second central concentric column or axis 501 is free of centermost axis 401 and includes an open slot 501A, 501A on either side thereof via which lever arm 450 extends therethrough to actuate centermost axis 401, and which is pined by pin 401A. In this manner, it will be also understood that lever arm 450 extends in a sliding manner (while pinned) through each column including center column 401, for later triggering of a sealing assembly, as will be discussed. In other words, it will be understood that lever arm 450 includes a sliding slot 451 riding on pin 401A, allowing lever arm 450 to slide through the center axis in a direction I/O (in out), while also pivoting upwardly/downwardly (U/D) as seen in FIGS. 4A, 4B. 8A, 8B, and in a rotational manner (see Row G in FIGS. 10A, 10B).

It will be understood that concentric column or axis 501 generally surrounds centermost axis 401, and pivots fully independently thereof, but also includes openings for operational needs, as will be discussed. It will be further understood that concentric column axis 501 also rides on extended wing portions (shown in FIG. 4A) of pivot guides 401B, 401B for pivoting about the common axis.

Second central concentric column 501 operates a fill trap door assembly 510 relative to bottom plate assembly 440. Fill trap door assembly 510 includes a trap door 511 plate that rides against (slides to sealingly close or open) the opening 441 in bottom plate 440, above cup carrier (to be discussed) and rotates with the trap door assembly 510. A trap door shaft 512 rigidly connects trap door 511 with a trap door trigger mechanism 513 or 'dog' member 513 (dog 513). Trap door 511 and dog 513 project outwardly away from trap door shaft 512 in a common direction. An opening in second central concentric column shaft 501 allows dog 513 to extend therefrom outwardly, and into a movement path of the cup carrier (to be discussed) and individual cups or cartridges 301 (to be discussed). Dog 513 is connected axially immediately below the cup carrier (to be discussed) for interference with cups or cartridges 300 during operation. Dog 513 extends from an opening or fixing point 501B in second central concentric column 501 to allow engagement and triggering with a passage of a cup 301, as will be discussed.

The third concentric column or axis arrangement 601 rotatingly supports the cup carrier 600 and operates either as an independent collar 602 or as supports 602 or a support ring 602, extending outwardly from $2^{nd}$ concentric column 501, thereby allowing a central securing portion 603 of cup carrier 600 to rotate freely relative to and independently of first centermost support axis 401 and second central concentric column 501.

Figure 6A:
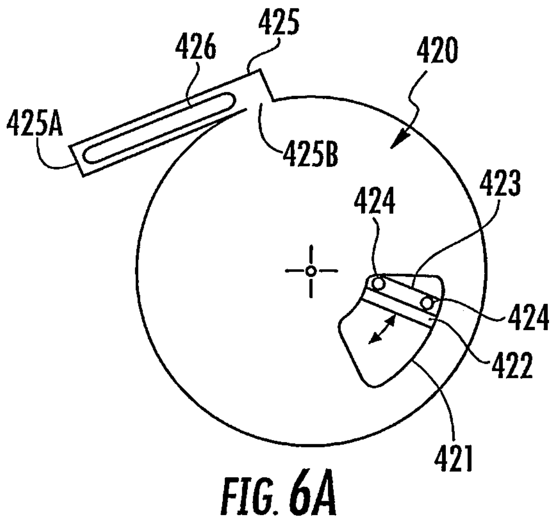
FIG. 6A is a top view of a top plate member with the adjustment arm extended before being bent (with force) to a final form.
Figure 6C:
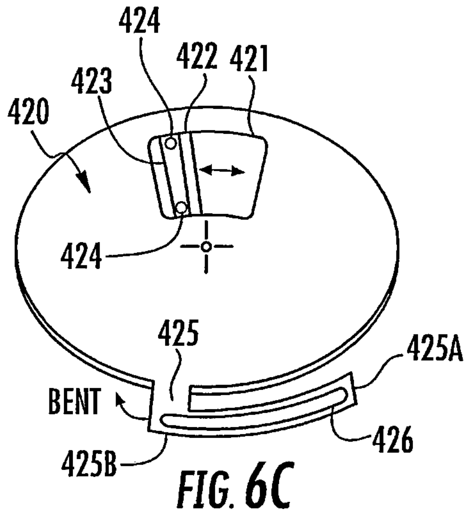
FIG. 6C is a perspective view of the top plate member of FIG. 6A, now with the adjustment arm bent perpendicular (see arrow) to the main plate surface.
Figure 6B:
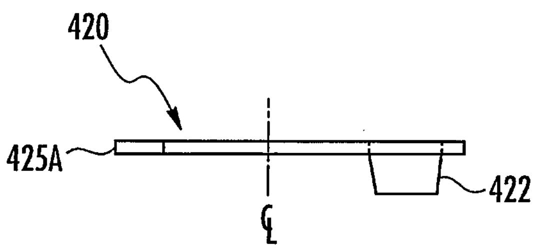
FIG. 6B is a side view of FIG. 6A noting the limit plate extension.
Figure 6D:
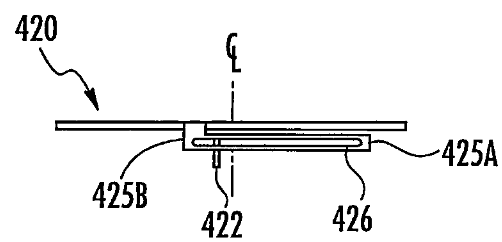
FIG. 6D is a side view of FIG. 6C with the adjustment arm bent downwardly and with the limit plate extension shown.
Figure 7A:
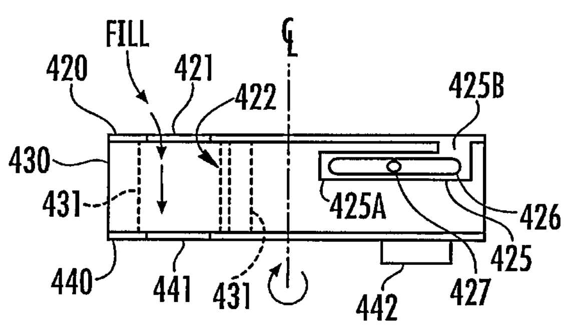
FIG. 7A is a side view of the assembly combination of the top plate, the fill plate, and the bottom plate in combination about the axis.
Figure 7B:
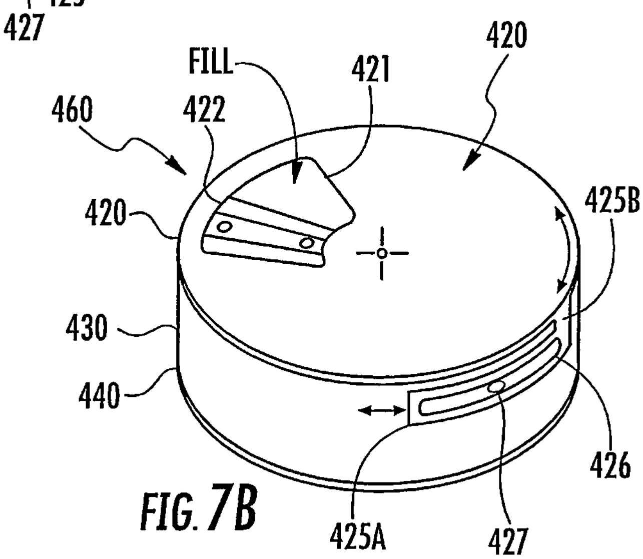
FIG. 7B is a perspective view of the assembly combination in FIG. 7A.
Figure 8B:
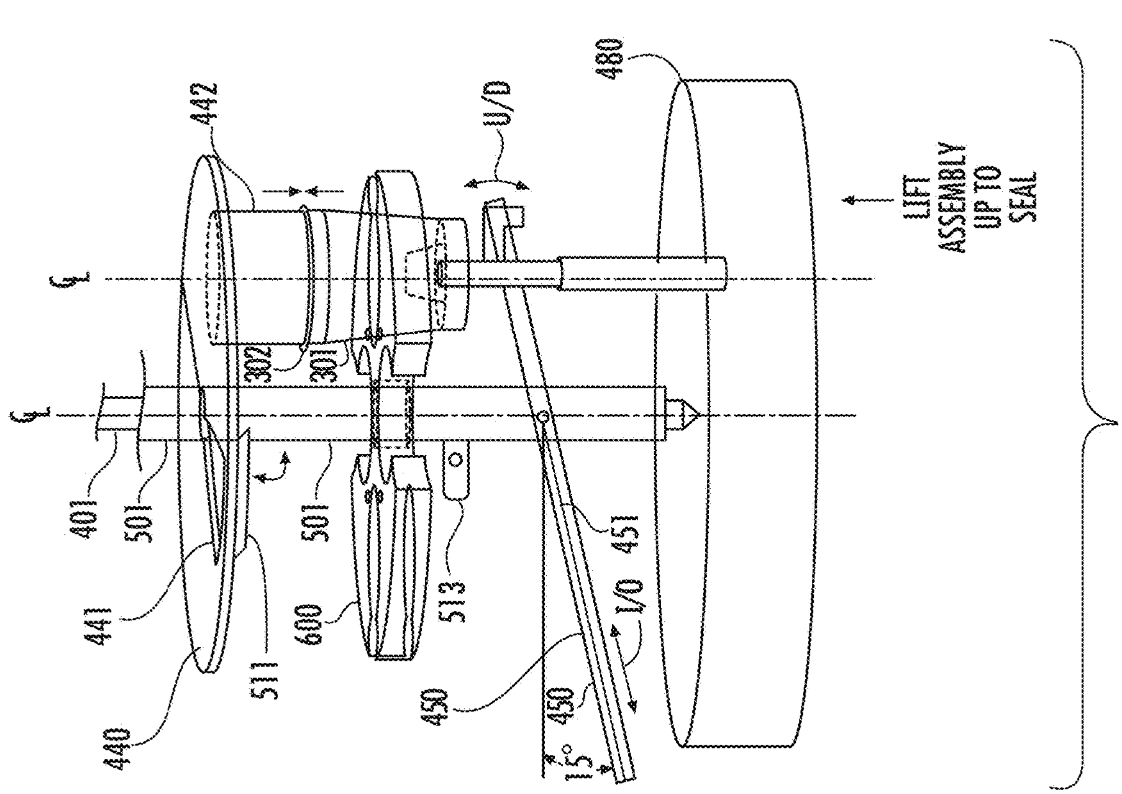
FIG. 8B is a partial assembly exploded view, as in FIG. 8A, with the lever arm listing the lift assembly to press the lid seal to the cup top rim.
Figure 8A:
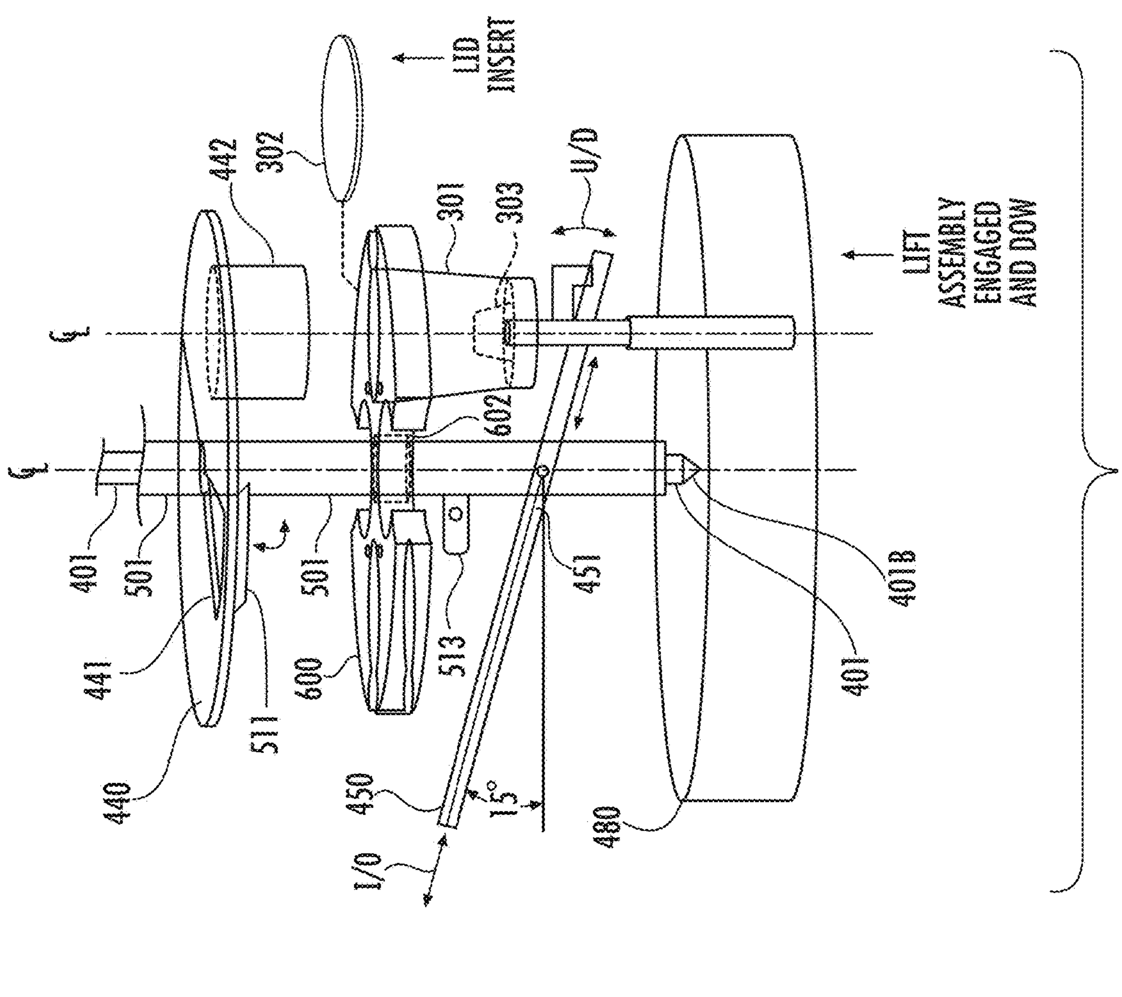
FIG. 8A is a partial assembly exploded view of the mechanism illustrating engagement of a lift-assembly by a sliding engagement of the lever arm for cup sealing.

Top plate assembly 420 with opening 421, further includes an adjustable dam 422 that extends perpendicular to the main plate of top plate assembly 420 (see FIG. 4A, FIG. 6B, 6D). Dam 422 is adjustable through the use of a slotted tab 423 and screws 424 allowing a user to adjust the amount of opening 421 in top plate assembly 420 exposed to opening 491 in holder 490, and also the alignment of the projecting dam 422.

Fill plate assembly is provided as a shortened cylinder fixed rotatingly to first central axis 401 (and so rotates with left-right movement of lever arm 450) and includes a volume cavity 431 in the form of a pass-through during cartridge filling. It will be understood that as top plate assembly 420 is on top of fill plate assembly 430, so also does dam 420 slide into volume cavity 431. In this way, and via adjustment of dam 422 by taps 423 and screws 424 and opening/closing top plate opening 421, so that there is an adjustment of the available relative volume of fill plate assembly 430.

Projecting (radially when initially formed (FIGS. 6A, 10A, 10B), and later perpendicularly when bent (FIGS. 6C, 6D)) from top plate assembly 420 is an adjustment arm 425 formed as an elongate member having an end 425A with a connecting bridge 425B (See FIG. 6A). An elongate slot 426 is formed along adjustment arm 425 to engage a fixing screw 427 that can extend from the rear side of fill plate assembly 430 generally opposite to opening 441. In this way, screw 427 fixes top plate assembly 420 to fill plate assembly 430 and also allows the relative rotational adjustment (rotationally) of top plate assembly 420 to fill plate assembly 430. This allows a user or manufacturer to additionally rotationally adjust the radial position of dam 422 within opening 431 so as to open or reduce the available fill volume. In this manner it will be understood that the volume of fill may be adjusted, and also that the relative radial locations of openings 421, 431, 441 may be adjusted to conveniently fill a cup or cartridge 301.

It will be further understood that fill cavity assembly 460, having bottom plate assembly 440, with opening 441, rotationally joins and is rotationally related to fill plate assembly 430 and top late assembly 420. As a result, when lever 450 moves, first axis 401 moves, and so does fill cavity assembly 460. Thus, when fill plate assembly 430 and top plate assembly 420 return to a dispensing position (Columns 7-9 in FIG. 10B), they rotate relative to opening 441 in bottom plate 440, and align the fill cavity 431 of fill plate assembly 430, then if there is a trap-door-trigger trap door 511 moves relative to bottom plate opening 441, and a dispensement action occurs.

Similarly, as trap door 511 of trap door assembly 510 snuggly rides and slidingly seals the bottom of opening 441, but trap door assembly 510 operates on the second concentric column 501, until a cup 301 in cup carrier 600 interferes with and displaces trap door dog 513, opening 431 remains sealed and there is no dispensement.

Figure 5A:
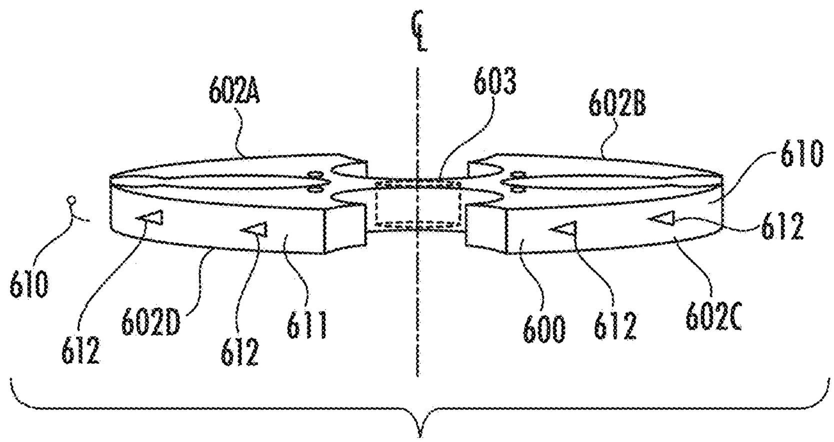
FIG. 5A is a perspective side view of a cup carrier of the present invention.
Figure 5B:
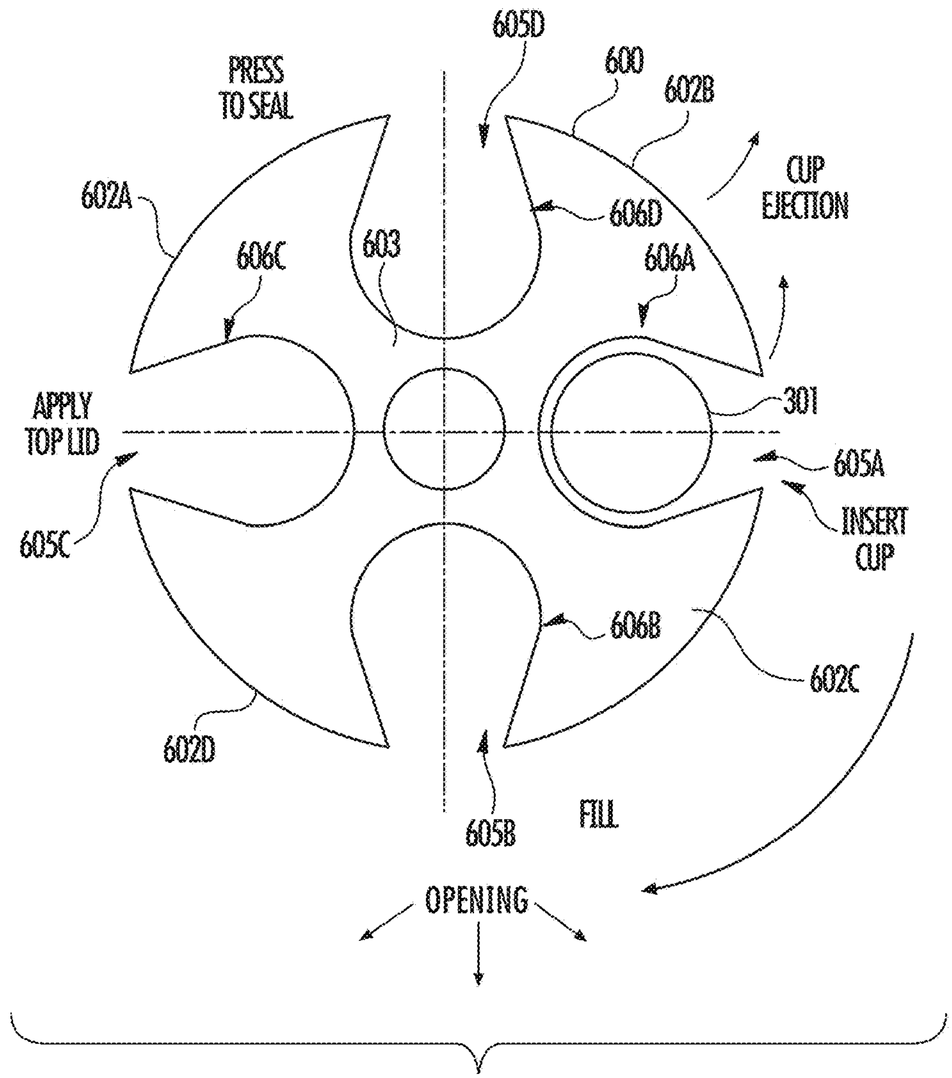
FIG. 5B is an illustrated side view of a cup carrier with an exemplary cup cartridge in an insert position.

As noted in cup carrier 600, there are four cup supporting members 602A, B, C, and D, each with opposed arms 604, forming respective cup supporting channels 605A, B, C, D (See FIGS. 5A, 5B, and FIG. 4A). The edges of respective channels 605A, B, C, and D, are formed with a supporting profile 606A, B, C, and D, that are shaped complementary to the outer profile of cup 301 and cup lip 301A (See FIGS. 3A-C, and FIG. 4A (exploded view). In this complementary arrangement, it will be understood that cup carrier 600 and respective supporting channels 605A-D support and securely suspend respective cups 301 in a secure manner, preventing unintentional dislodgement. It will additionally be understood that the supporting profiles 606A-D, or respective cup carriers 600, may be provided in a kit or interchangeable form so as to adaptively support and transport diverse cartridges or cups 301, and secure the same for a lid 302 during a pressing process, to be discussed.

As one alternative embodiment of a lid sealing assembly using adhesive or press-fit lids, suspending from a bottom surface of bottom pressing plate assembly 440 is a lid press member 442, formed with an outer shape sufficient to provide a pressing urging force to lip 301A of cup 301 during sealing. In this manner, if a user provides a press-fit-lid 302 or a version of a lid 302 having an adhesive ring, then during a sealing urging step (discussed below) pressure from lid press 442 is applied (discussed below).

Extending from support base 480 is a fully-independent telescopically, spring urged, cup-lifting assembly or cup sealing assembly 700 (see FIGS. 4A, 4B, and 8A, 8B). A hollow plunger tube 701 extends from support base 480 generally radially distant from the three collinear axes 401, 501, 601 and close to, but not engaging a tip end 452 of lever arm 450 in a retracted condition. A plunger 702 is a sliding member and is slidably riding within plunger tube 701, and in a preferred embodiment is springingly secured to the same via a spring 703 so as to be urged into a retracted position between uses (in a non-cup-interfering position).

Extending from a top of plunger 702 is a plunger plate 705 shaped to support a bottom of cup 301 during a lifting-sealing engagement. Optionally extending from plunger plate 705 is a geometry profile 706 that is complementary to the optional recess geometry 303 in the base of cup 301. While not required, and while the inter-fit of geometry profile/recess is helpful for secure sealing, it will be understood, that a variety of different geometry profiles 706 may be provided in a kit form to adapt to differently shaped cups or cartridges 300 and differently shaped recess geometries 303. It will be understood, that plunger plate 705 is positioned in a spring-neutral position below a bottom level of any suspended cups 301 in cup carrier 600 so that cup carrier 600 and cups 301 may pivot without interference therefrom except during a sealing activity (to be discussed). Extending radially away from plunger 72 is a fixed extending plunger hook 704 shaped to have an interfering engagement with top end 452 of lever arm 450 during the sealing.

During a sealing use, a filled cup is in an 'apply top lid' position as shown in FIG. 5B, and a lid is manually applied (but not sealed) to the top thereof, for example via a portal 206A in housing 200. During a further rotation of lever arm 450, cup carrier 600 rotates, preferably in a direction shown by the arrow in FIG. 5B, and the cup 301+lid 302 (loose) is rotated to the 'press to seal' position as shown in FIG. 5B, so that lid press member 442 of bottom plate assembly 40 is directly over lid 302 and cup 201. In this position lever arm 450 is lifted relative to pin 401A (placing top end 452 downwardly) and is urged inwardly to opening 203 thereby aligning pin 401A to ride along slot 451 in lever arm 450 and extend tip end 452 thereof under and engage plunger hook 704. At this point, the opposite end from tip end 452 is depressed, thereby lifting plunger hook 704, and in turn raising plate 705 and engaging the bottom of cup 301B and urging cup 301 upwardly, to make a pressure contact between cup 301, lid 302 and lid press assembly 442 (or lid press member 442). After sufficient pressure is applied the lid is sealed to cup 301 and ready for ejection during a next move by interference with ejection mechanism 207 and outwardly 'cup ejection' as noted in FIG. 5B.

Figure 9A:
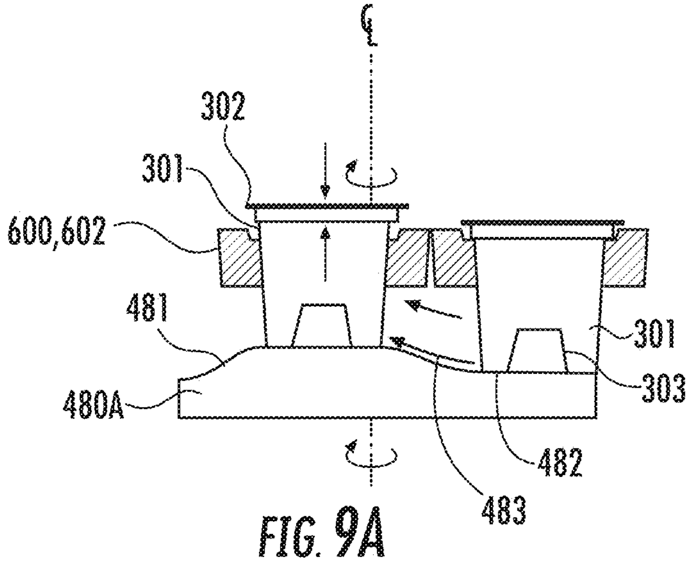
FIG. 9A is an alternative cup handing and sealing arrangement having a guiding contour form on a bottom support element elevated relative to a cup carrier.
Figure 9B:
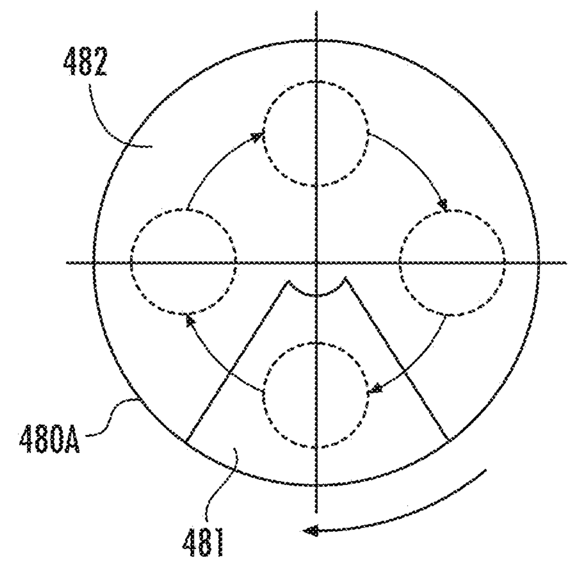
FIG. 9B is a top view of the radially arranged guiding contour on the bottom support.
Figure 9C:
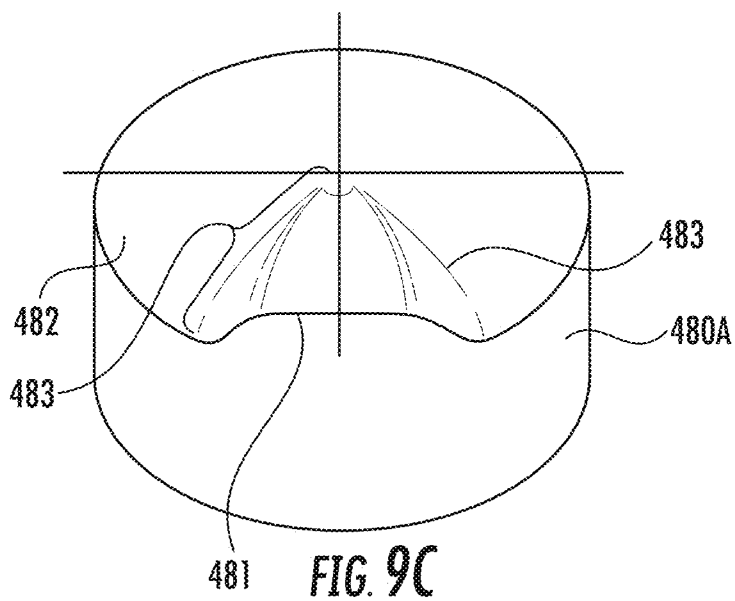
FIG. 9C is a perspective view of the bottom support element in FIGS. 9A and 9B noting the radially arranged guiding contour to lift the cup relative to cup carrier and into a lid sealing contact.

Alternatively referring now to FIGS. 9A, 9B, and 9C, in an alternative arrangement a support base 480A does rotate about a central axis (e.g., support base 480A in this embodiment is not fixed in place relative to the various axes), and is driven in a single directly by a catch-and-spring-prawl arrangement below support base 480A for respective movements of lever arm 450 (back-forth-back-forth). Support base also includes a radial profile wedge shape portion 481 that is thicker (or higher) than the other radial locations having a common level 482 in support base 480A. There is a smooth and slidingly blended transition 483 from the lower common level 482 to the upper level 481. As shown, in this alternative embodiment, cup carrier 600, having cup supporting members 602 (only the ends are shown in sectional view, as along the section cut line in FIG. 4A, and Section view FIGS. 4A-A. As will be understood by those of skill in the art, in this alternative embodiment, during the motion of lever arm 450 (and continuous rotation of rotating support base 480A, cup carrier 600 freely swings, and when raised profile portion 481 is rotated to a cup bottom 301B, cup 301 is raised relative to the prior level at 482, and as a result, a lid 302 placed thereon may be pressed upon by a lid press (noted but not shown herein). As a result, alternative arrangements of the present mechanisms and systems may be provided without departing from the scope and spirit of the present invention and this should be recognized by those of skill in this art.

Figure 10A:
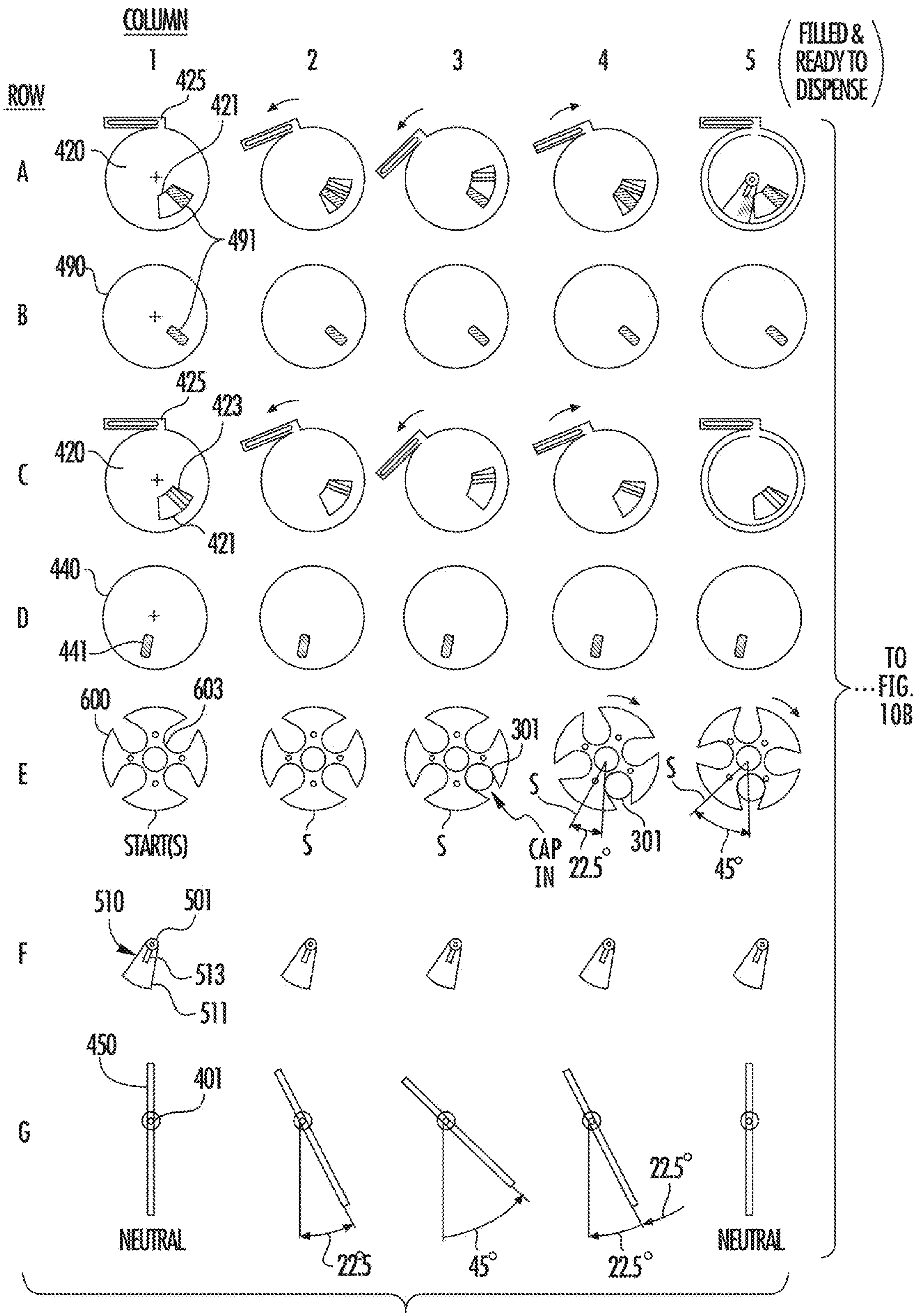
FIG. 10A is an exemplary schematic layout of selected elements and positions in axial alignment in the proposed invention performing a cavity-filling process at specified steps and positions.
Figure 10B:
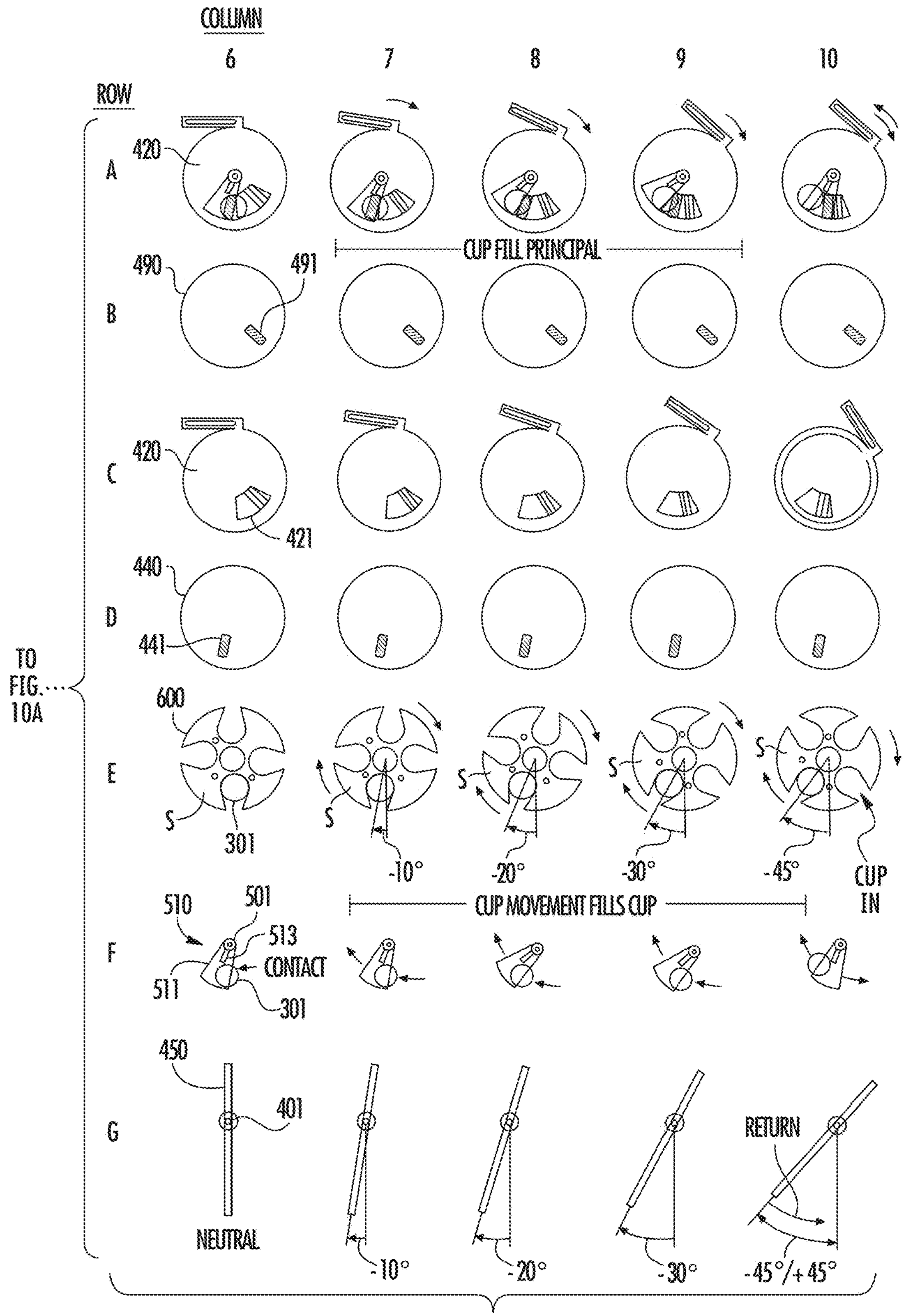

Now additionally referring to FIGS. 10A and 10B the inventive process is discussed in two different operations, (i) filling of fill cavity volume 431 from the holder or reservoir 490, generally noted columns 1-5, and (ii) filling cup 301 with a dispensement from cavity volume 431, generally noted in columns 3-10.

As will be understood by those if skill in the art having studied FIGS. 10A and 10B, that selected elements in the assembly are provided at individual rows B-G, and that row A is a composite exemplary alignment view of the functions and alignment of elements in Rows B-F. As a result, for example, Column 1, Row A, notes the position of opening 491 (but not holder 490), relative to the position of top fill plate 420 and opening 421 in top plate 420 relative to opening 441 in bottom plate 440 and the position of cup carrier 600 with a cup 301 and the position of the trap door assembly 510 with trap door 511 for beverage dispensment.

Row A is a composite view (as noted above). Row B is the reservoir 490 with fixed position of opening 491. Row C is the top plate 420 position which rotates with the lever arm position. Row D is the bottom plate 440 having a fixed bottom plate opening location 441. Row E is the cup carrier position relative to motion for filling and dispensing. Row F is the trap door assembly 510 position relative to being triggered by a cup. Column 1 notes a neutral or center position of lever arm 450.

Generally, in reviewing FIGS. 10A, 10B, in considering the centermost column 401, the right movement of lever 450 to the stops fills cavity 431, then IF a cup 302 is present, the leftward movement of lever 450 from the right to the center (neutral) functions to trigger trap door 511 and deposits the beverage from fill cavity 431 into cup 301. In a separate step, when lever 450 is aligned, guides allow vertical lever movement to seal cup 301 in the opposite rear position (depending upon the rotation—it be understood that any of the actions may occur in other rotational arrangements without departing from the scope and spirit of the present invention. The down stroke of lever 450 also pushes down the spring loaded hinged dog 513 that activates trap door 511 and provides clearance to move past the existing cup and return trap door 511 to the closed position now that fill cavity 431 is empty.

Regarding the second central concentric column 501, when a cup 301 is present, the dog 513 contacts cup 301 and rotates as the cup is indexed rotationally. This movement shifts trap door 511 in bottom plate 440 allowing beverage component (powder, granular) to fall through hole 441 into cup 301. The cup carrier 600, filler cavity 431, and trap door 511 move together exposing the full base of the fill cavity 431 to cup 301 allowing all product to fall into cup 301. In the left most position now, the downward movement of lever 450 allows hinged dog 513 to clear the cup and the spring loaded trap door assembly 510 resets and closes in position, closing cavity volume 431 for the next index operation. If a cup 301 is not present, dog 513 is not activated, and trap door 511 remains closed, preventing spilling.

Regarding the third central concentric column 601, as lever 450 moves rightwardly, the cup carrier 600 remains in position as the back of a hook 610 fixed external to cup carrier 600, and retains the same, and rides on the circumferential surface 611 of cup carrier 600, having a series of one-directional grooves 612 shaped to engage hook 610 to allow rotation of cup carrier 600 in a single direction (e.g., there is a ratchet-or-pawl arrangement to allow single-direction-rotation).

As noted in FIGS. 10A-10B, each column typifies a significant position of the lever 450 in a cup fill process. While the top plate assembly 420 typically moves from the leftmost to the right most position, the cavity 431 fill and cup 301 insert (Col. 3, Row E) operations are mutually exclusive and occur as lever 450 moves from the center (neutral position) to the right most (FIG. 10A) and then to center (neutral) and then to the left most (FIG. 10B) position respectively before returning to a center (neutral position). The beverage volume 490 and hole 491 (Row B) with bottom fill plate 440 and opening 441 (Row D) do not move as they are part of the fillers structures.

The lever 450 position (Row G) is fixed to the fill cavity assembly 460 and the components move radially together. For simplicity the cup-fill step is shown in a maximum volume configuration (e.g., dam 422 is moved openly to maximize a volume of fill cavity 431), however it will be understood by those of skill in the art that an infinite degree of 'fill volume' may be dictated by the present invention via adjustment of the fill volume itself. For lesser fill volumes, the top plate assembly 420, and related adjustment arm 425 and slot 426 and dam 422 are adjusted.

The cup carrier 600 (Row E) and trap door assembly 510 (Row F) move independently from each other and their specific movements are described herein, and below, as needed.

The movement from the center position of lever 450 to the right, fills cavity volume 430, and for simplicity the operation of filling the cavity 431 from the center to the right most position, and return to the center (of lever 450) will only show the fill operations on the composite row (Row A, Cols. 1-5) the cup-fill and deposit procedure (Cols. 3-10, and principally Cols. 7-9 as cup movement is shown). As a result, the simultaneous fill operations will not be shown in the composite Row A in Cols. 6-10.

As will be discussed below, there are cavity fill process steps, and cup filling process steps.

Process Steps for filling dispensing cavity 431 with material includes: In Col. 1, the reservoir enclosure hole 491 is over the top plate 420 and dam 422 of fill cavity 431 and no material can enter cavity 431. In Col. 2, with rotation 22.5 of lever 450 degrees to the right, the open cavity 431 space is directly under the volume hole 491, and the size of the hole 421 will allow the material to fall freely through hole 421 into cavity 431. In Col. 3, with lever 450 rotated an additional 22.5 degrees (total of 45 degrees to the left) the left edge of open cavity space 431 is directly under the dispensement hole 491 and this position assures the full cavity 431 is exposed directly to the fill hole 491. In Col. 4, the lever 450 returns 22.5 degrees to the left, and cavity 431 makes a second pass under fill hole 491 assuring there is a full-capacity fill. In Col. 5, the lever is returned to the neutral position and the enclosure hole 491 over plate 420 and dam 422 covers the enclosure hole 491 with the fill cavity assembly 460 (top plate assembly 420 and fill plate assembly 430), stopping the cavity fill process. In FIG. 10A, the bottom plate 440 hole 441 and trap door assembly 510 has been shown to confirm the independence of the cavity 431 fill process and cup 300 fill process operations.

In the cup 300 fill process, in Col. 3 when the lever is at a 45 degree rightmost position, a cup 300 is inserted into cup carrier 600, and similarly a filled cup (not shown) is in the left-most-position and a lid 302 may be placed on the cup 301. As discussed elsewhere in FIG. 5A, a barbed hook 610 with a spring (not shown) engages a series of one-directional stop grooves 612 so that cup carrier 600 rotates in a continuous direction. In Col. 4., with lever 450 returning 22.5 degrees to the left and Row E/Col. 4 shows movement of cup carrier 600 and cup 301 as the lever 450 rotates, and in Row E/Col. 5, the lever is returned to center/neutral, and the cup 301 is rotated and engages dog 513. IN Row F, col. 6, the cup 301 contracts trap door dog 513 and any movement beyond this center position will force dog 513 and trap 511 to rotate and uncover cavity opening 441, allowing the material to fall into cup 301. In Col. 7, lever 450 is moved 10 degrees left of the center position, and in Col. 7/Row A, the dog 513, triggers the uncovering of cavity 431 and initial dispensing through opining 441. In Col. 8, lever 450 is moved 30 degrees leftwardly and in Row A/Col. 8 the uncovering of the fill hole 431 continues fully. In Co. 9, lever 450 is moved 30 degrees leftwardly and Row. A/Col. 9, dog 513 engages cup 301 fully continuing to fill cup 301 (presuming cavity 431 is full). In Col. 10 lever 450 is moved fully 45 degrees leftwardly, and the trap door dog 513 is passed engagement, and will be pressed down allowing it to pass the wall side of cup 301, and so trap door 511 swings back to cover opening 441, and dog 513 also springs back to position to contact readiness for the next cup 301 on cup carrier 600. Thereafter, an inward, or downward motion of lever 450 engages cup sealing system and plunger hook 704 to lift cup 301, with a lid 302 loosely placed, into a sealing contact with the cup 301, and the initial next-movement (Col. 2) urges cup 301 to ejection mechanism 207 and outwardly for ejection.

It will be understood by those of skill in the art that the elements and features as discussed herein may be adaptively described as being in a cartridge or cup handling system or cartridge or cup filling system or in a cartridge or cup housing member without limitation thereto. Therefore, as a non-limiting example, a cartridge handling cup supporter may also be understood to be a cartridge filling cup supporter, in that the cup supporter functions and operates as discussed herein without limit to how grouping of purpose is described.

Additionally, referring now to FIGS. 11 to 39, and in particular details hereafter, an alternative embodiment of the present invention. A system for preparing beverage cartridges 1000 includes a frame assembly 1400, a cartridge filling system 1500 and a cartridge handling system 1600.

Cartridge handling system 1600 further includes a movement guide system 1700, a motion system 1800 for moving the movement guide system 1700, and a sealing system 1900 for sealing a cartridge 300 therein. Movement guide system 1700 includes a rotational support assembly 1750. Motion system 1800 incudes a pivotable and displaceable handle assembly 1850 for operating the motion system 1800 and trigging a sealing press assembly 1950 in sealing system 1900.

Cartridge filling system 1500 includes a portion dispensing system 1550, well as a fillable container 1501 having a cover lid 1502 with a lift handle 1502A. A dispensing guide 1503 extends from an opening 1401B of top support portion 1401, as shown, shaped to guide a dispensed portion from the fillable container 1501 to cartridge 300, as will be discussed. Dispensing guide 1503 has a wider opening at one end fitting to opening 1401B, and a narrower opening at a distal end to provide accurate dispensement.

Fillable container 1501 is shaped to have an outer wall 1501A that meets with an upper portion of top support portion 1401, as shown to provide support. Internal to fillable container 1501 is a container portion 1504 that has a wide opening (as shown) and a narrow dispensing portion (as shown) so as to guide a dispensable brewing component toward dispensing guide 1503. As shown, the narrowing geometry is off-axis to the system 1000 to provide operational benefits, but nothing herein so restricts the geometry of the components. A support extension 1505 extends for contact with the top support portion 1401 to provide unitary support as well as via the rim-edge contact. At the bottom of support extension 1505 is a lock head 1506 that has a larger dimension. Additionally, referring now to FIG. 16, and top support portion 1401, a supporting guide slide 1401A that is raised in a curved form (as shown) and includes a guide groove 1401B dimensioned to receive support extension 1505 and lock head 1506. During assembly, lock head 1506 enters a wide portion of guide groove 1401B and fillable container 1501 is rotated so as to force lock head 1506 along guide groove 1401B to lock fillable container 1501 to top support portion 1401 in a secure manner to prevent unintentional dislodgement. E.g., Fillable cartridge 1501 may be pivoted/rotated relative to top support portion 1401 for engagement and disengagement and is also reliably and repeatably aligned for dispensing into dispensing guide 1503. As will be noted later below, supporting guide slide 1401A is received in a receiving groove in portion dispensing system 1550 during a rotation thereof.

Frame assembly 1400 includes a top support portion 1401, a base support portion 1402, a support bridge 1403 spacing between the two, and an outer cover wall 1404, all shaped as shown.

Base support portion 1402 includes, upon assembly a partial base shield 1405 to catch any loose materials. Support bridge 1403 is shaped as shown (FIG. 17) and includes a support bridge portion 1403A, an extension press portion 1404B (which is part of the sealing system to be discussed) and which extends as shown to provide a rigid surface 1403C for lid-pressing, as will be discussed. A cover support bridge cover portion 1403D provides a convenient and attractive cover for operational components as will be discussed herein and below and provides additional stability when mated with base support portion 1402 (FIG. 22) via a plurality of screw openings 1402B. Support bridge 1403 additionally includes one or more connection locations 1403C', 1403C", and others, to enable operable engagement with cartridge installation and ejection operations, as well as other lift/press and rotate operations as will be discussed.

Base support portion 1402 includes an extending guide 1402A projecting upward as a flange about a central pivot axis, as shown, to provide additional guiding support for operation, as will be discussed. A sealer pivot link 1402C extends upwardly therefrom for engaging with a pivot mechanism 1952 of a sealer link 1951 (see FIG. 22) having sealer link arms 1953, 1953.

Portion dispensing system 1550 incudes interlinked components operable to receive an operation and dispense a brewing component to a cartridge 300, as shown.

Figure 12:
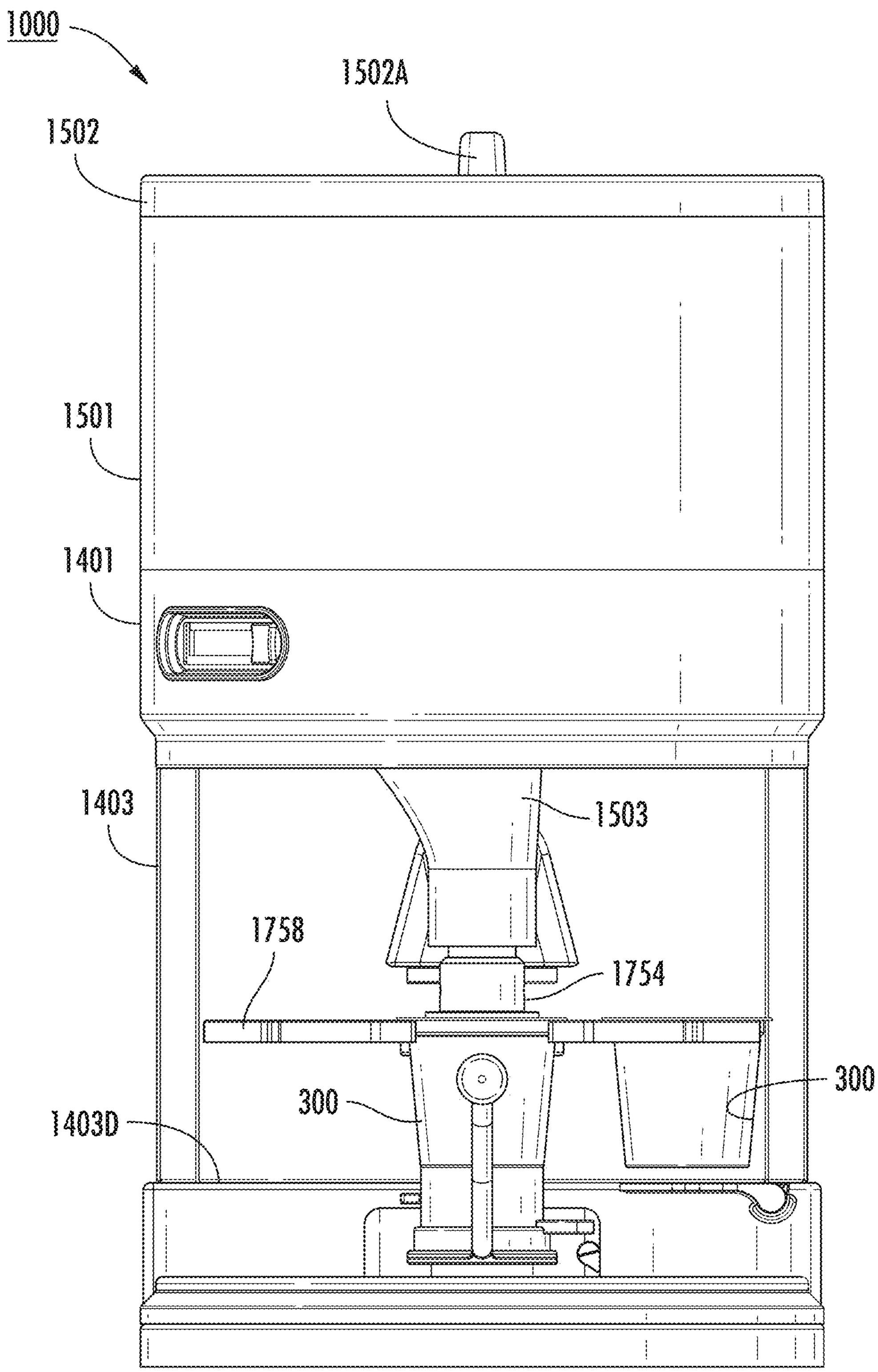
Figure 16:
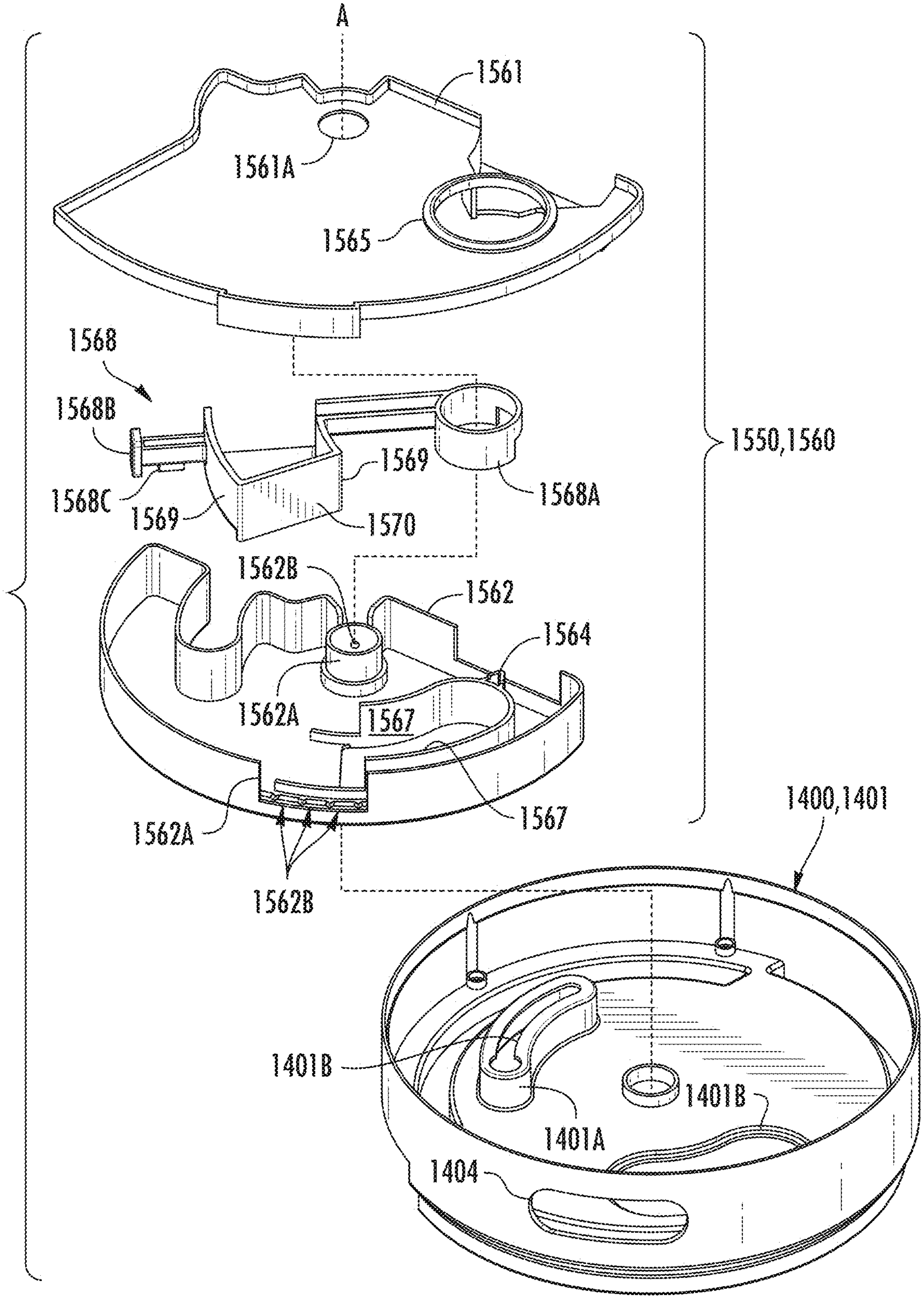
Figure 37:
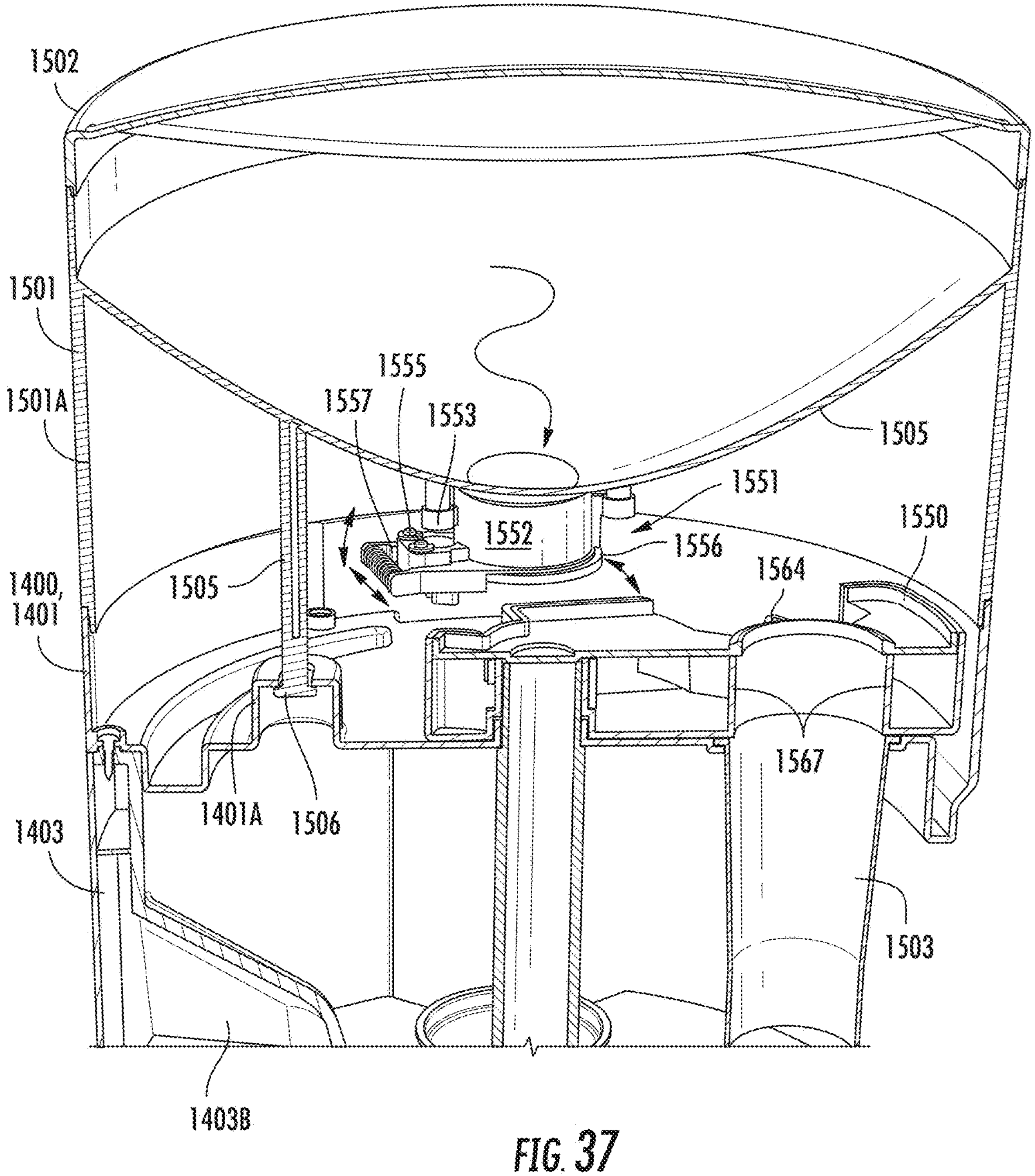
Figure 38:
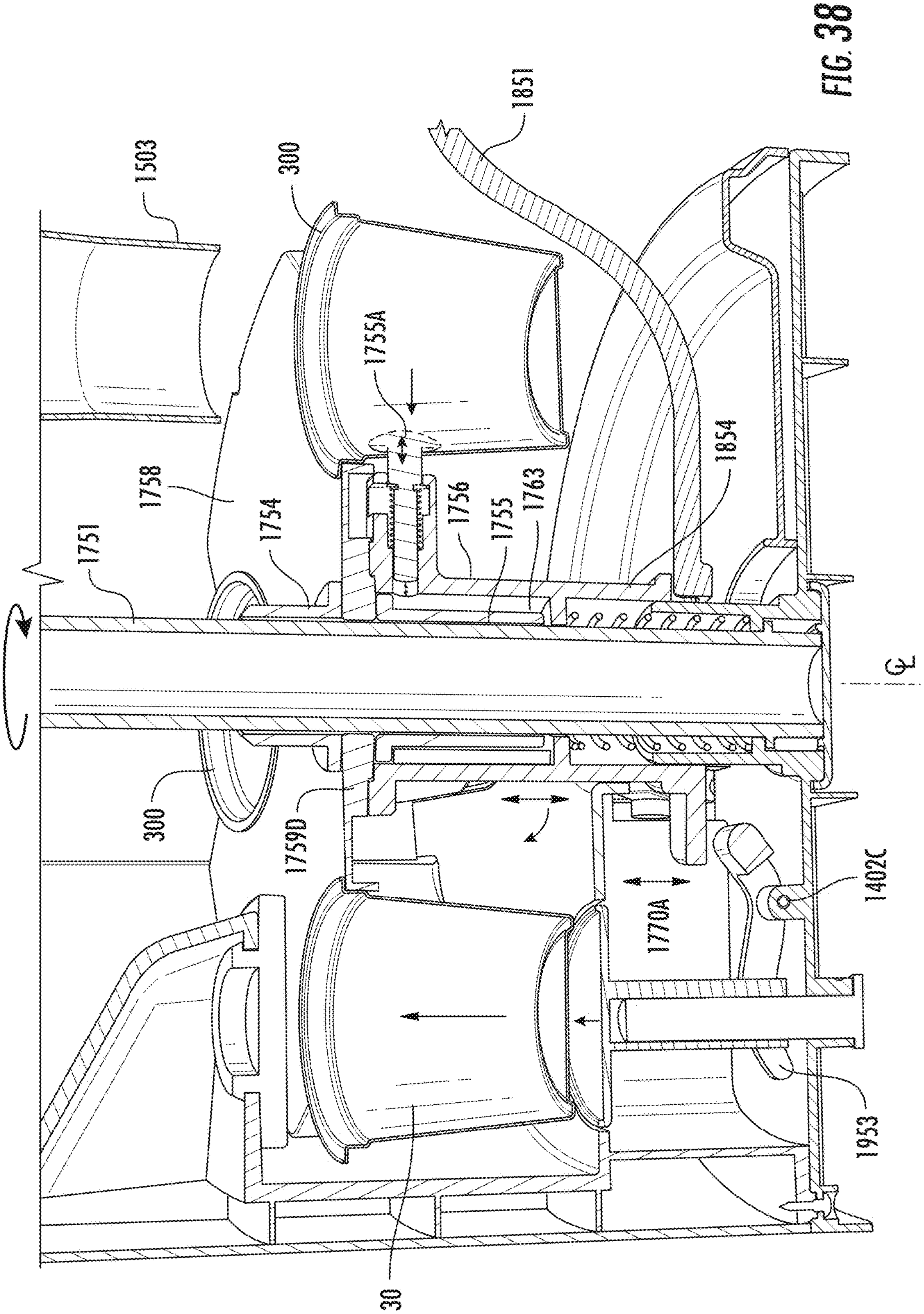

Portion dispensing system 1550 includes a dispensing door flange assembly 1551 positioned suspending from fillable container 1501 in top support portion 1401 when assembled (see FIGS. 12, 16, and 37). Dispensing door flange assembly 1551 includes a flange member 1552, positioned and secured to the bottom portion of fillable container 1501. Flange member 1552 includes a passthrough opening, and on each side is a securing member 1553, 1553 for securing to fillable container 1501 (See FIGS. 15, 37). Also, on flange member 1552 are pivot mounts 1554, 1554 to pivotably receive respective pivot pins 1555, 1555 of respective swing doors 1556, 1556, as shown. A spring 1557 is positioned between mounts on respective swing doors 1556, 1556 and provides an urging closing force therebetween, so that a rest-condition is a closed condition. At the tip ends of respective swing doors 1556, 1556 are respective angled surfaces 1558, 1558, which when closed, form a receiving groove 1559 therebetween (see FIG. 30A).

Portion dispensing system 1550 includes a portion carrier assembly 1560 (see FIG. 16) having a top plate member 1561 and a bottom plate member 1562 that are fit together about the central axis A through respective openings 1561A and a fixing flange 1562A, as shown. Top plate 1561 includes an opening 1561 on the top thereof, which is slidably alignable with the opening in flange member 1552 during use. Opening 1565 is above an opening profile 1566 formed in bottom plate 1562 such that upon assembly opening profile 1565 is directly above and aligned with a perimeter portion of opening profile 1566. Opening profile 1566 also includes guiding side walls 1567, 1567 on either side thereof to sliding receive cooperative sliding side walls 1569, 1569 of a pivotable portion controller 1568 (shown).

Portion controller 1568 includes a pivot ring 1568A that pivots on fixing flange 1562A and pivots freely there about relative to portion carrier assembly 1560 and bottom plate 1562. A volume indicator tab 1568B is slidable within an indicator window 1562A formed on bottom plate 1562. A plurality of volume indent indictors (indents) 1562B at the bottom of indicator window 1562A releasably engage with an engagement leg 1568C extending from portion controller 1568. As a result of this construction, a user may flex the arm extending from portion controller 1568, position leg 1568C at a suitable portion selection indent indicator 1562B and this pivots portion controller 1568 relative to the inner surface of bottom plate 1562 so as to slide sliding walls 1569, 1569 within respective side walls 1567, 1567, and define a portion volume between a front wall 1570 and the arcuate curved section joining respective side walls 1567, 1567 forming a bounding volume. In this manner, a volume is contained by the portion carrier assembly 1560 of the portion dispensing system 1550.

The profile of portion carrier assembly 1560 of portion dispensing system 1550 is shaped to accommodate pivot motion relative to central axis A, as shown. Fixing flange 1562A includes a fixing pin 1562B for fixing to a central driving member to be discussed below upon assembly. A receiving groove 1563 is shaped to be slidably guided to receive supporting guide slide 1401A on top support portion 1401, as shown. A wedge profile 1564 is formed on a *nexus* of side walls 1567, 1567 where they joint. During a use, as portion carrier assembly 1560 in toto pivots relative to axis A and fixing flange 1562A, wedge profile 1564 is rotationally driven in an arc so as to engage receiving groove 1559 of dispersing door flange assembly 1552 and slide along angled surfaces 1558, 1558 and drive swing doors 1556, 1556 away from each other about pivot pins 1555, 1555 to open the doors, and release a brewing component from fillable container 1501, through flange member 1552, past swing doors 1556, 1556 and into the bounding volume within portion carrier assembly 1560.

An access window 1404 formed in top support portion 1401 receives the indicator tab 1568B of portion controller 1568. A snap fit window rim 1405 includes an inner opening 1406. Snap fit window rim 1405 is positioned in access window 1404 to provide an attractive appearance and to seal access window 1404 from unintended debris accessing the inner portions of top support portion.

Cartridge handling system 1600 includes a combination of components and assemblies. Movement guide system 1700 enables relative motion pivotably about central axis A and transmission of relative driving and operational forces during a use to achieve the goals of the invention. Rotational support assembly 1750 in movement guide system 1700 includes a center pivot post 1751 bounding pivot axis A, and pivoting, at a bottom, about a post end cap 1752, supported on a busing 1753 bounded within base support guide ring 1402A on support base portion 1402 (see FIGS. 22, 13, and 14). At a mid-portion (see FIGS. 12, 35, 36) of pivot post 1751 is a fixed upper collar 1754 that secures a cartridge member, to be discussed. As noted earlier, a top-portion of pivot post 1751 engages with fixing flange member 1562A of bottom plate 1562 of portion carrier assembly 1560 so that, when pivot post 1751 is rotated, to also drivingly rotate portion carrier assembly 560 about rotation axis A during a use so as to pick up and carry a dispensed portion of the brewing component. Since top plate 1561 and bottom plate 1562 are fixed together, portion carrier assembly 1560 will rotate relative to axis A, while simultaneously, portion controller 1568 is relatively fixed in position within portion carrier assembly 1560 so that a dispensed portion in said bounded volume is rotated with portion carrier assembly 1560 from a position of initial portion dispensment (proximate dispersing door flange assembly 1551) to a position of final portion dispensment (proximate opening 1401B and dispensing guide 1503).

Figure 13:
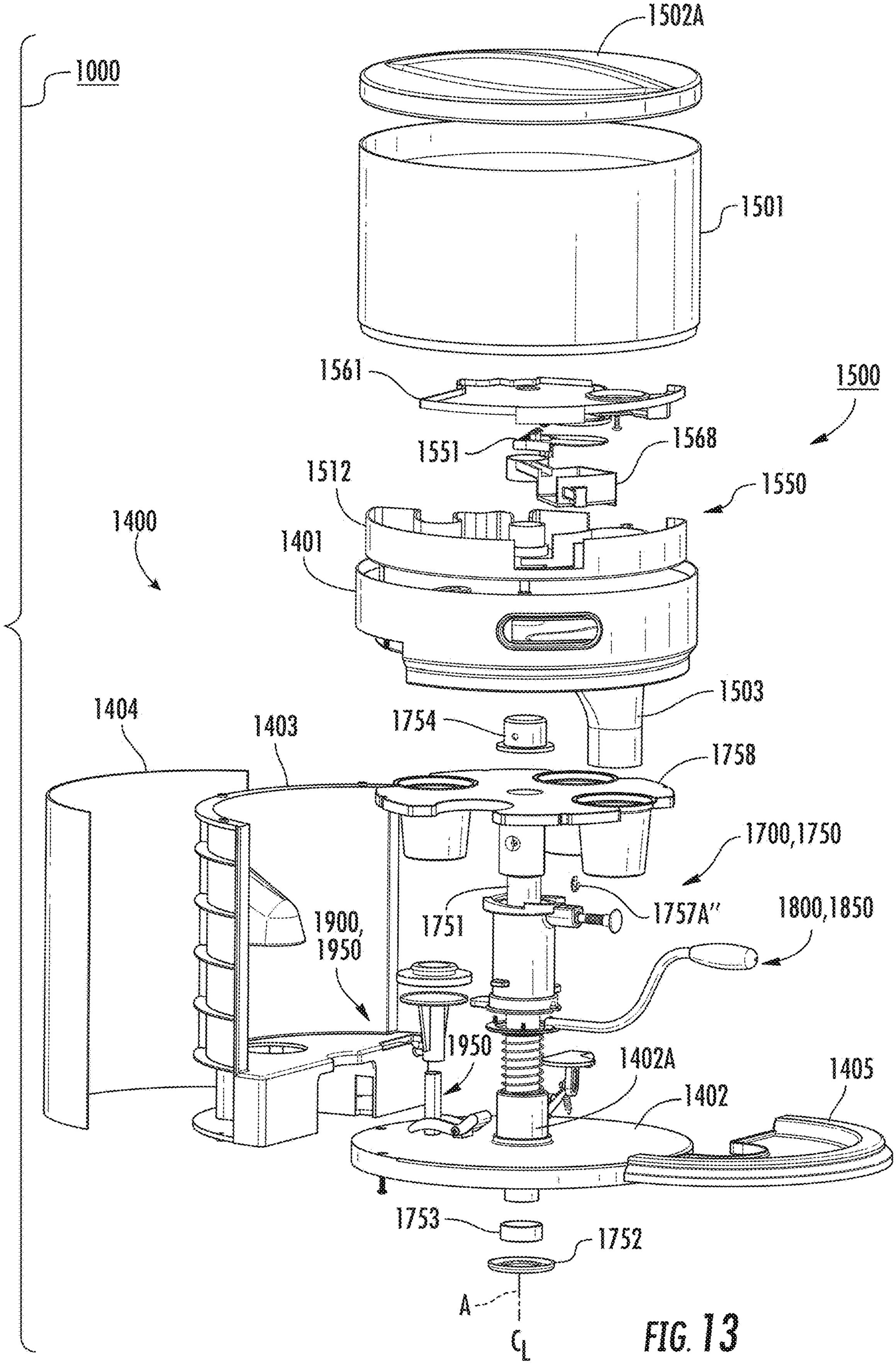
FIGS. 13 and 14 illustrate perspective exploded views of the components of the alternative embodiment shown in FIGS. 11, 12.
Figure 14:
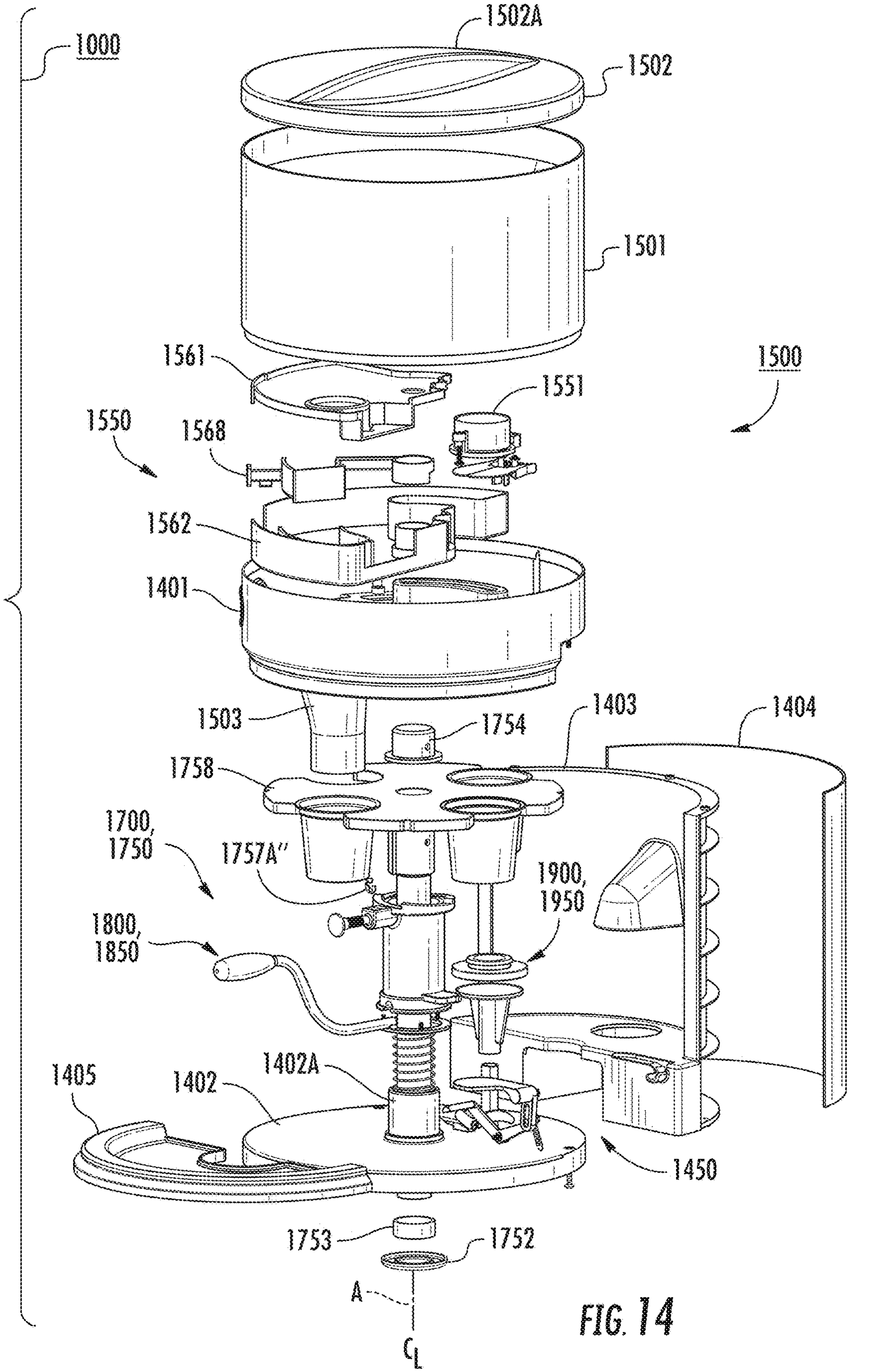
Figure 15:
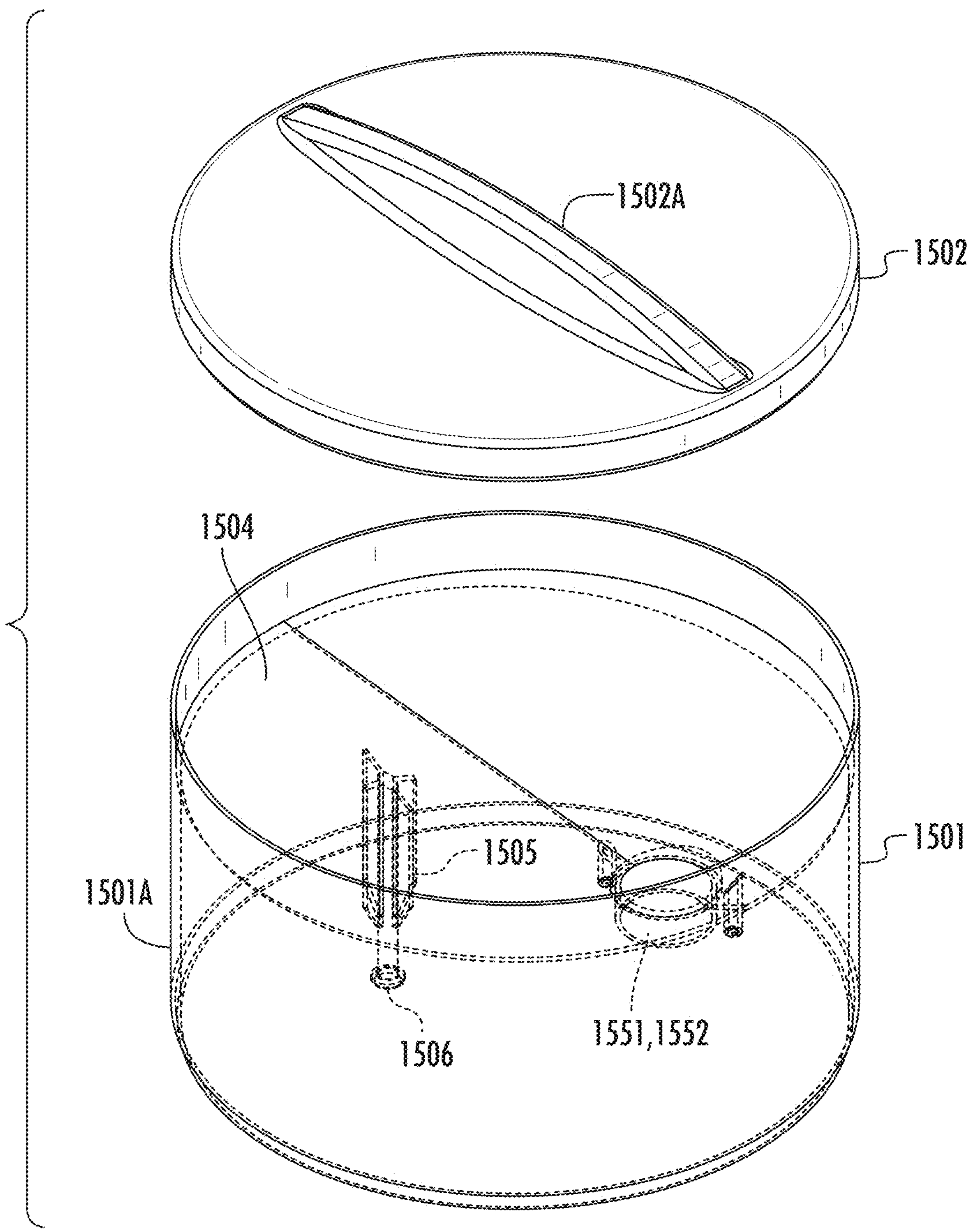
FIGS. 15 to 27B illustrate components and assembly features of the alternative embodiments shown in FIGS. 11, 12.

Positioned about pivot post 1751 is also an inner lower collar 1755 that has an outer profile edge 1755A with an engaging lip 1755B. An engaging opening 1755C is formed in outer profile 1755A and is shaped to receive a portion of a trigger member 1757A (FIG. 26A), or 1775B (FIG. 26B) (pin trigger member 1757A with a trigger spring 1757A' (see FIGS. 13, 38) or hinge trigger member 1757B (see FIG. 31B)). In FIG. 13, there is a pin trigger retaining collar 1757A". Inner lower collar 1755 is secured to central post 1751 but not to a rotation carrier 1758. Inner lower collar 1755 rotates freely within an indexer 1756 as rotation carrier 1758 rotates until engaged by a trigger member. Inner lower collar 1755 engages selectively the rotation carrier 1758 and indexer 1756 when a trigger member 1757A, B is engaged between indexer 1756 and lower collar 1755 forcing a co-rotation with the center post 1751, which in turn moves portion carrier assembly 1560, as discussed.

Figure 27A:
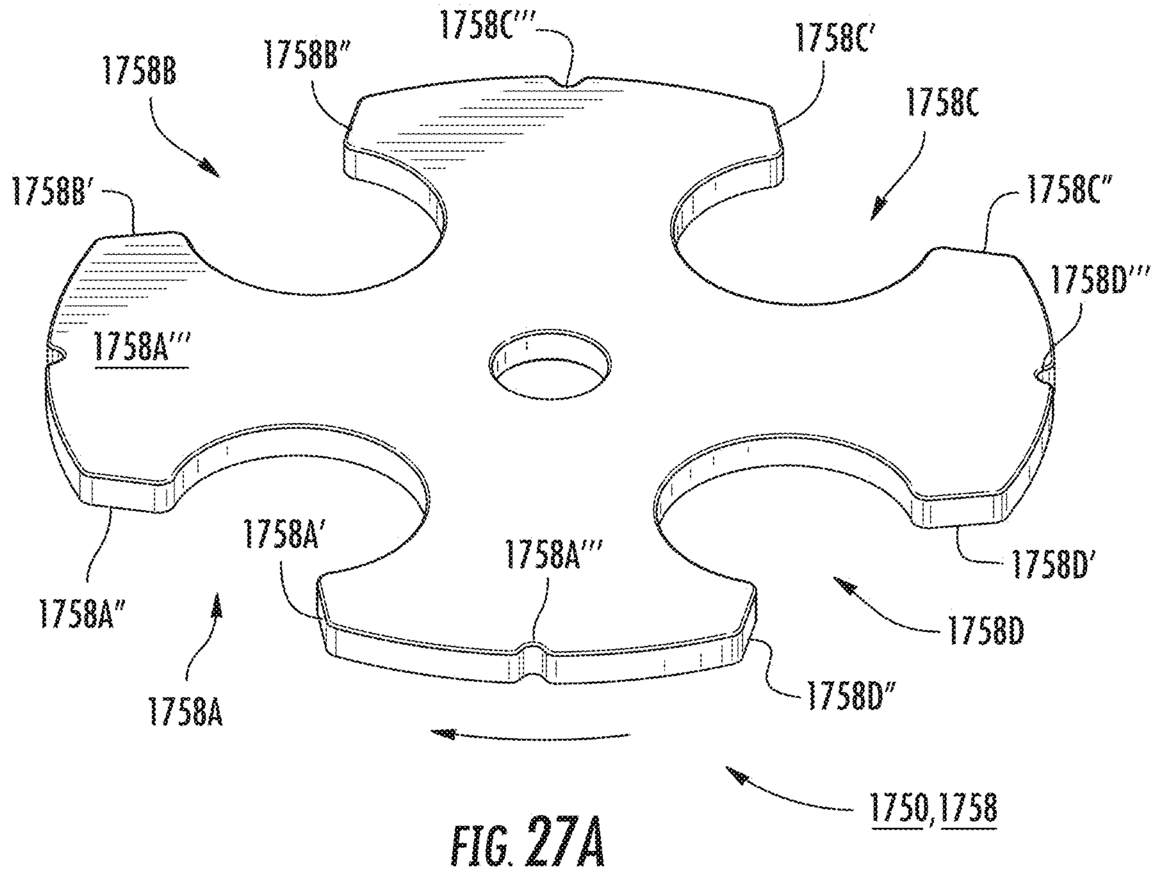
Figure 27B:
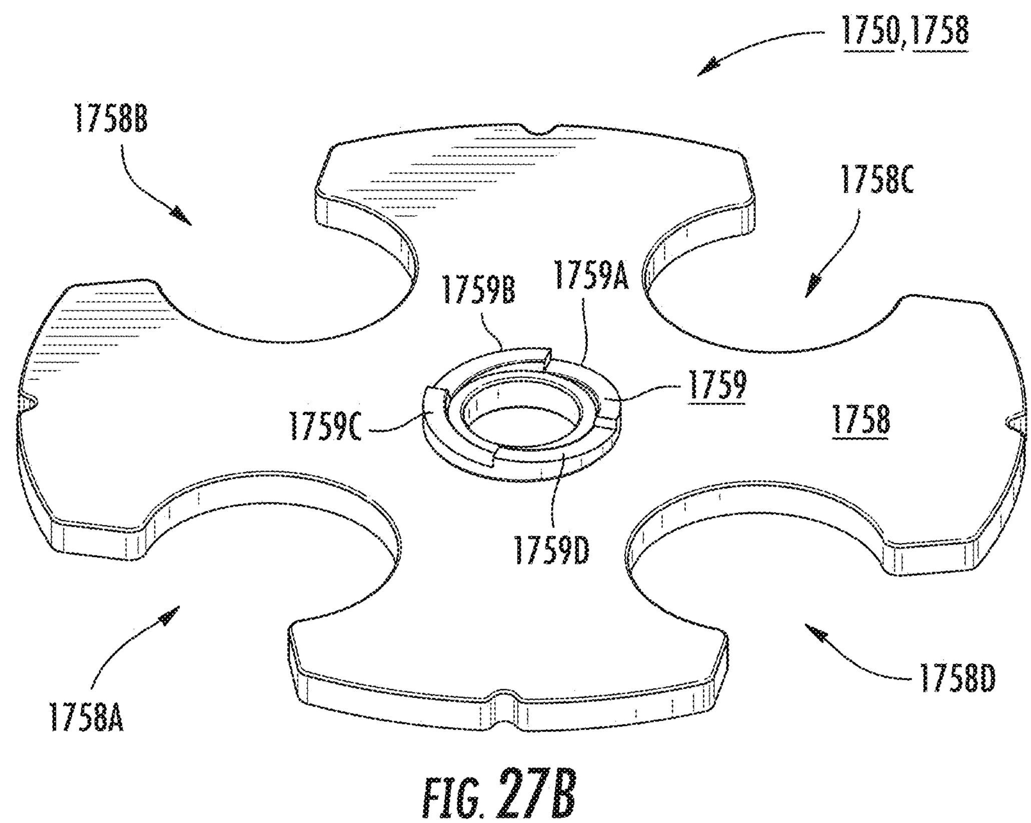
Figure 28A:
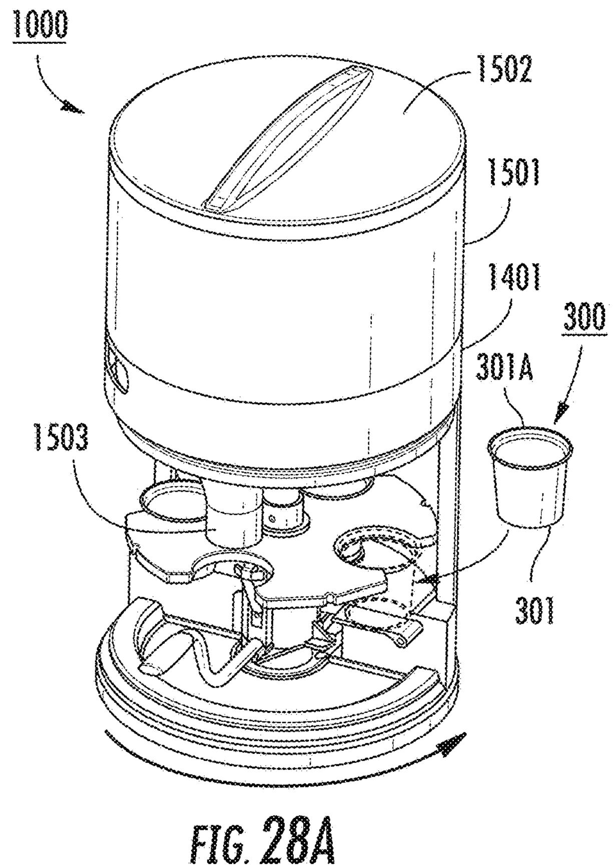
FIGS. 28A to 39 illustrate adaptive functional operations and features of the alternative embodiments of the inventions shown in FIGS. 1 through 39. It will be understood that individual components, assemblies and portions of the embodiment shown in FIGS. 11-39 may be combined with and modified to include portions of any other element, component, assembly or portion noted herein.
Figure 28B:
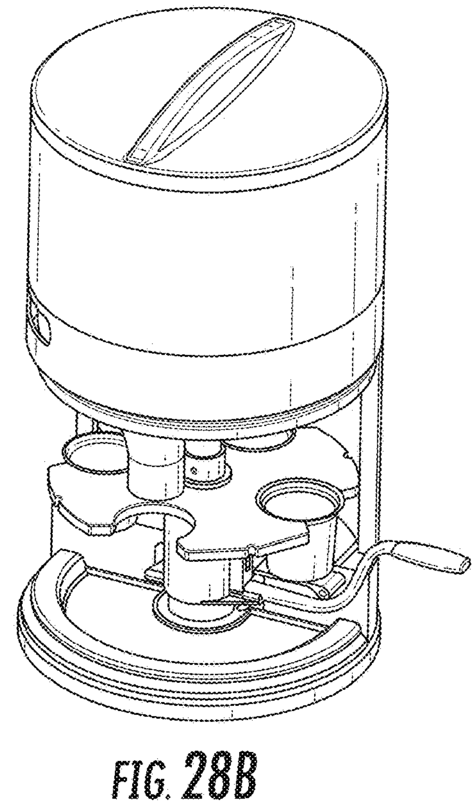
Figure 28C:
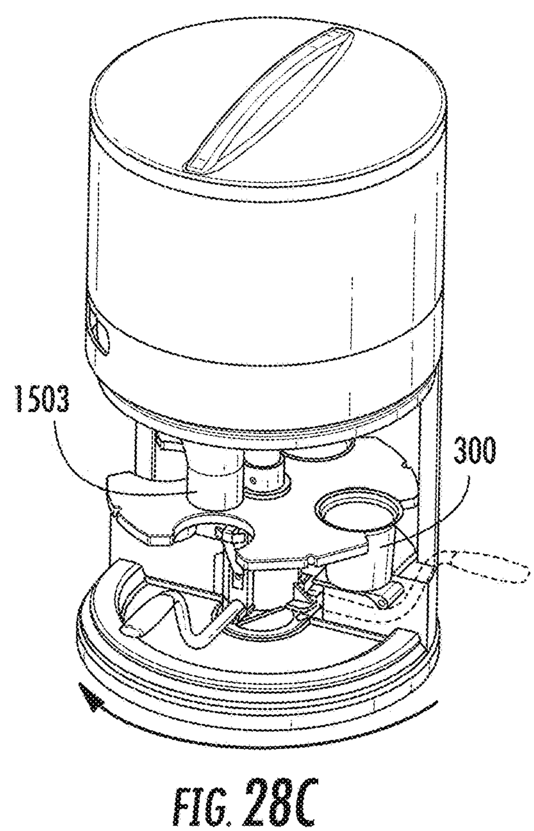
Figure 28D:
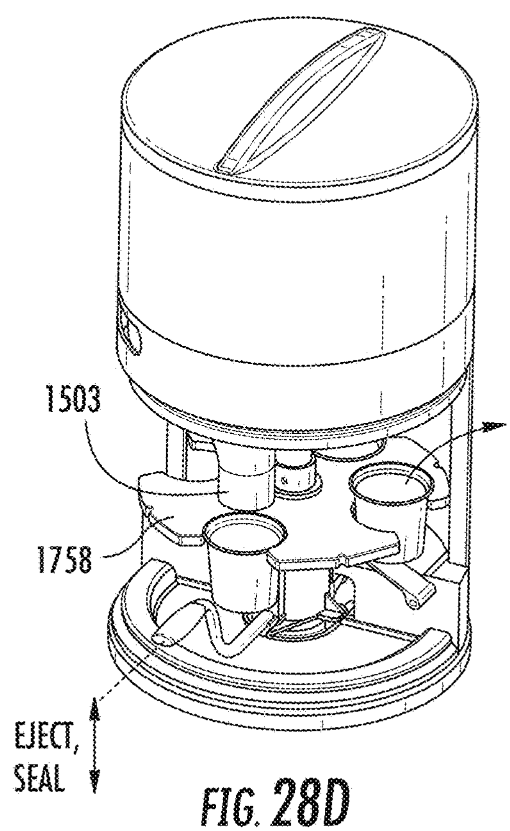
Figure 29A:
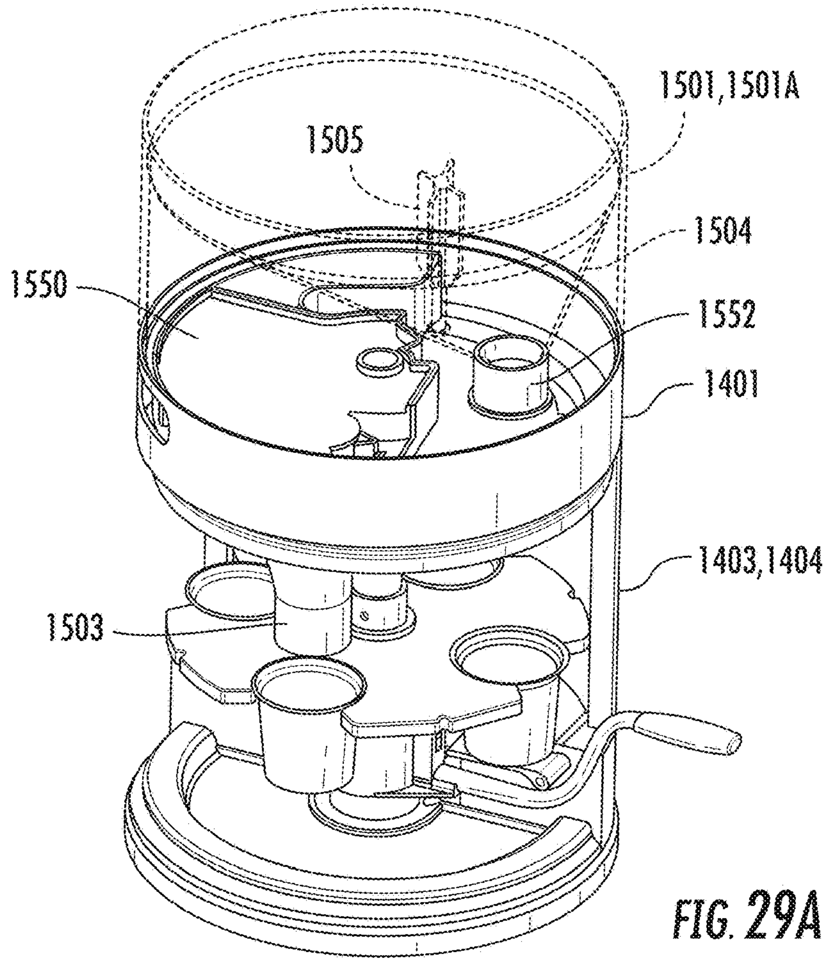
Figure 29B:
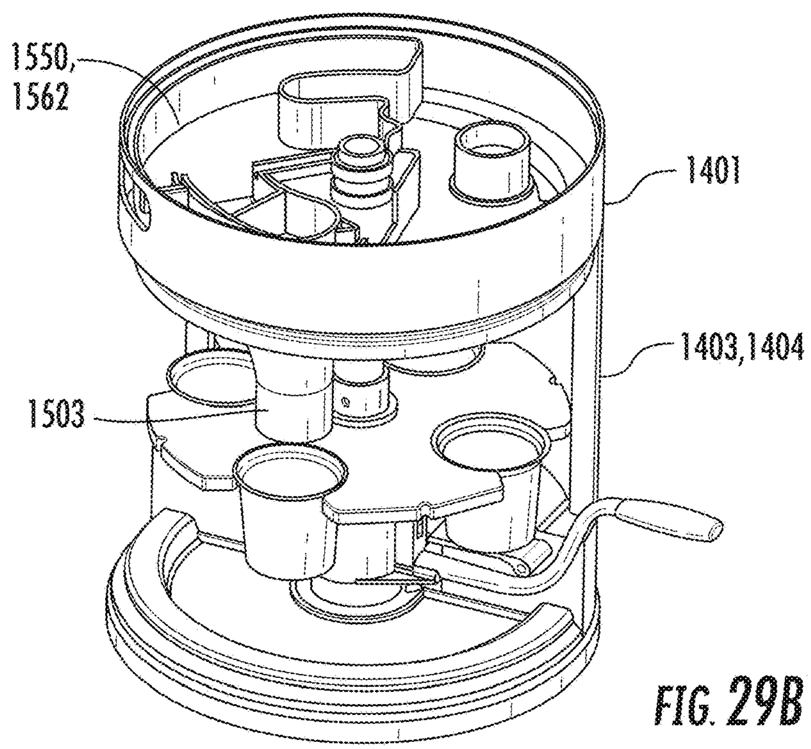

FIG. 27A shows a top view of a rotation carrier 1758 and FIG. 27B shows a bottom view of rotation carrier 1758. A rotation carrier 1758 (FIGS. 27A, 27B, and other) includes a plurality of beverage cartridge receiving portions 1758A, 1758B, 1758C, and 1758D (or more or less) and is fixed to center post 1751 between upper collar 1754 and lower collar 1755 as shown (see FIGS. 35, 36). Each receiving portion 1758A, B, C, and D is shaped with an inner profile to match a portion of an outer profile of a beverage cartridge 300 so as to securely retain the same. Multiple respective access lips 1758A', 1758A" etc. through 1758D', 1758D" are angled relative to each receiving portion to allow an easy entry and removal of beverage cartridge 300 during operation. At an outer position along rotation carrier 1758, between each respective receiving portion is a respective recess 1758A"', 1758B"', 1758C"', and 1758D"', as shown. Respective recesses allow easy manual manipulation of rotational carrier 1758 for alignment, unsequenced removal and as desired by a user.

On a bottom surface of rotation carrier 1758 (see FIGS. 27B, 31A-31D, and 39) is a step gear arrangement 1759, containing a plurality of curved ramps 1759A, B, C, and D (or more) about the central opening for center post 1751. Each respective curved ramps 1759A, B, C, and D of step gear arrangement 1759 slidably engages and disengages with corresponding curved ramps 1760A, 1760B, 1760C, and 1760D of a corresponding curved step gear arrangement 1760 on indexer 1756 (see FIG. 23 and FIG. 31A-31D). As a result, during a use, indexer 1756 may engagingly drive, and rotate, relative to rotation carrier 1758 so that motion system 1800 and pivotable and displaceable handle assembly 1850 may drive cartridge handling system during a user.

Indexer 1756 includes step gear arrangement 1760 about an upper end thereof about center post 1751. At a distal bottom thereof is a bearing surface 1761 that allows a movement relative to a ring member 1852 extending from a handle member 1851 of pivotable and displaceable handle assembly 1850 (see FIGS. 23, 35, 36).

Indexer 1756 includes an engagement notch 1762 in an outer wall thereof to engage with a link portion 1853 of handle 1851. As will be understood, opposed side walls of notch 1762 engage link portion 1853 so that a rotational motion of handle 1851 also drives a rotational motion of indexer 1756. As indexer 1756 is engagable with the step gear arrangement to rotation carrier 1758, handle 1851 also drives rotation carrier 1758 rotationally.

An inner wall of indexer 1756 includes an inner ring 1763 (See FIG. 39, 38, 36) that receives a spring 1854 surrounding center post 1751 on an outer ring 1751A of center post 1751. Spring 1854 urges indexer 1756 (and handle 1851) upwardly into a step-gear engagement position with rotation carrier 1758.

Figure 23:
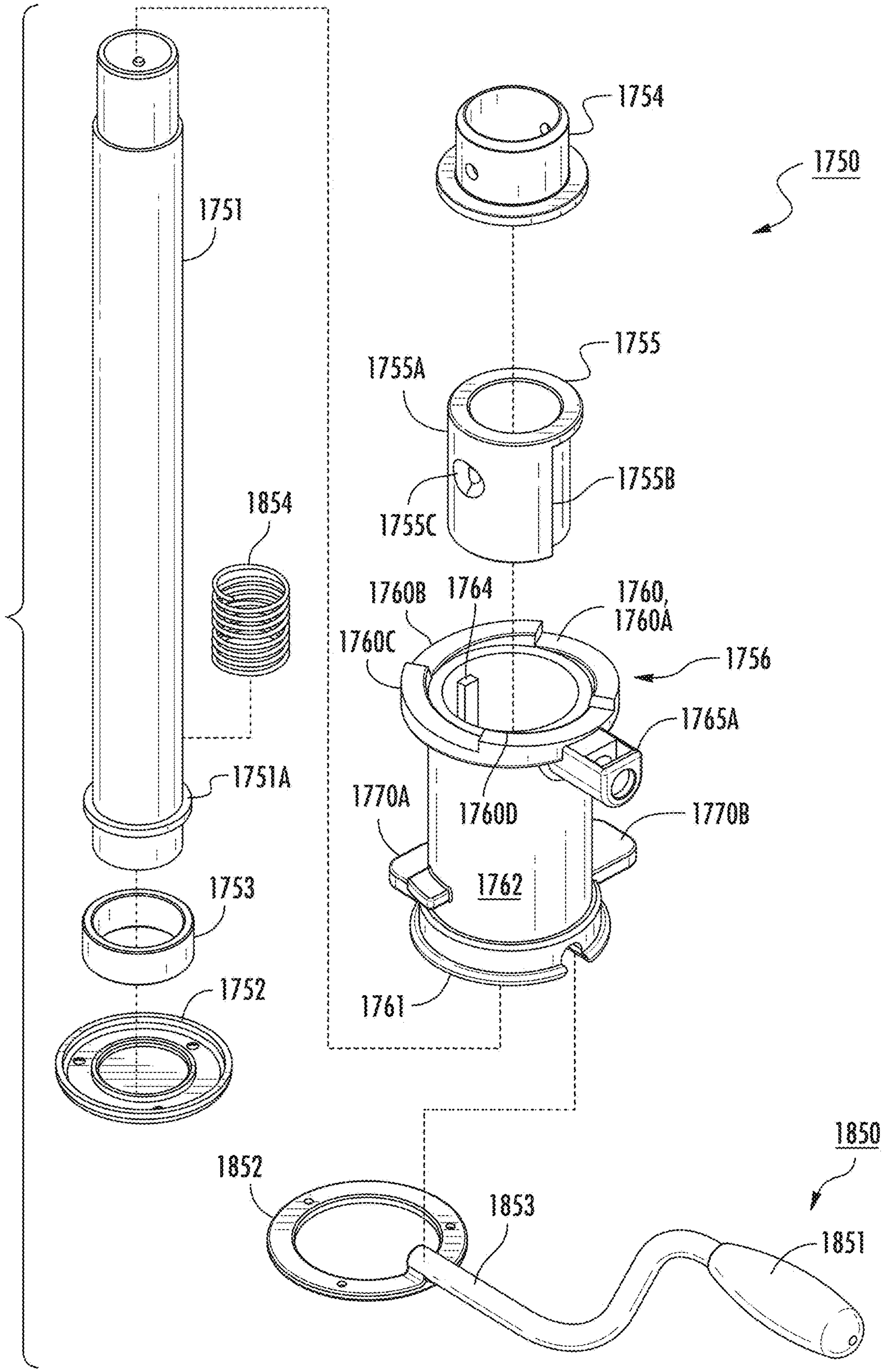
Figure 24:
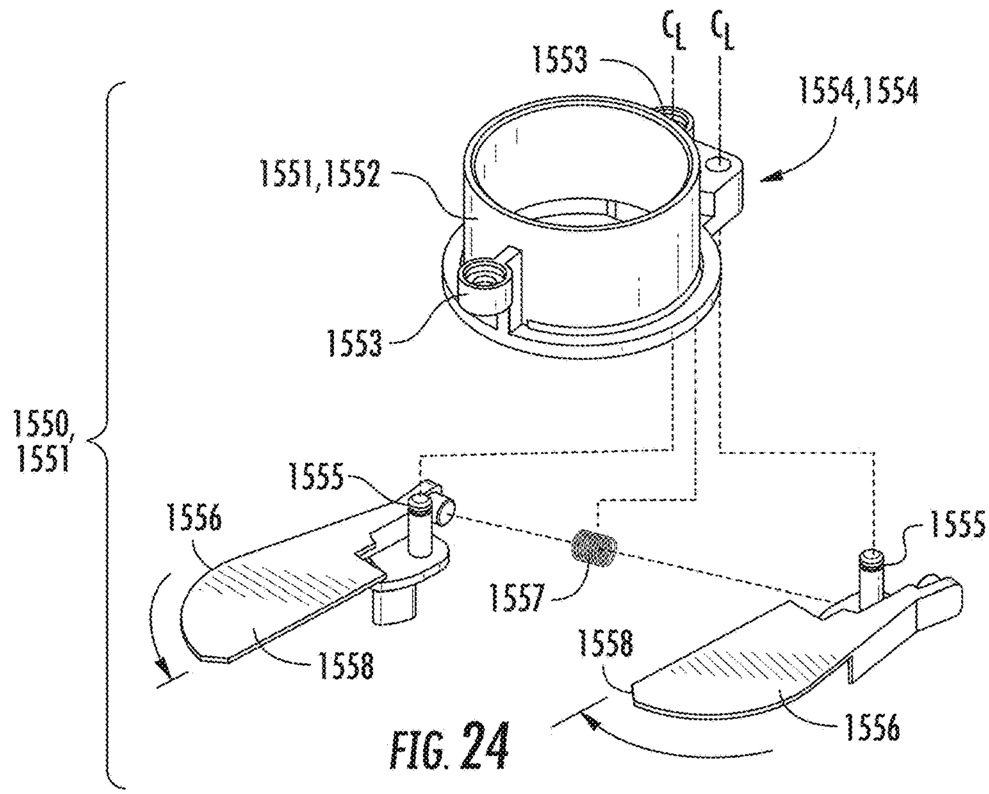
Figure 25:
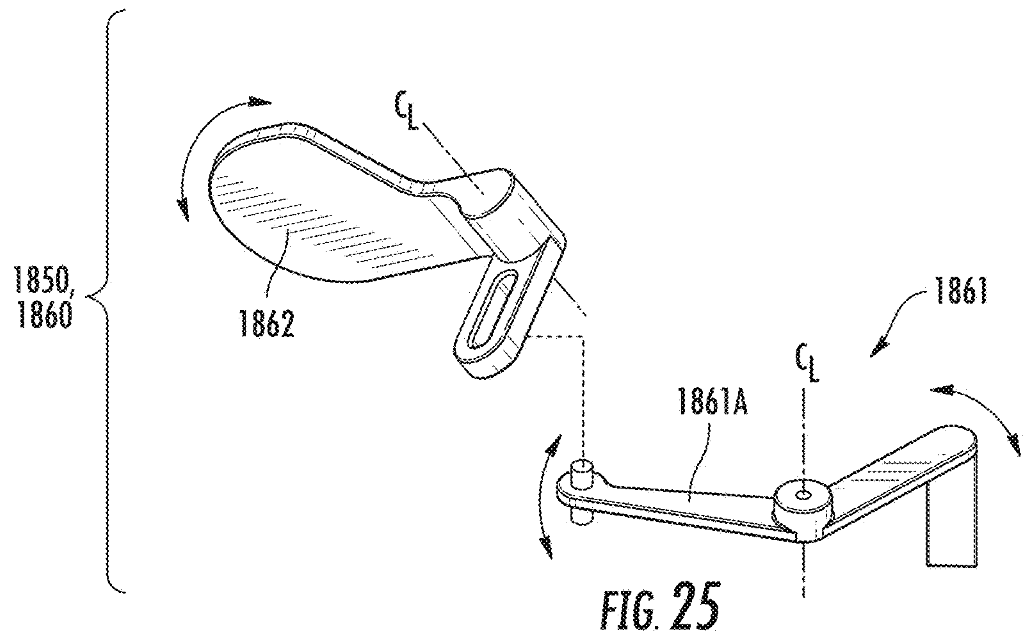
Figure 26A:
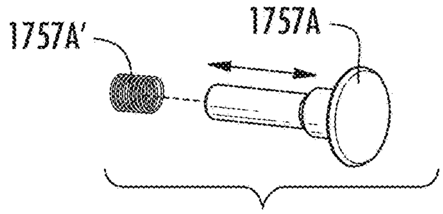
Figure 26B:
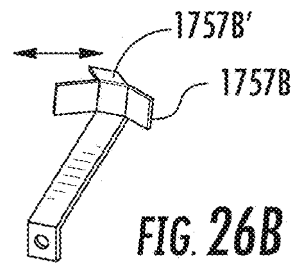
Figure 39:
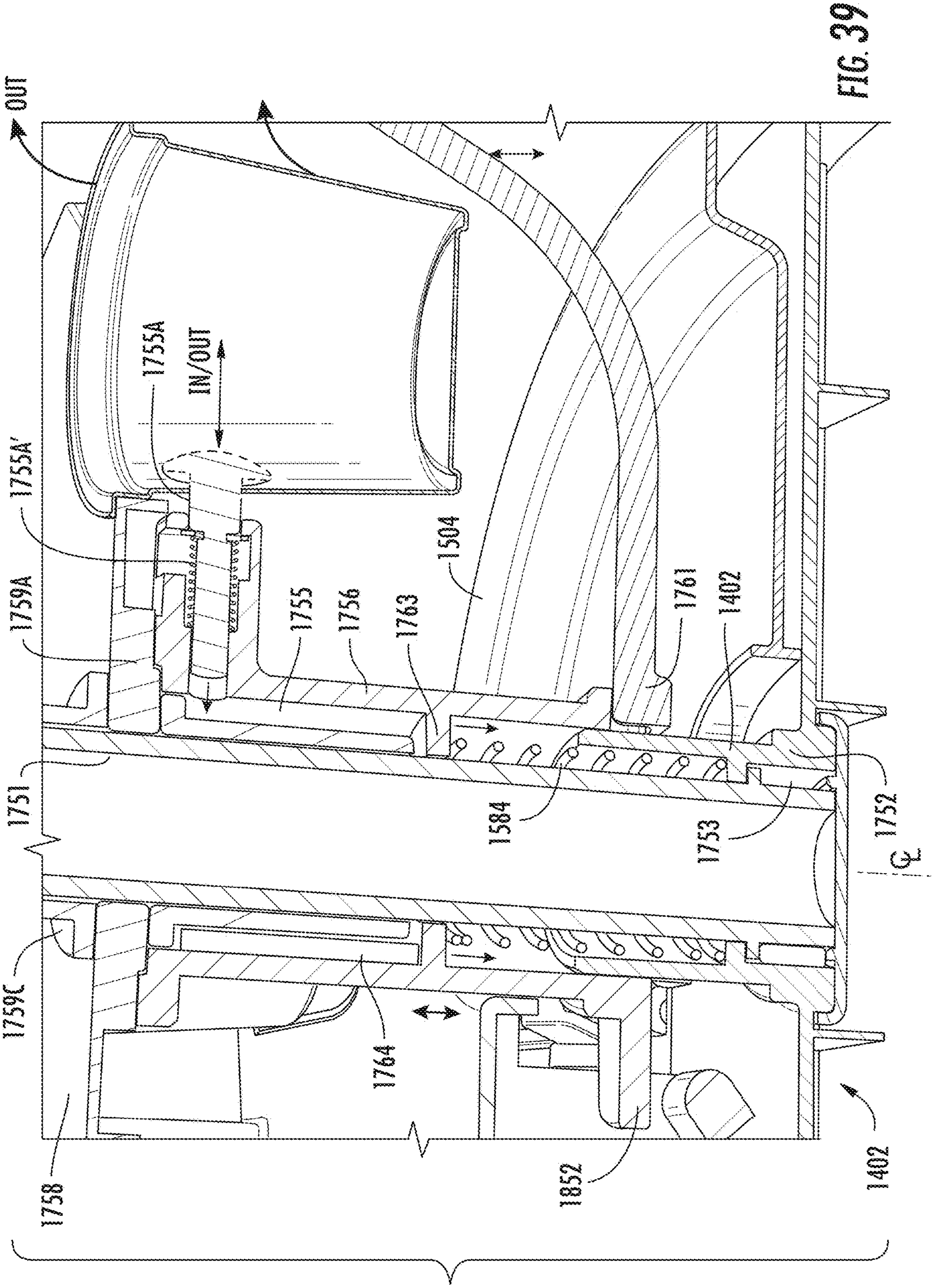
Figure 40:
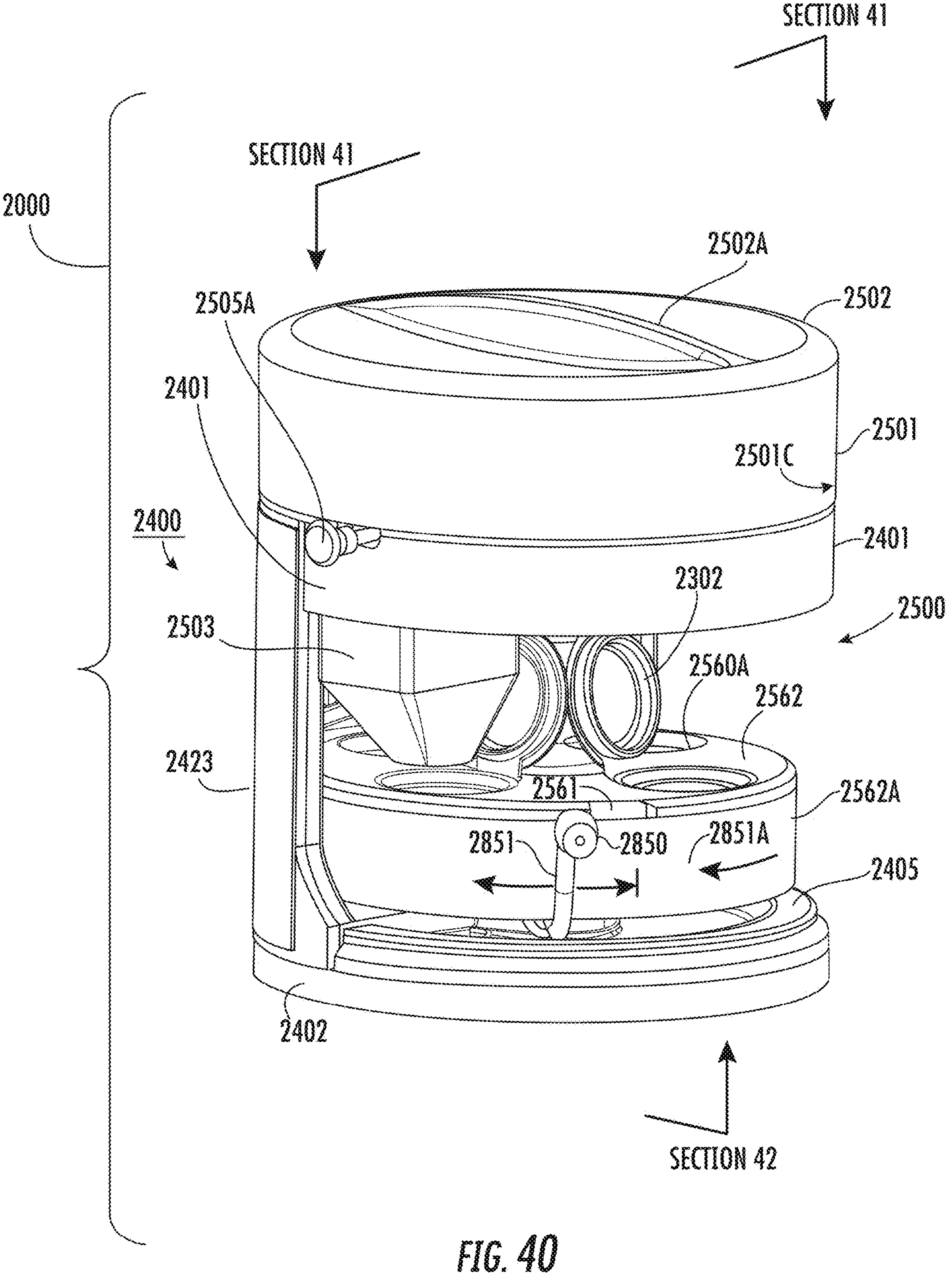
FIG. 40 to illustrates a perspective view of another adaptive and alternative embodiment of the present invention containing similar operations, assemblies, and components that may be adapted and modified to operate with any of the other embodiments noted herein without departing from the scope and spirit of the present invention.
Figure 41:
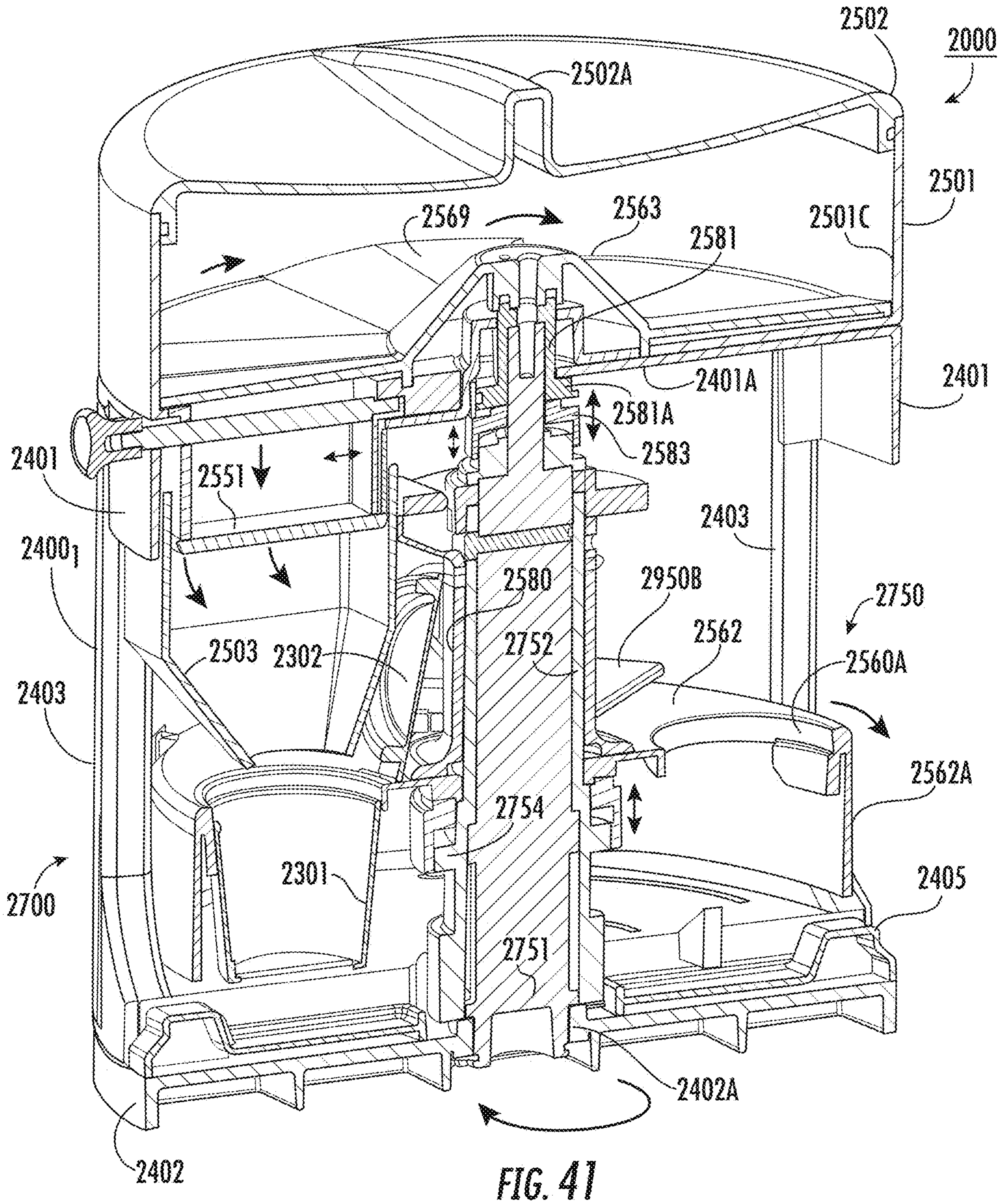
FIGS. 41 and 42 are sections of FIG. 40 showing use condition and elements of the proposed invention.

Indexer 1756 also includes an inwardly projecting bar 1764 (see FIGS. 23, 39). Bar 1764 optionally rotationally engages with lower collar 1755 when a trigger member 1757 engages between indexer 1765 and lower collar 1755 so that the outer profile 1755A and lip 1755B engage bar 1764. As a result of this engagement a rotation of indexer 1765 also engages a rotation of center post 1751 as well as portion dispensing system 1550 and portion carrier assembly 1560.

As noted particularly in FIGS. 31A-31D, trigger member 1757B is shown fixed to an outer portion of indexer 1756, proximate handle 1851, and link portion 1853. Trigger member 1757B is shaped as a spring and is fixed at a bottom portion to indexer 1756, as shown, leaving a free top end on a trigger member guide 1765B (see FIG. 32A). The free top end of trigger member 1757B projects into one of the rotation carrier receiving portions, shown here as 1758B (see FIG. 31B), and thereby interferes with a fit of a beverage cartridge 300 positioned therein. As a result, beverage cartridge 300 depresses the free top end of trigger member 1757B and presses a top portion 1757B' into and through indexer 1756 to engage lower collar 1755 (and drive cartridge filling system 1500) only when there is a beverage cartridge 300 (empty) in a single designated position proximate the handle 1851 on indexer 1575.

Figure 36:
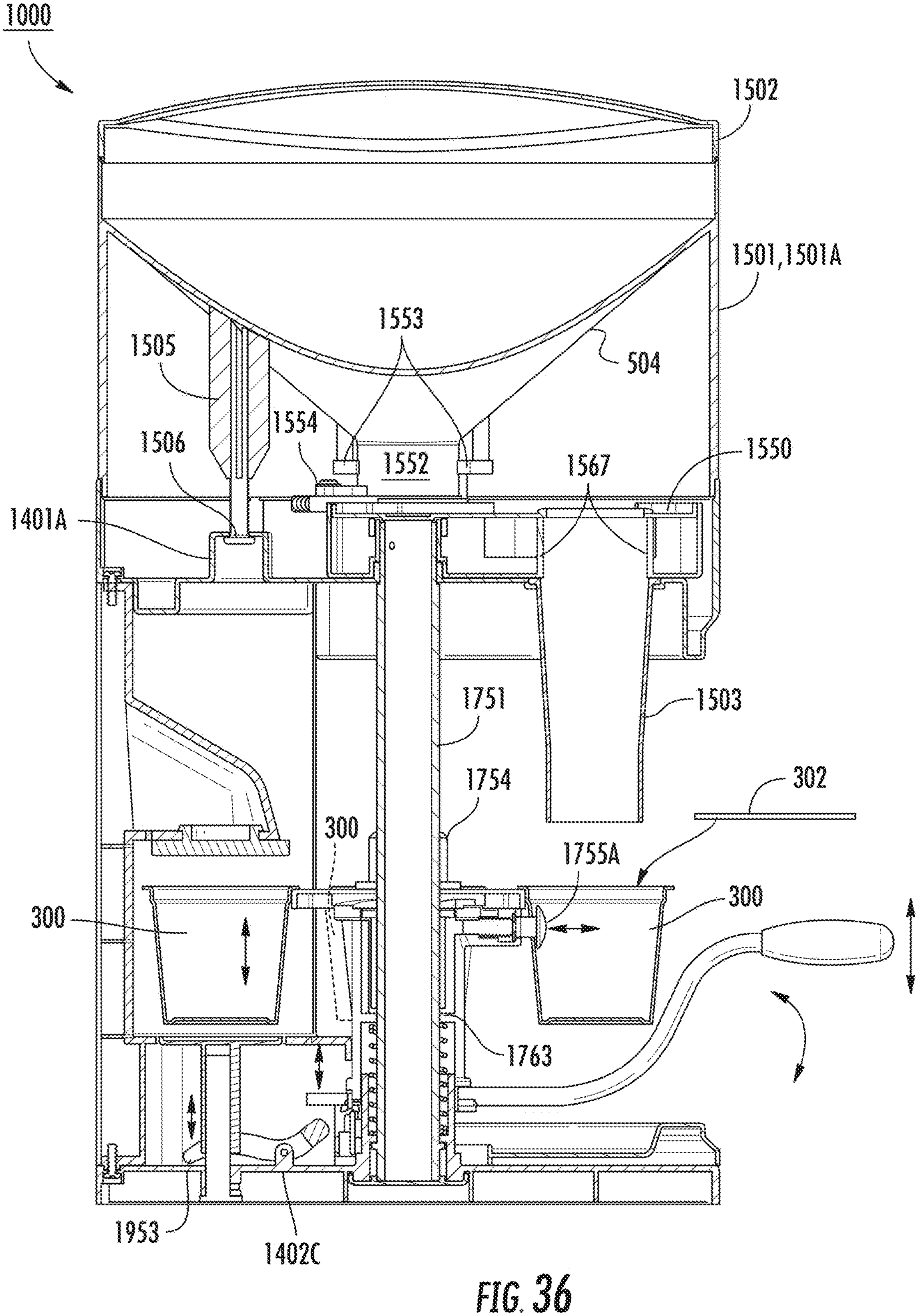

Similarly, in alternative FIGS. 36 and 39, trigger member is a trigger member 1757A (a pin 1757A and a spring 1757A') that slidingly engage with a trigger member guide 1765A (see FIG. 23) to engage pin 1757A through indexer 1756 into lower collar 1755 to drive center post 1751.

Figure 30A:
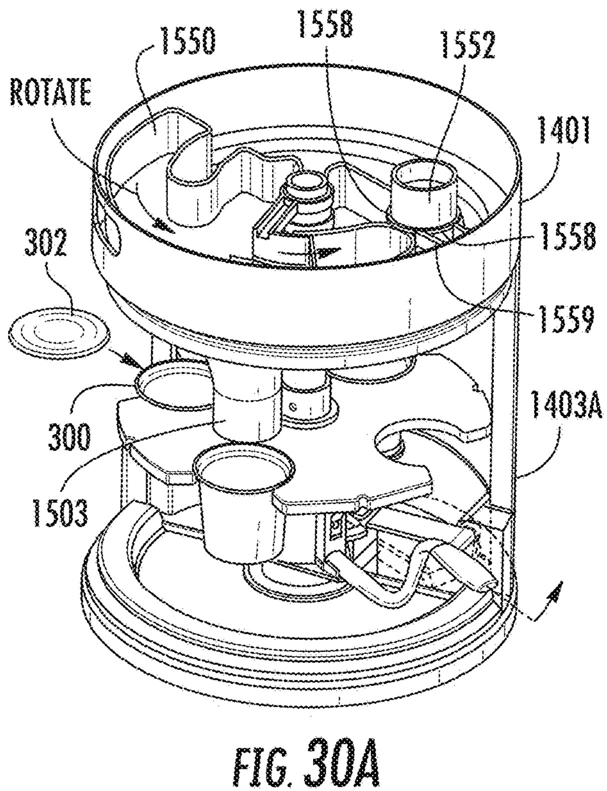
Figure 30B:
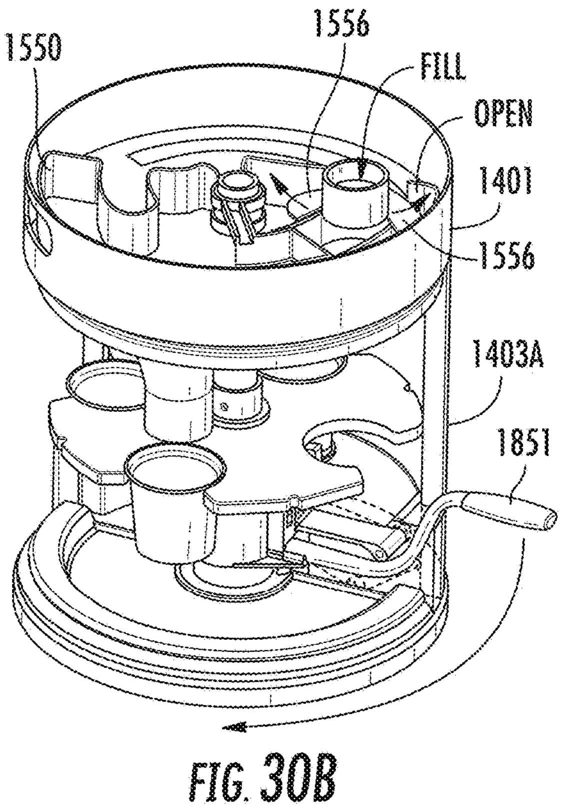
Figure 30C:
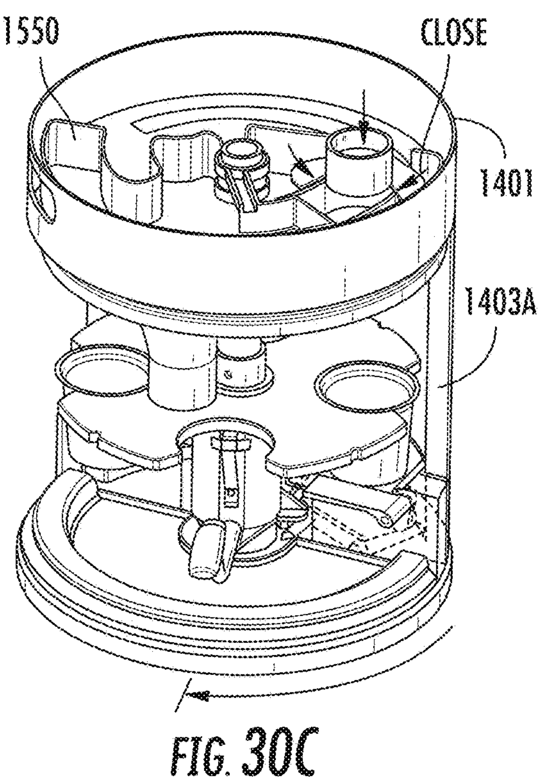
Figure 30D:
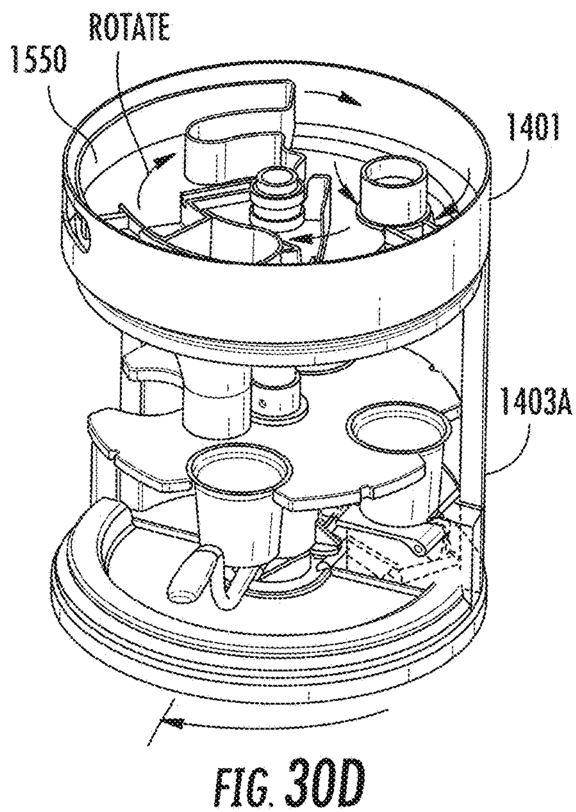
Figure 31A:
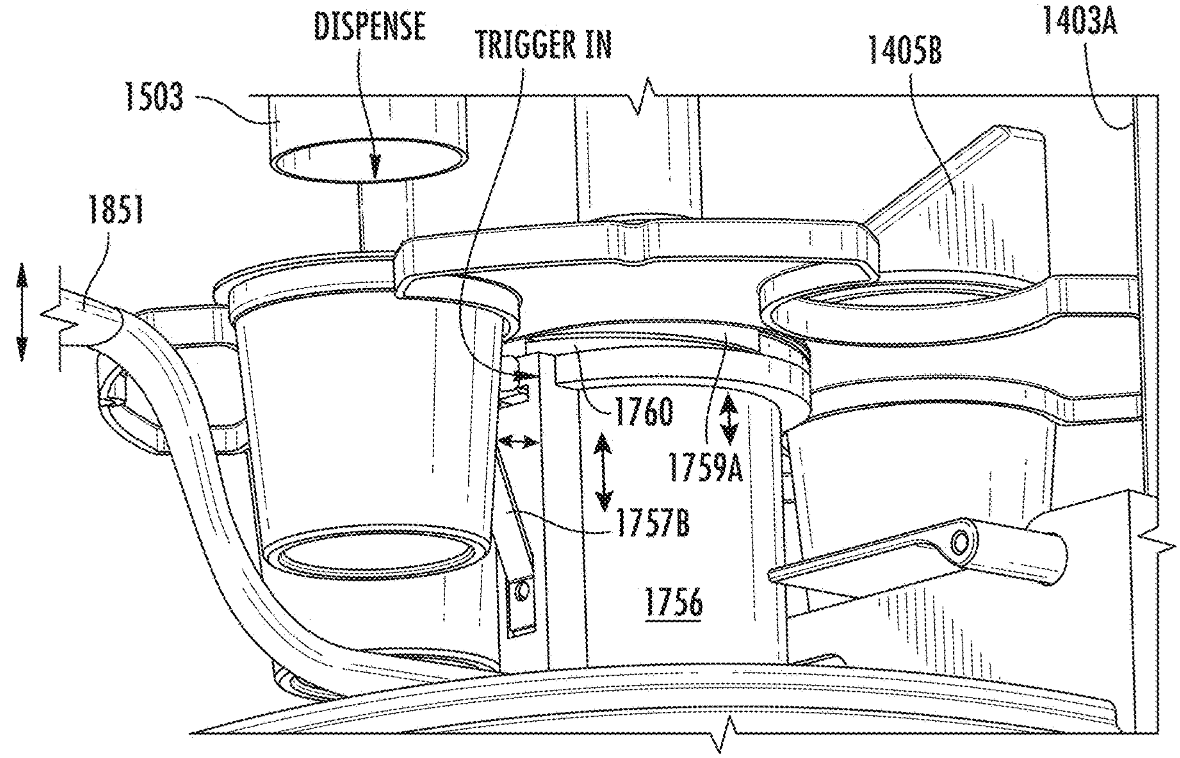
Figure 31B:
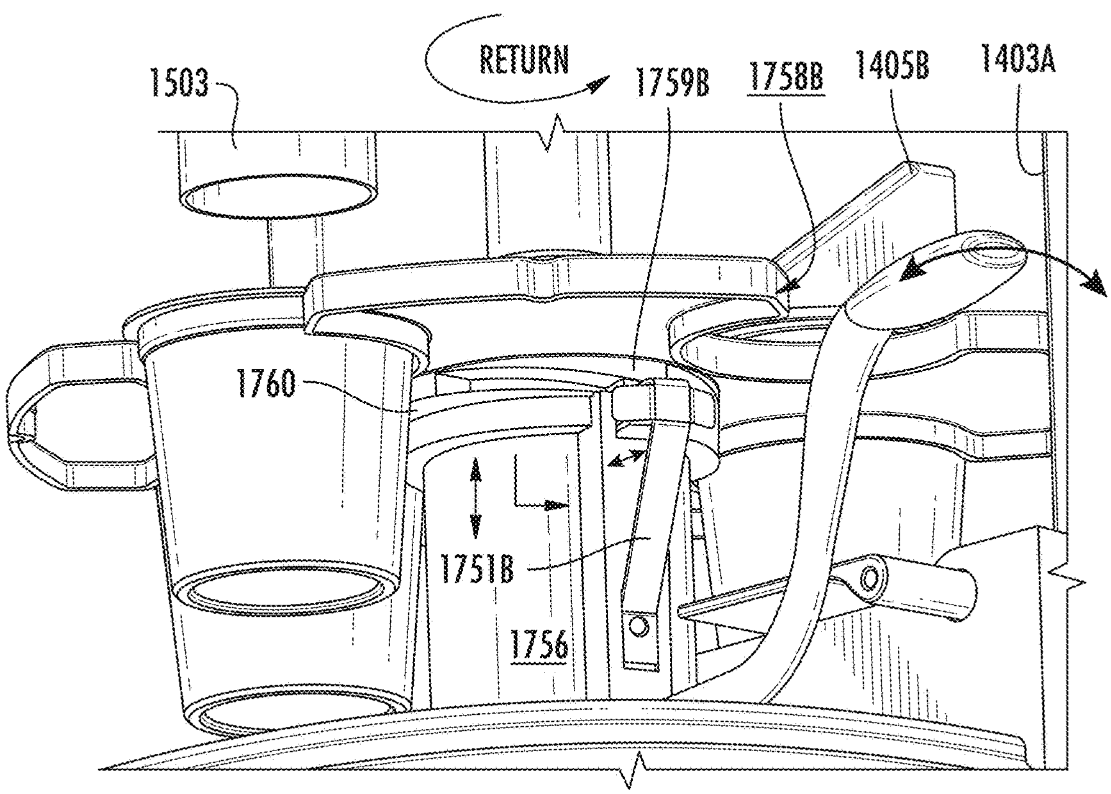
Figure 32A:
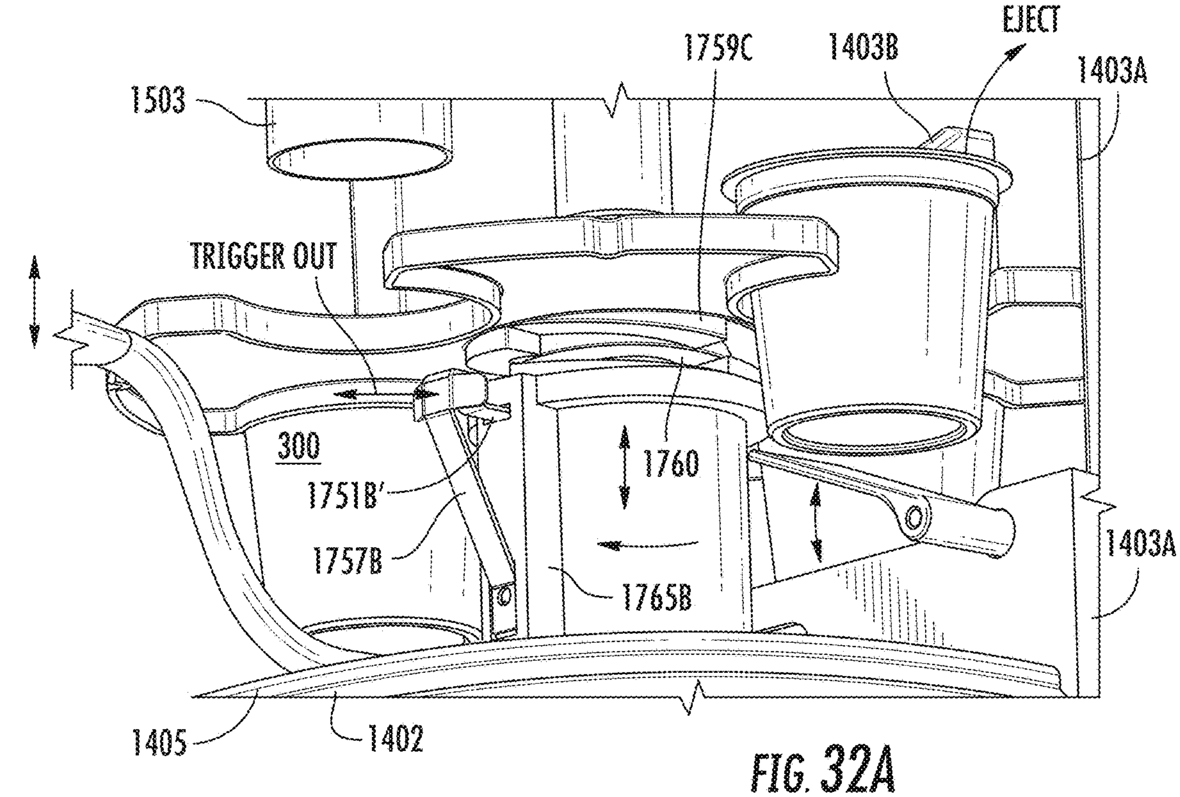
Figure 32B:
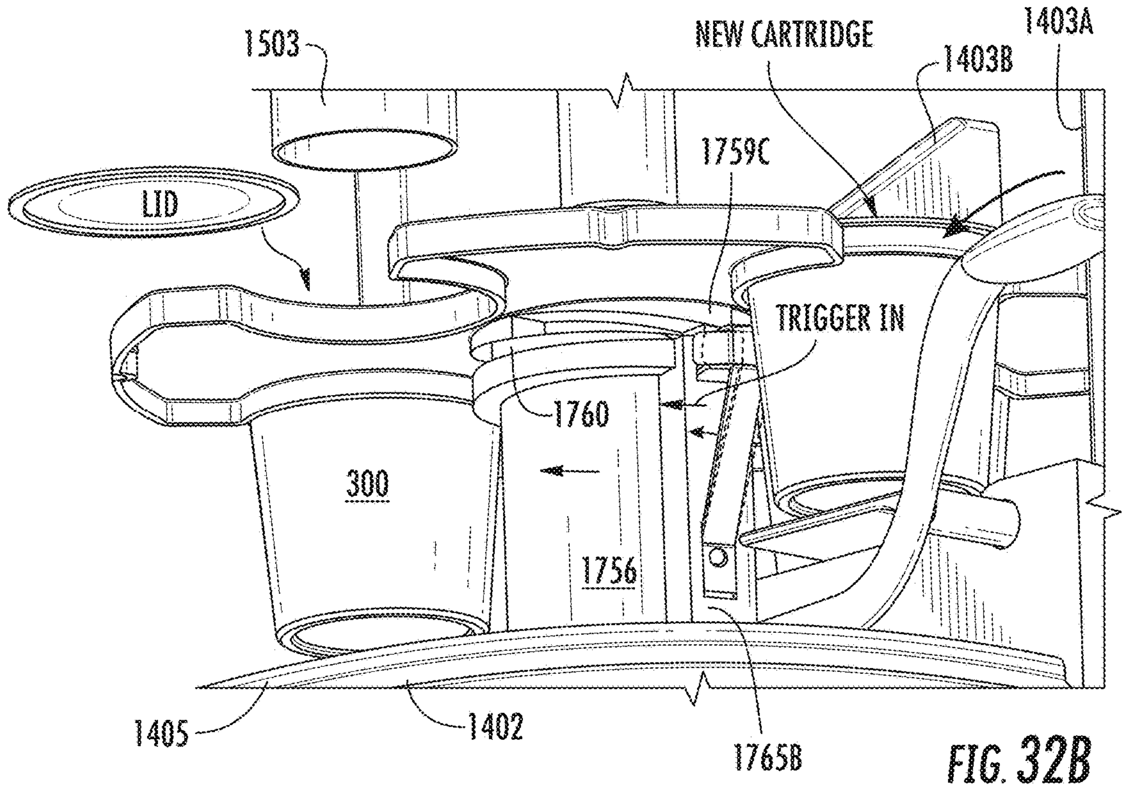

An outer surface of indexer 1756 additionally includes projecting tabs 1770A, 1770B (see FIGS. 23, 33B-33D) that extend outwardly from indexer 1756 and engage portions of motion system 1800 to eject a filled beverage cartridge 300 and to trigger a sealing of a lidded-filled beverage cartridge with a lid 302 (see FIG. 30A).

Figure 17:
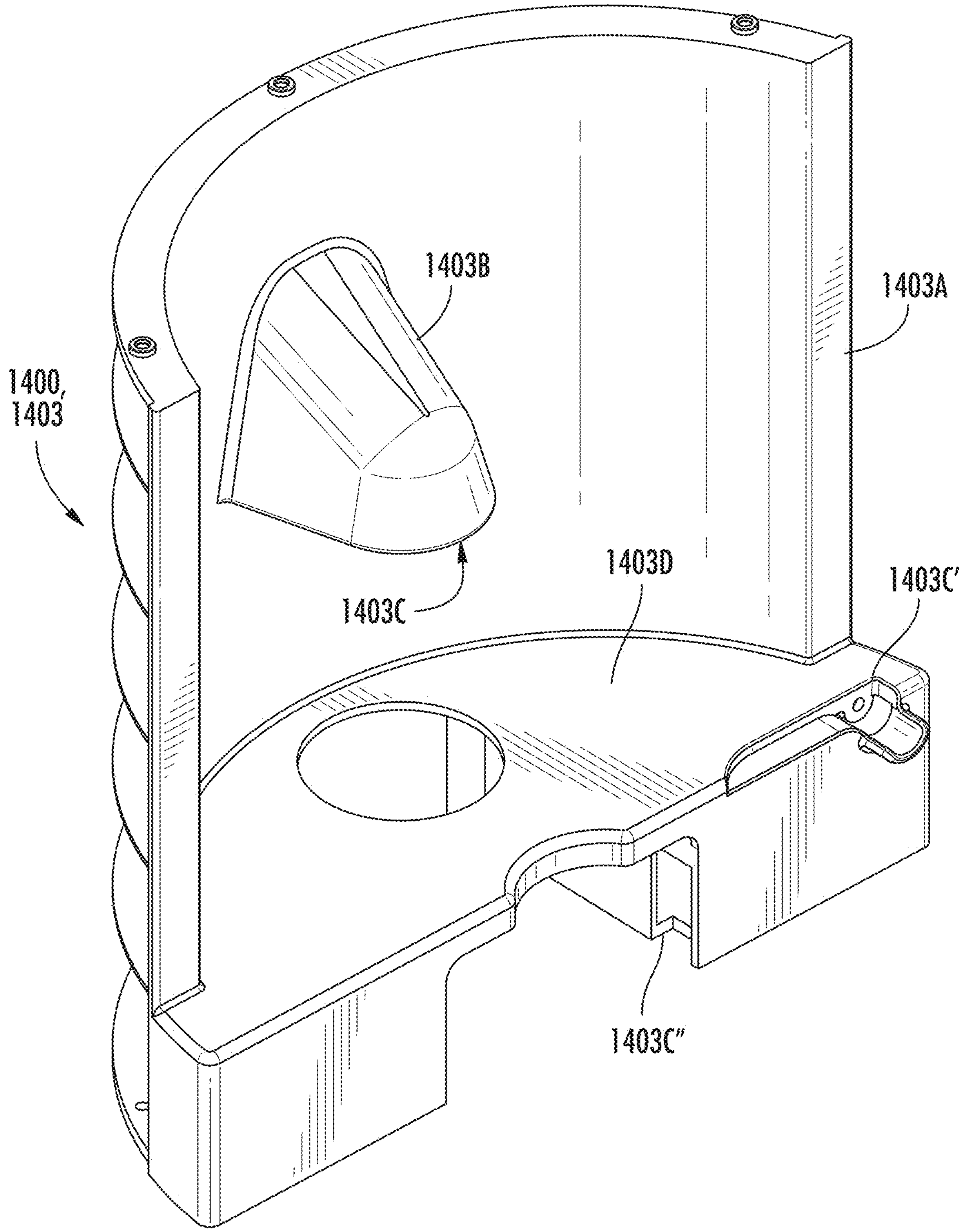
Figure 18:
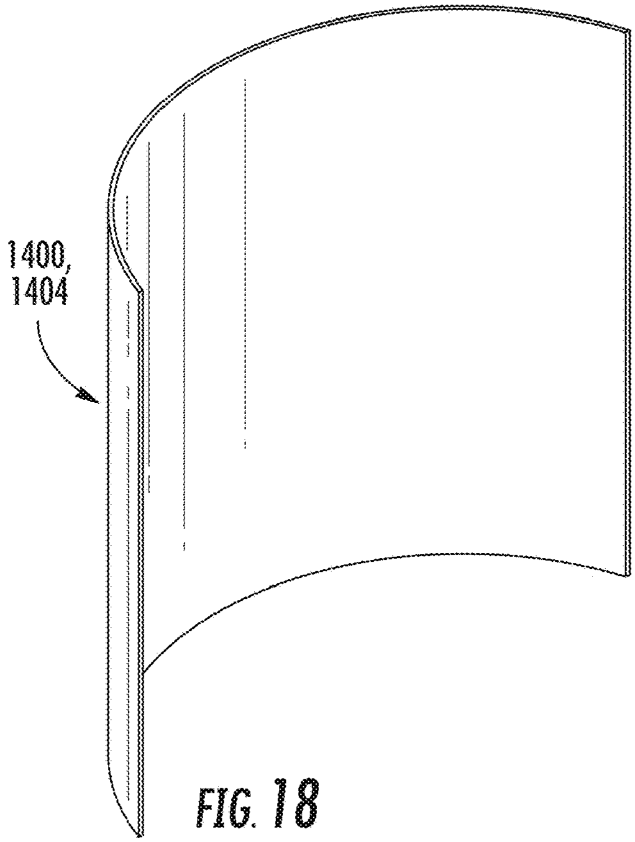
Figure 19:
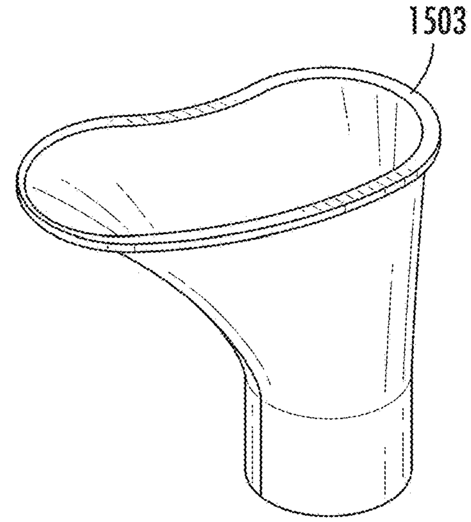
Figure 20:
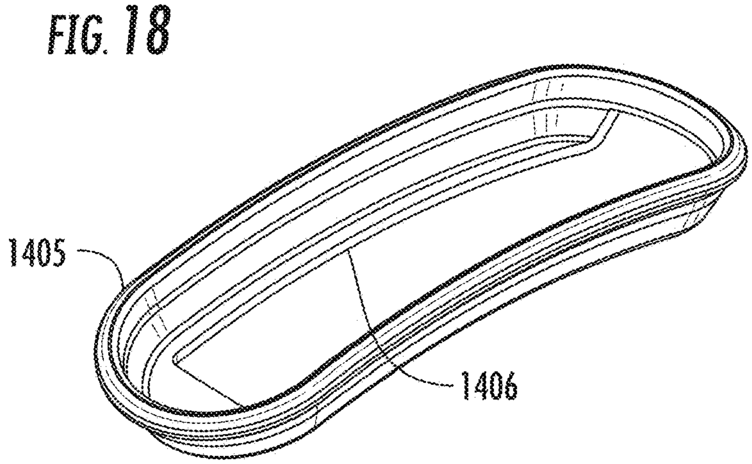
Figure 21:
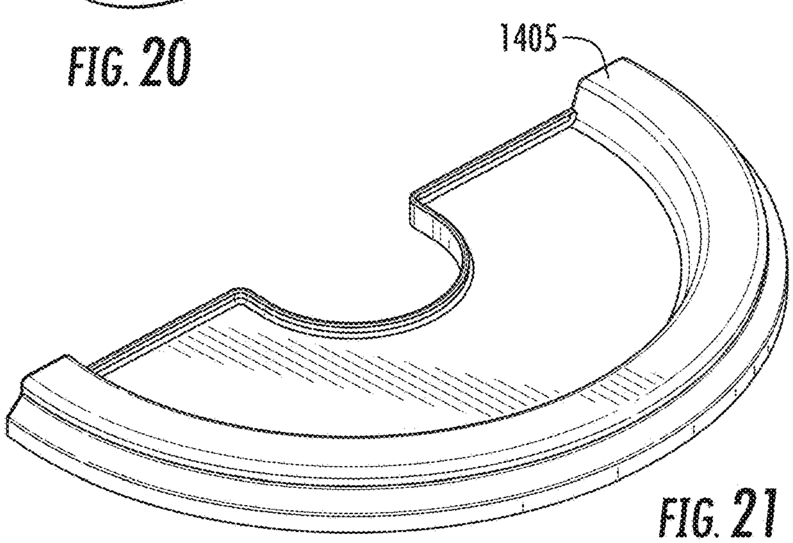
Figure 22:
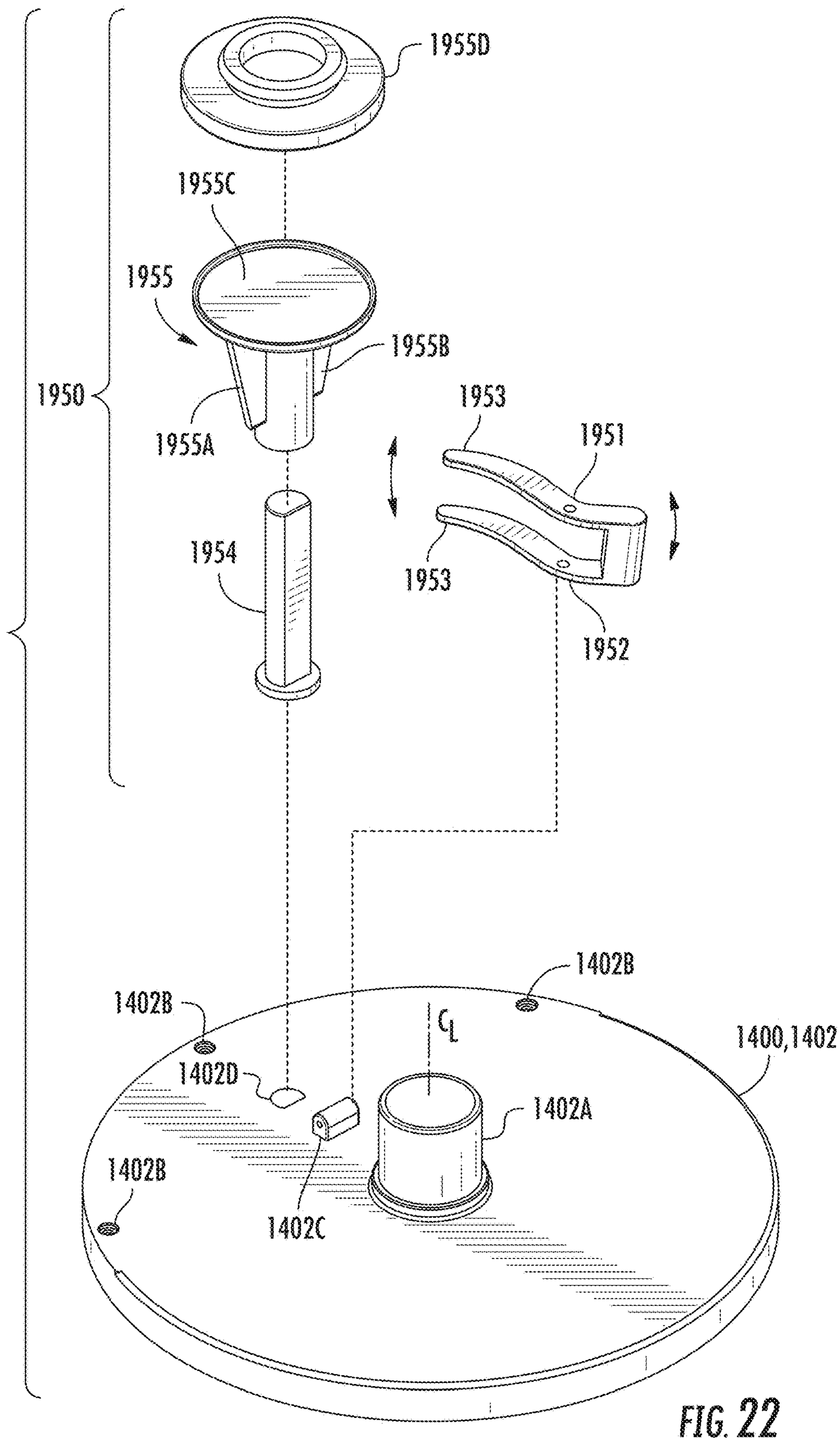

Sealing system 1900 includes sealing press assembly 1950 that includes extension press 1403B that extends from the inner wall of support bridge 1403 (see FIG. 17). On base support portion 1402 a hole 1402D receives a bottom of a sealer support post 1954 (see FIG. 22) and rigidly secures post 1954 upright from base support portion 1402. A sealer ram 1955 having side support wings 1955A, 1955B extending therealong below a sealer ram support surface 1955C for urging a filled-and-lidded beverage cartridge upwardly to press against contact surface 1403C to seal. An optional seal pad member 1955D may be optionally positioned on support surface 1955C to accommodate differently shaped bottoms of beverage cartridges 300 (to match and engage a cartridge bottom contour to prove a stable sealing force transfer).

Sealer ram 1955 includes a sliding tube (shown) that slides along post 1954 allowing support surface 1955C to raise and lower linearly.

Figure 33A:
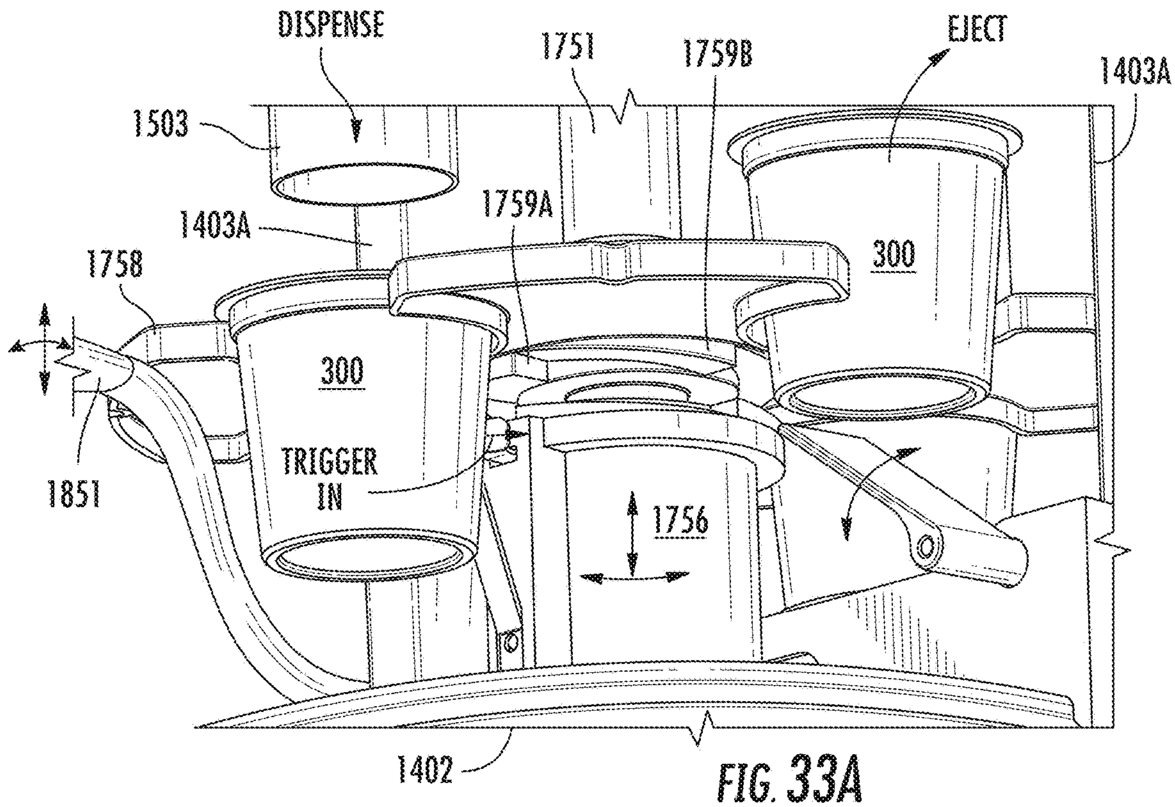
Figure 33B:
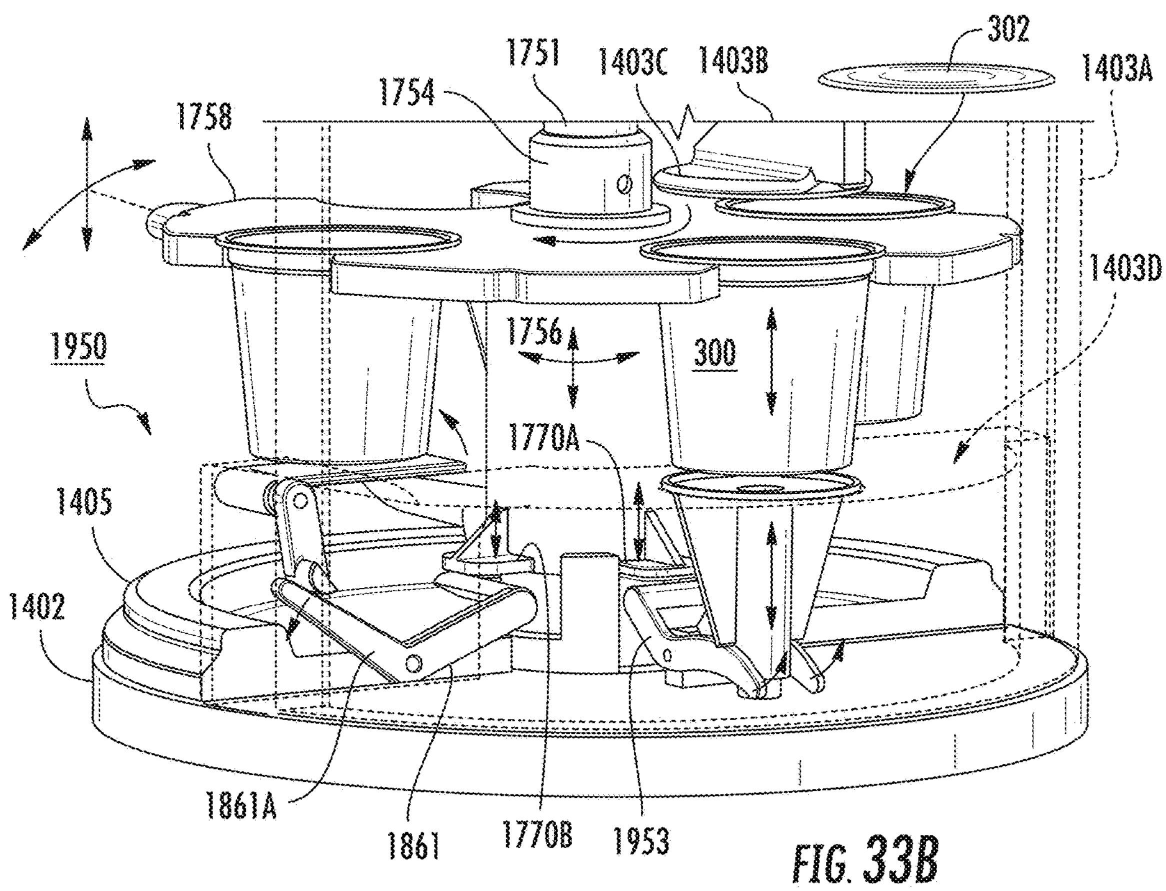
Figure 34A:
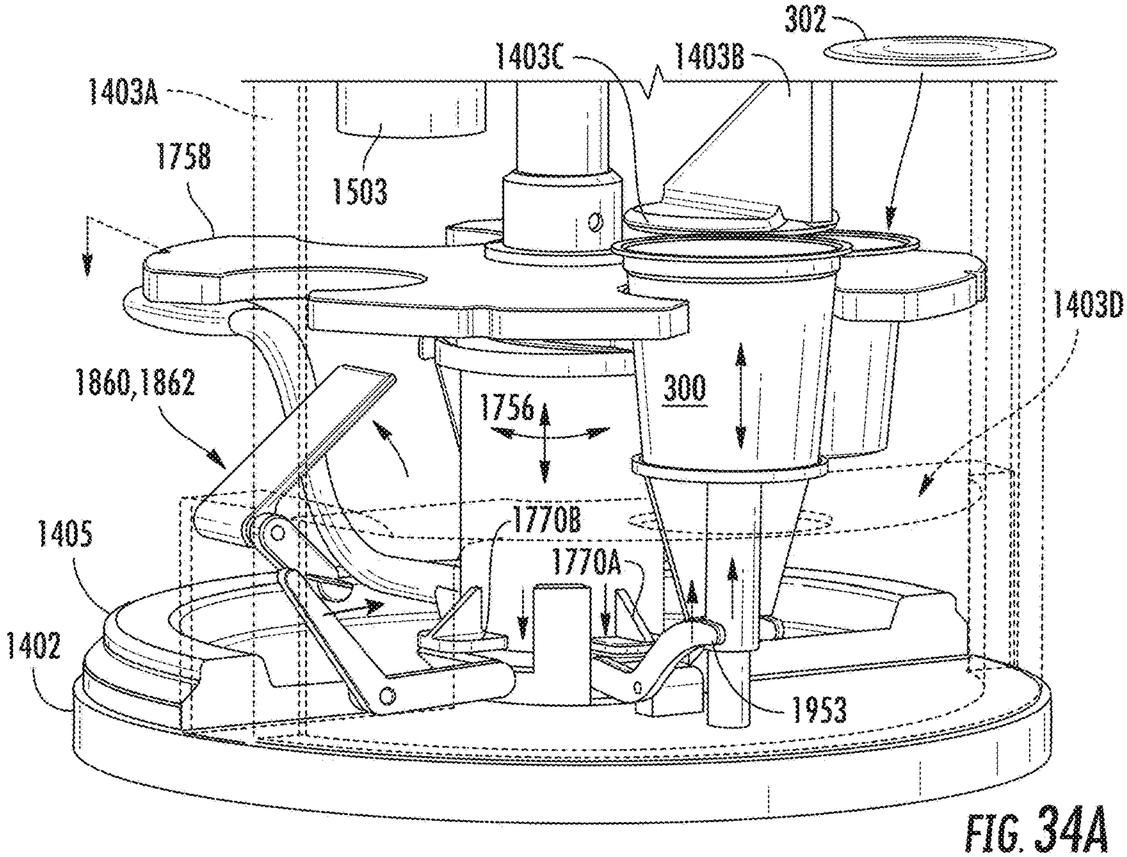
Figure 34B:
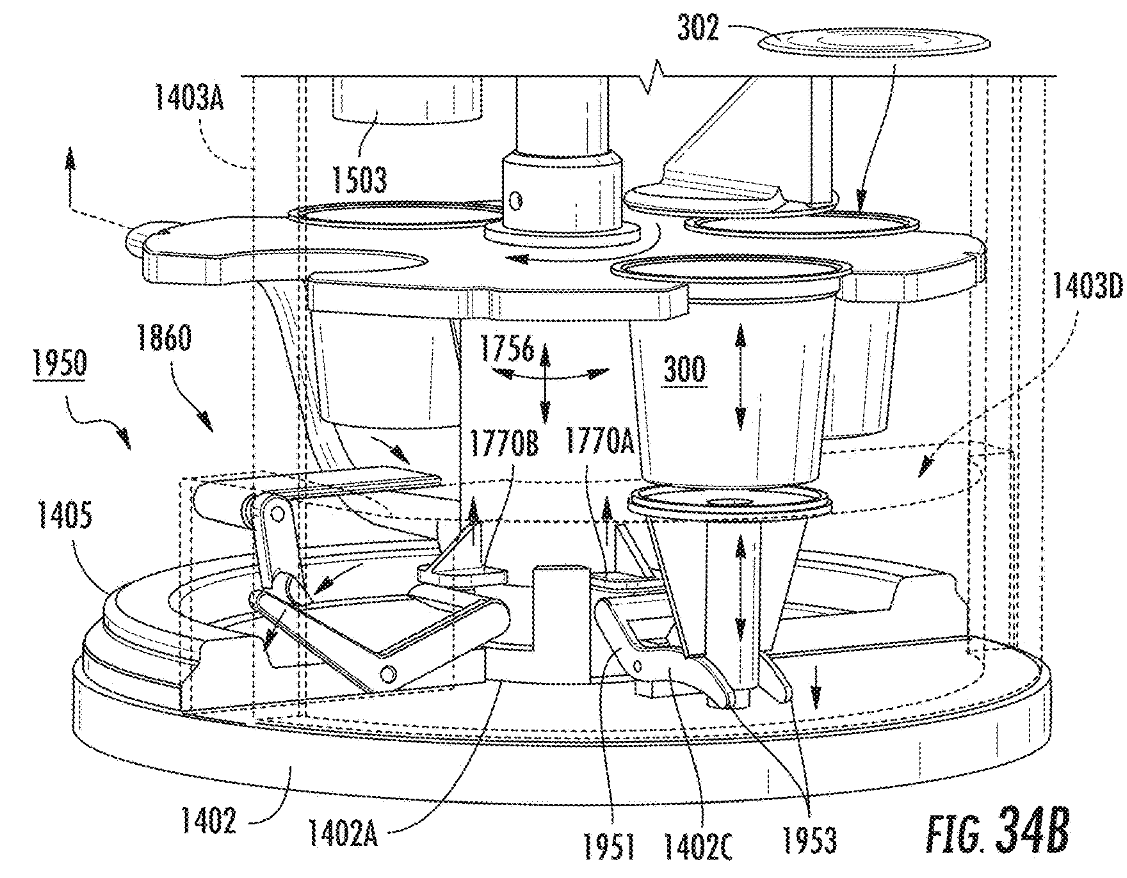
Figure 35:
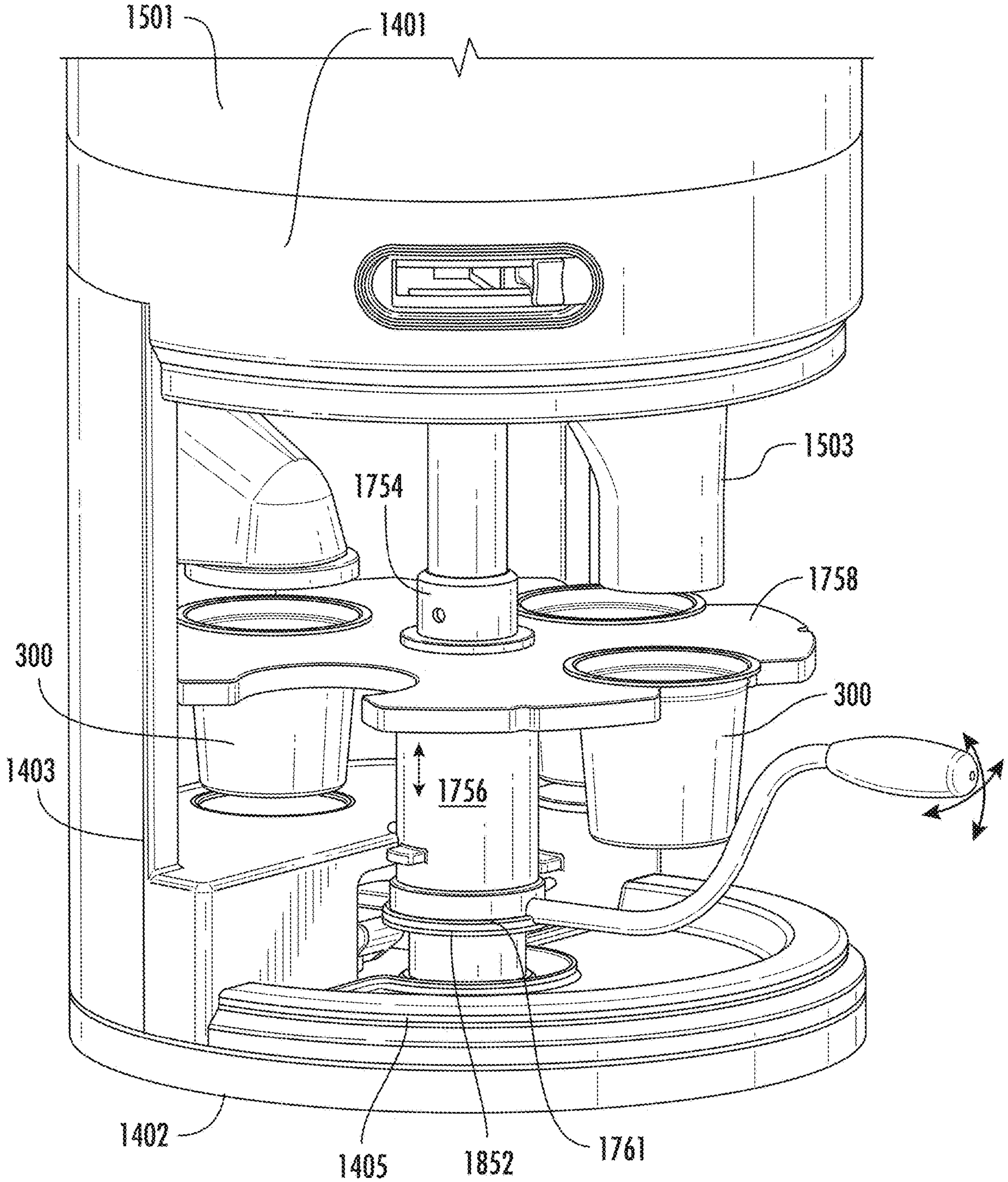

Indexer tab 1770A, extending from indexer 1756, engages with sealer link 1951 in an up-down motion (see FIGS. 33D, 34A, B, and 38). Link arms 1953, 1953 engage respective bottom portions of wings 1955A, 1955B in a corresponding pivot up-down motion and lift sealer ram 1955 upwardly to press a lid 302 on cartridge 300 to surface 1403C to seal.

Indexer tab 1770B, extending from indexer 1756, additionally engages with an ejection link system 1860 (see FIG. 25) in motion system 1800 and includes an ejection link 1861 pivoting about a pivot point upon contact from tab 1770B to drive an ejection arm 1861A to drivingly contact a pivoting ejection arm 1862. Optionally shown herein (FIG. 33B), pivoting ejection arm 1862 is pivotably linked to a connection point 1403C' (see FIG. 17, 33B) to allow for stable and relative rotation during a forceful rotation. As will be understood from study of the disclosure, pivoting ejection link system 1860 may use sliding-link systems (see FIG. 25) or may use cam-surface systems (see FIG. 33B) or other suitable force transfer systems known to the art.

Additionally, and adaptively in combination referring now to FIGS. 40-54, and in particular details hereafter, an alternative embodiment of the present invention. A system for preparing beverage cartridges 2000 includes a frame assembly 2400, a cartridge filling system 2500 and a cartridge handling system 2600.

Cartridge handling system 2600 further includes a movement guide system 2700, a motion system 2800 for moving the movement guide system 2700, and a sealing system 2900 for sealing a cartridge 2300 therein. Movement guide system 2700 includes a rotational support assembly 2750. Motion system 2800 incudes a pivotable and displaceable handle assembly 2850 for operating the motion system 2800 and trigging a sliding press assembly 2950 in sealing system 2900.

Cartridge filling system 2500 includes a portion dispensing system 2550, well as a fillable container 2501 having a cover lid 2502 with a lift handle 2502A. On fillable container 2501, a dispensing guide 2503 is removably secured from an extended opening port 2501A and has a sloped guiding exit portion (as shown). Extended opening port 2501A includes on an exterior thereof a plurality of engaging hooks 2501B which snap engage a respective plurality of receiving openings 2503B formed in dispensing guide 2503. Additionally, two coaxial pivot legs 2501C, 2501C. Pivot legs 2501C engage drop gate, as will be discussed later.

Within fillable container 2501 and extended opening port 2501A, is an adjustable fill key 2504 within opening port 2501A, and a driving adjustment threaded rod 2505 with a guide knob 2505A. A portion of driving adjustment threaded rod 2505 threads in to a portion of the extended opening port 2501A and allows (via rotation) a lateral adjustment of fill key 2504 in opening port 2501A so as to increase, or decrease a desired dispensing volume for the dry beverage material, as will be understood. In this manner, larger or smaller portions of beverage material may be dispensed during each drop-use.

Beverage cartridge 2300 includes a cup base 2301, a cup lid 2302 and a lid hinge 2304 that hingably joins cup lid 2302 to cup base 2301. An inner cup filter 2303 is sealed to an inner rim of cup base 2301, as shown (See FIG. 46). A lid rim 2305 extends from lid 2302 and provides a mating wall (as shown) with an engagement formation (shown) of cup base 2301.

Frame assembly 2400 includes (optionally) a top support portion 2401, a base support portion 2402 with an engagement guide sleeve 2402, a support bridge 2403 that spans the two, and a covering cover wall 2404. There is a base shield 2405. Support bridge 2403 includes a platform 2406 as shown. An extending finger 2701, as part of the movement guide system 2700, extends from support bridge 2403 on a spring arm inwardly to engage with an anti-reverse guide as will be noted preventing reverse rotation of the cup table during a use.

Sealing system 2900 on support bridge 2403 includes the first sliding press assembly lip 2950A, of sliding press assembly 2950, and which is sloped (or curved) at an angle relative to the cup table/cup lid during rotation and engages cup lid 2302 in an initial closing urging step. A further portion of sliding press assembly 2950 is a lesser sloped portion 2950B which is closely proximate the top of the cup table/rotation carrier, so that as lid 2302 is urged downwardly and lid rim 2305 initially engages cup base 2301, as rotation occurs lesser sloped portion 2950B provides a final closing urging pressure to fully engage lid rim 2305 with cup base 2301 and seal Beverage cartridge 2300 prior to ejection and removal, as will be discussed. A number of support braces 2951, 2951 are joined between support bridge 2403 and sliding press assembly 2950 to ensure stiffness and rigidity to withstand the sealing-closing pressure applied to cup lid 2302.

Additionally, an ejection slide guide ramp 2407 extends from (in assembly) base support portion 2402 and platform 2406, as shown. Ejection slide guide ramp 2407 provides a guiding surface beginning on the same plane as the plane of platform 2406 and in a vertical and horizontal motion rising and curving away therefrom (as shown) through three dimensions. During use, cup base 2301 (having exited from below lesser sloped portion 2950 first encounters a matching-plane portion of ejection slide guide ramp 2407 (see FIGS. 53-54), and is urged upwardly and outwardly from the rotation carrier/cup carrier as shown so that Beverage cartridge 2300 may be grasped by a user and removed from system 2000 for use.

Fillable container 2501 is shaped to have an outer wall 2501C that meets with an upper portion of top support portion 2401, as shown to provide support. Internal to fillable container 2501 is a rotor 2568 having a plurality of rotor blades 2569, each rotor blade 2569 includes an upright front face (shown) and a reduced thickness trailing face (as shown) and preferably a wall-engagement clearing lip 2569A to sweep and clear build up along outer wall 2501C of fillable container 2501 during a rotational use. A conical central support 2563 provides a positive rotational engagement with movement guide system 2700 and motion system 2800 and rotational support assembly 2750 during a use so as to drive rotor 2568 around fillable container 2501, as will be discussed.

Portion dispensing system 2550 incudes interlinked components operable to receive an operation and dispense a brewing component to a Beverage cartridge 2300, as shown.

Portion dispensing system 2550 includes a dispensing pivot door 2551 (see FIG. 44) that is hingably attached via gripping hinges 2551A to extended opening port 2501A and pivot legs 2501C within dispensing guide 2503 which includes a pivot trigger 2552. It will be understood that pivot door 2551 has a mass, which is sufficient, without support, to cause pivot door 2551 on hinges 2551A, 2551A to drop open under gravity force and release any contents within extended opening port 2501A for dispensing downward along dispensing guide 2503 into Beverage cartridge 2300.

As will be noted, during a use cartridge filling system 2500 operates to remove support from pivot trigger 2552, which in turn causes pivot door 2551 to open (drop open). The operation and structure elements to cause removal or addition of support to pivot trigger 2552 to operate pivot door 2551 will be discussed further herein.

Additionally, it will be noted that in frame assembly 2400 and top support portion 2401 fixed to support bridge 2403, there is an underside 2401A to top support portion 2401, as noted in FIGS. 48, 41, 42, 51A, and 51B, and elsewhere. Underside 2401A includes a central aperture 2401B to rotationally support movement guide system 2700, cartridge handing system 2600, and motion system 2800 and others, as will be discussed. A number of fixing elements 2501D project downwardly from an underside of fillable container 2501, and are engaged in respective receptacles 2401C in the top side of top support portion 2401. Further, as noted in FIG. 44 and elsewhere, dispensing guide 2503 is slidably insertable within a bounded opening 2401D to provide a guiding support. A spring arm member 2401E is fixed at one end to underside 2401A and includes a free end (see FIG. 48) that flexes to engage a portion of the movement guide system 2700 (as see in FIG. 42) to prevent counter-rotation of movement guide system 2700 (the free end engages a stepped turret to prevent reverse motion as will be discussed).

Cartridge handling system 2600 includes a combination of components and assemblies. Movement guide system 2700 enables relative motion pivotably about central axis A and transmission of relative driving rotation and operational forces during a use to achieve the goals of the invention. Rotational support assembly 2750 in movement guide system 2700 includes a center pivot post 2751 bounding pivot axis A, and driving a pivot motion from within a post end cap 2752 (a center post shell). At a mid-portion (see FIGS. 41, 42, 45) of pivot post 2751 and post end cap 2752 is a fixed mid portion collar 2754 that secures an indexing engagement assembly, to be discussed. As noted earlier, a top-portion of pivot post 2751 and a top-portion of post end cap 2752 engages with a fixing flange member 2562A, with a number of stepped ramped 2562A1, 2562A2, etc. of a bottom plate 2562 of portion carrier assembly 2560 having a stiffening and supporting outer wall 2562A so that, when pivot post 1751 is rotated, to also drivingly rotate portion carrier assembly 2560 about rotation axis A during a use so as to pick up in openings 2560A and respectively cartridge assemblies 2300 about axis A to receive, a dispensed brewing component, and be sealed and dispensed.

Figure 45:
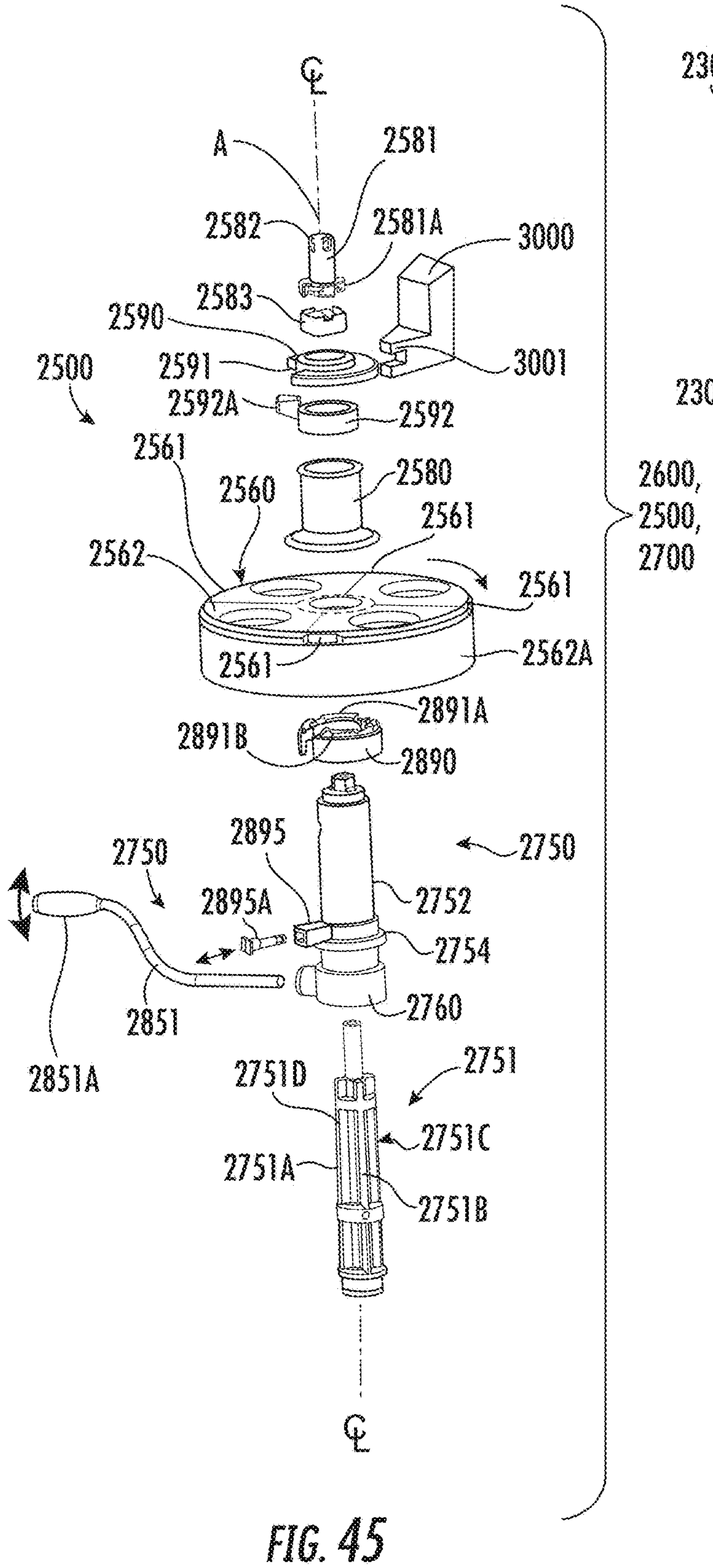
FIG. 45 is a partial exploded perspective view of portions of a cartridge handling system in addition to further components.
Figure 46:
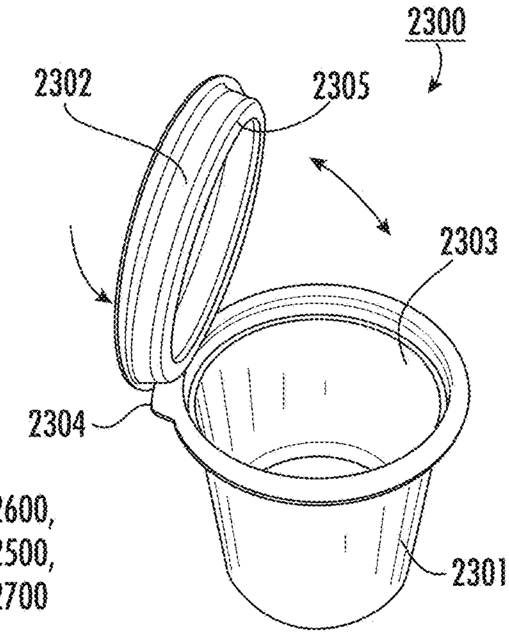
FIG. 46 is a perspective view of a lidded cartridge assembly for use in all of the alternative embodiments of the present invention.
Figure 47:
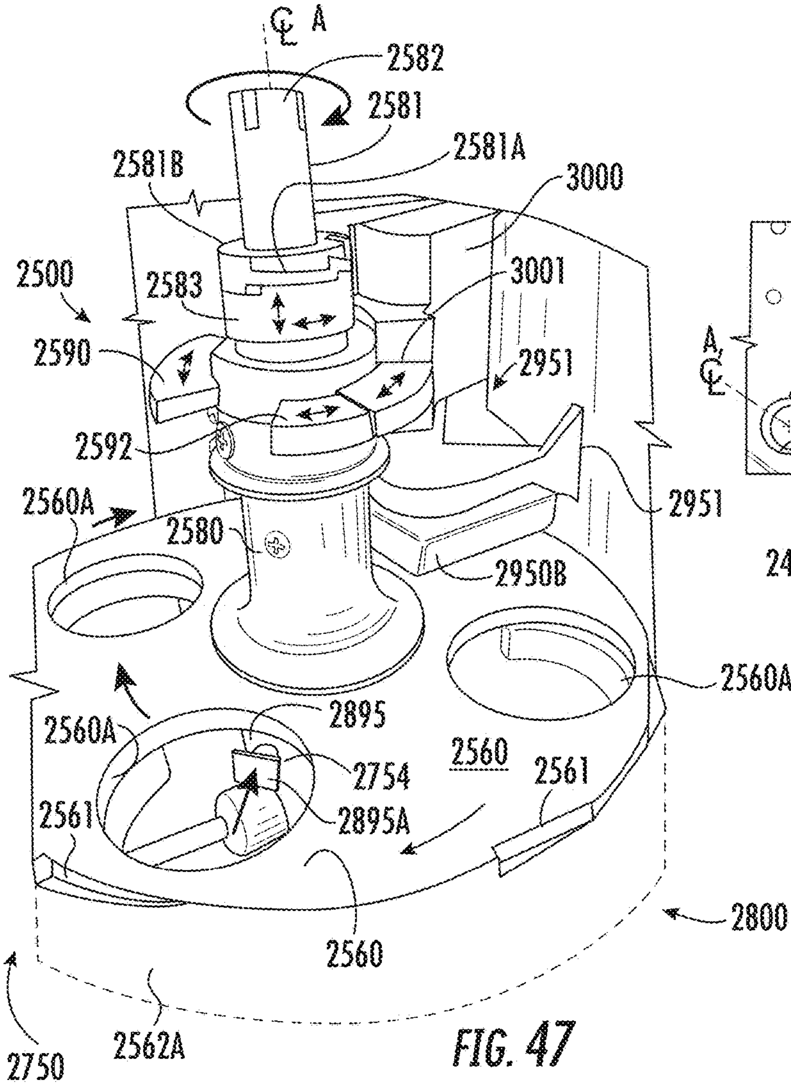
FIG. 47 is a partial perspective assembled view of components of a cartridge handing system as in FIG. 46 and other figures.
Figure 48:
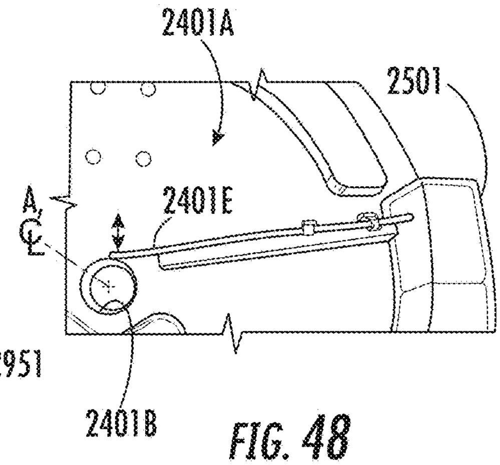
FIG. 48 is a partial perspective view of the underside of a portion of the top support portion with a pawl or spring arm engagement location.
Figure 49A:
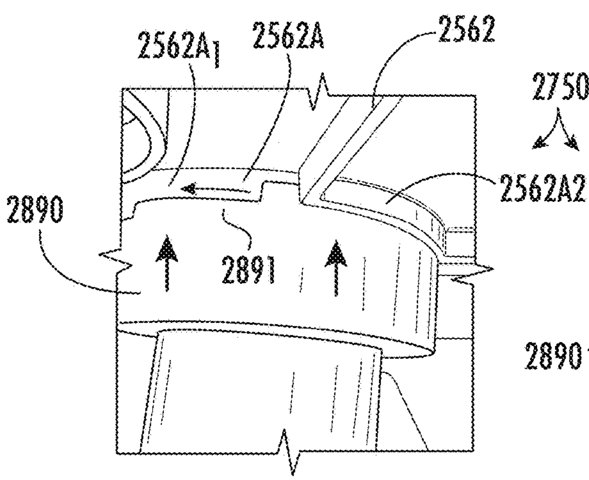
FIGS. 49A, 49B are partial perspective underside views of a lower clutch and a step-drive arrangement in the cartridge handling system.
Figure 49B:
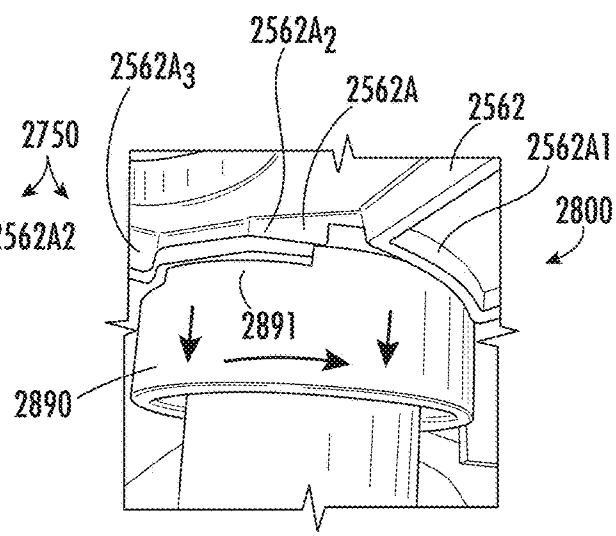
Figure 50A:
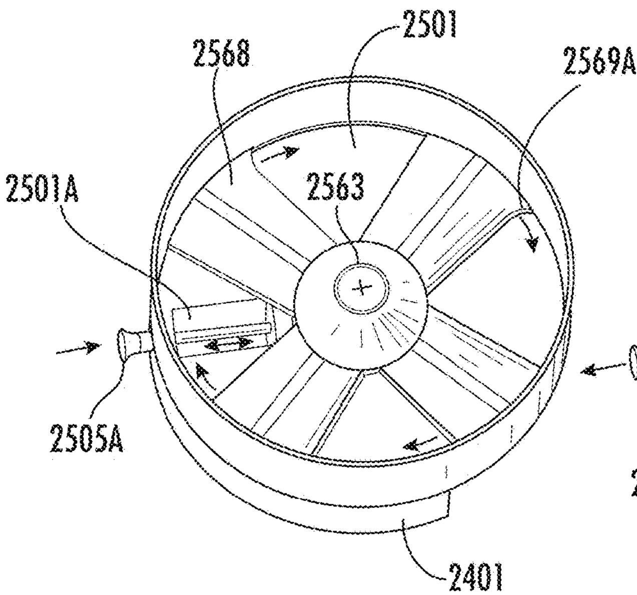
FIGS. 50A, 50B are top perspective portion views of a fillable container and fill rotor.
Figure 50B:
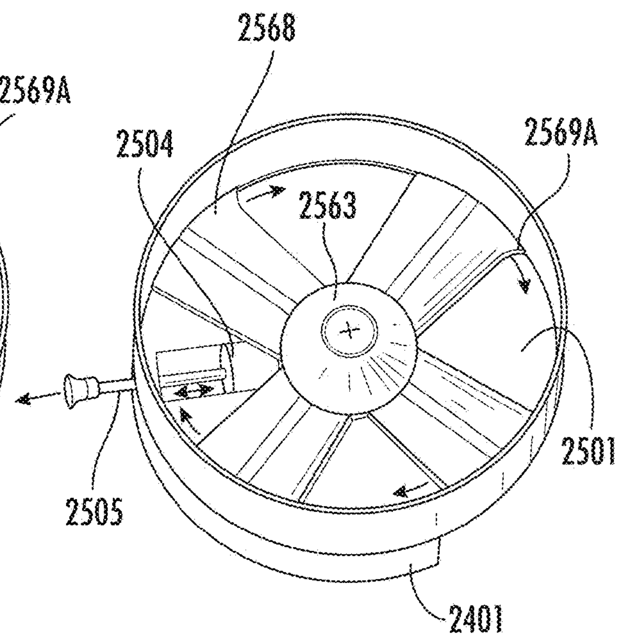
Figure 51A:
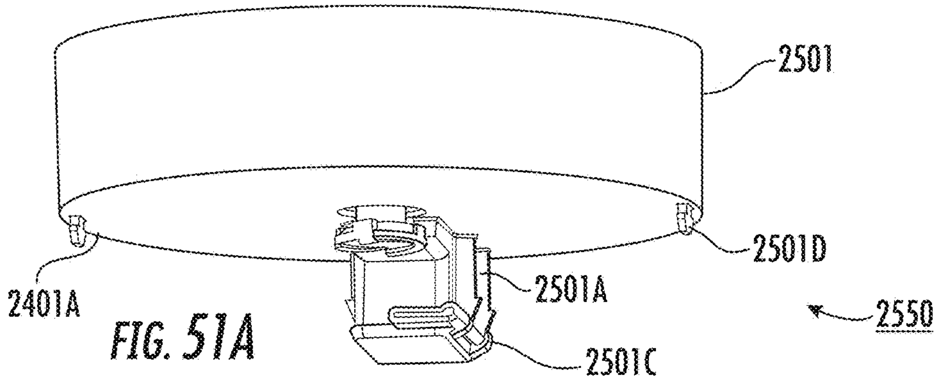
FIGS. 51A to 51D are illustrative partial perspective views (with FIG. 51D being a partial section view along Section 51D of FIG. 51D) of a filling system portion.
Figure 51B:
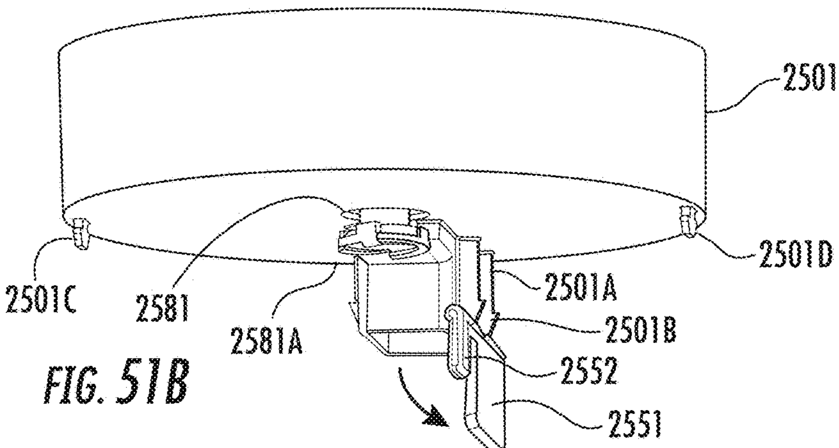
Figure 51C:
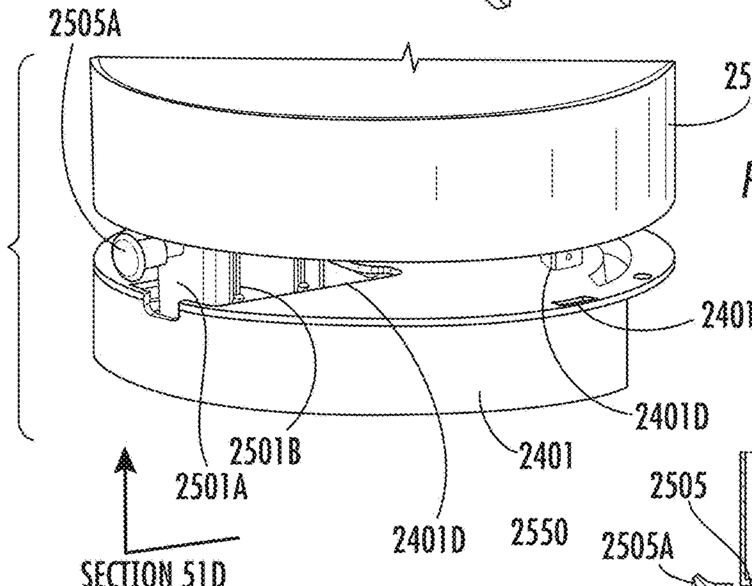
Figure 51D:
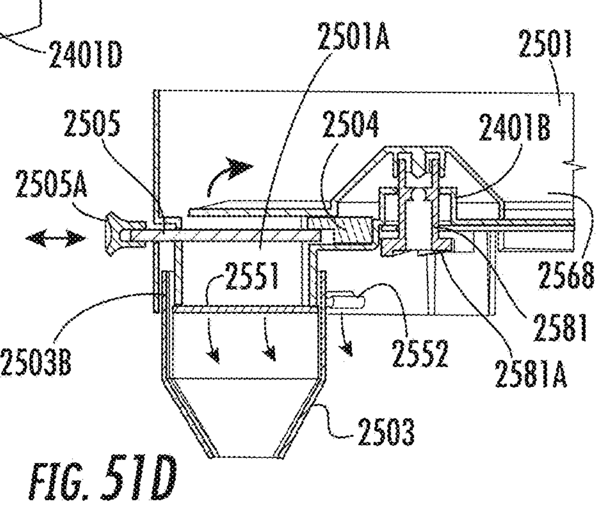

A lower post collar 2760 in movement guide system 2700 is at a bottom of post end cap 2752 and receives in a driving engagement a handle assembly 2851 with a handle end 2851A (see FIG. 45). Using handle assembly 2850 in a rotation (one-quarter rotation, then back, then forward (limited to one-quarter rotation) to drive movement guide system and cartridge filling system.

Proximate a top of post end cap 2752 is a split indexer clutch ring 2890 formed as a C-shape and having an upper stepped surface 2891 with a matching plurality of sloped steps 2891A, 2891B, etc. to correspond to the respective stepped ramps 2562A1, 2562A2, etc. of a bottom plate 2562. There are internal springs within split indexer clutch ring 2890 (not shown) that allow ring 2890 during rotational motion while fixed to post end cap 2751 to axially step up/down (See FIGS. 49A, 49B) to engage and slip-engage respective ones of stepped ramps 2562A1, A2, etc. and to drive bottom pate 2562 in a one-way rotation about central axis A upon motion of displaceable handle assembly 2850.

Figure 42:
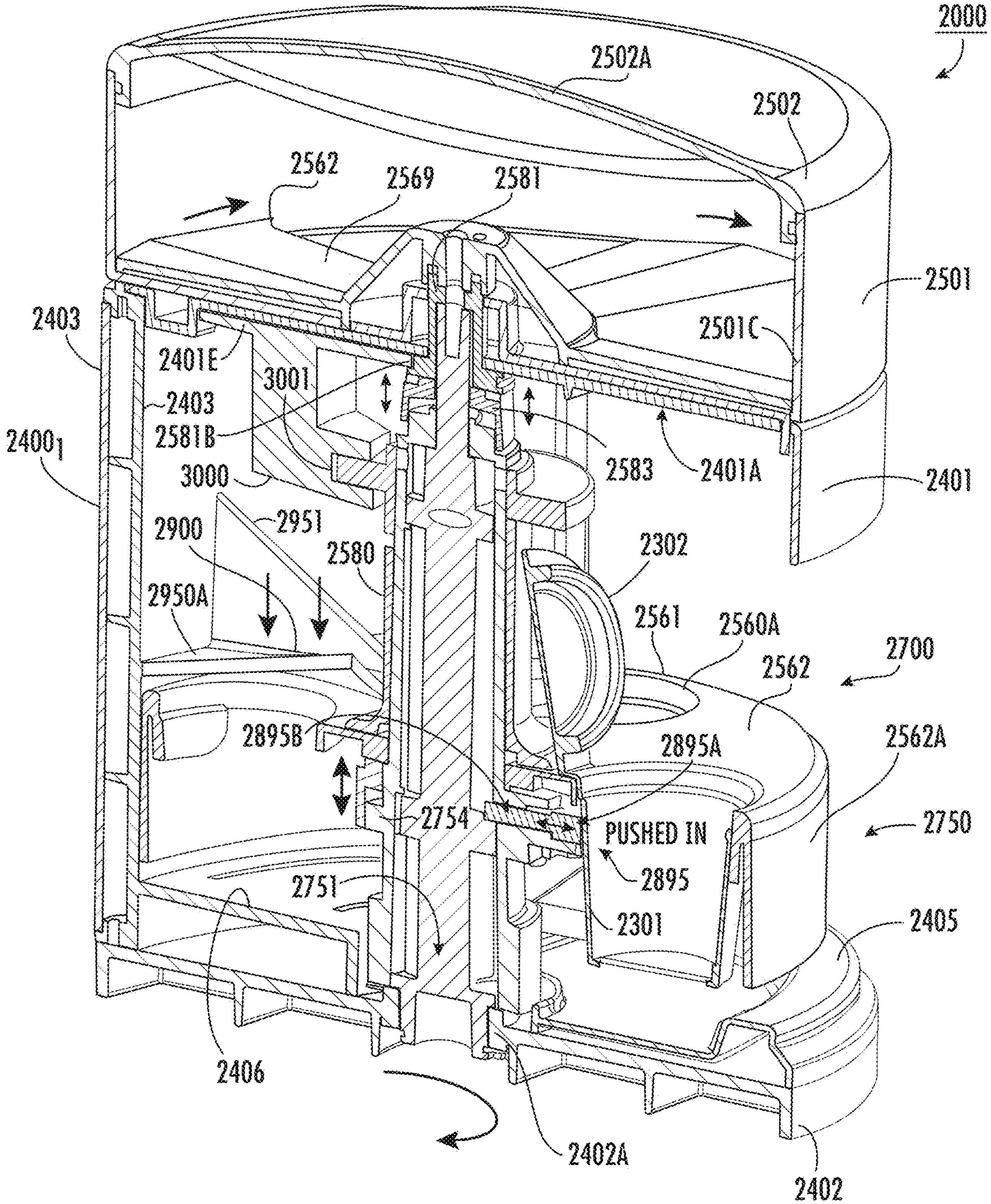
Figure 43:
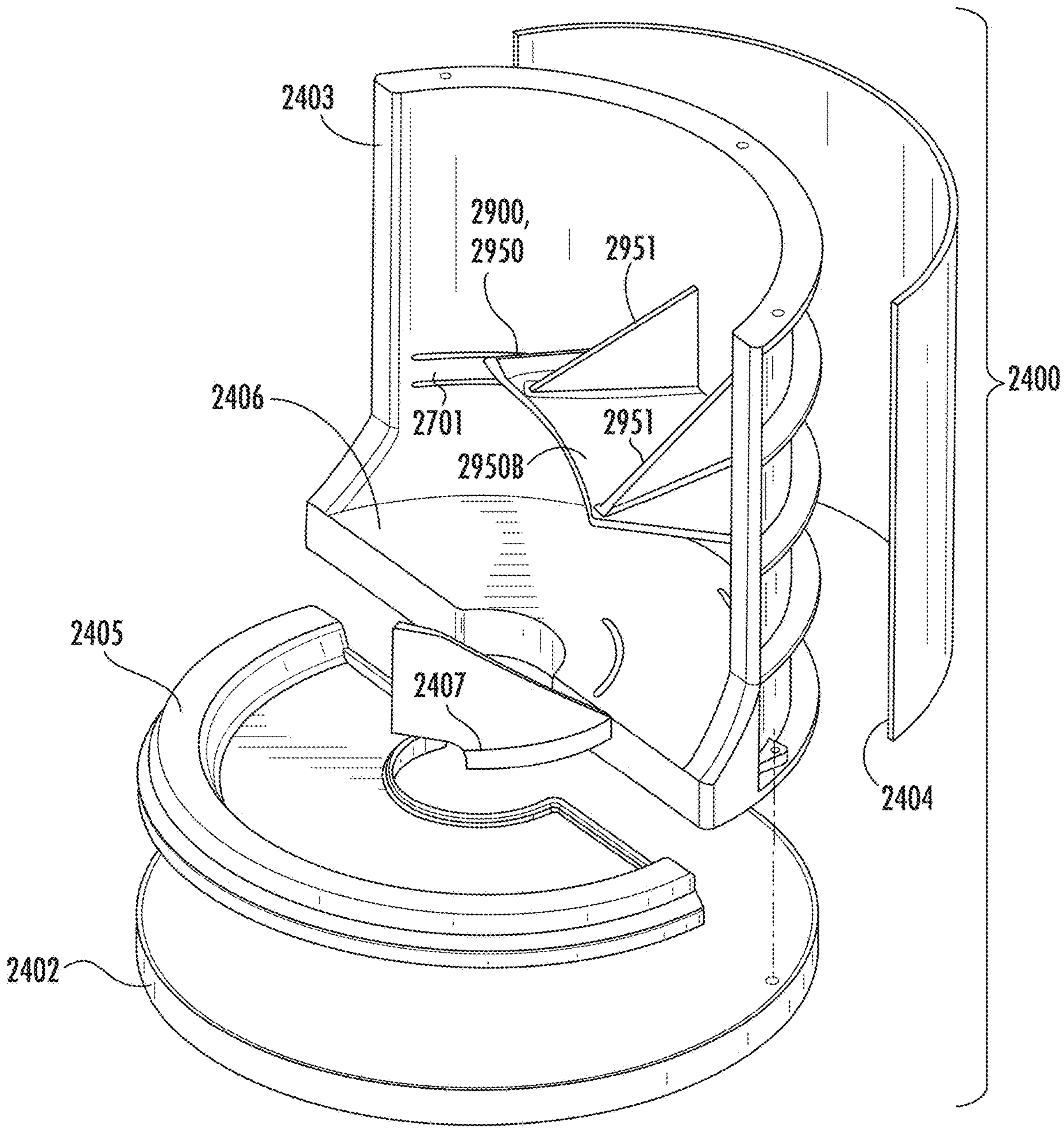
FIG. 43 is a partial exploded perspective view of portions of a frame assembly as noted in FIG. 40.
Figure 44:
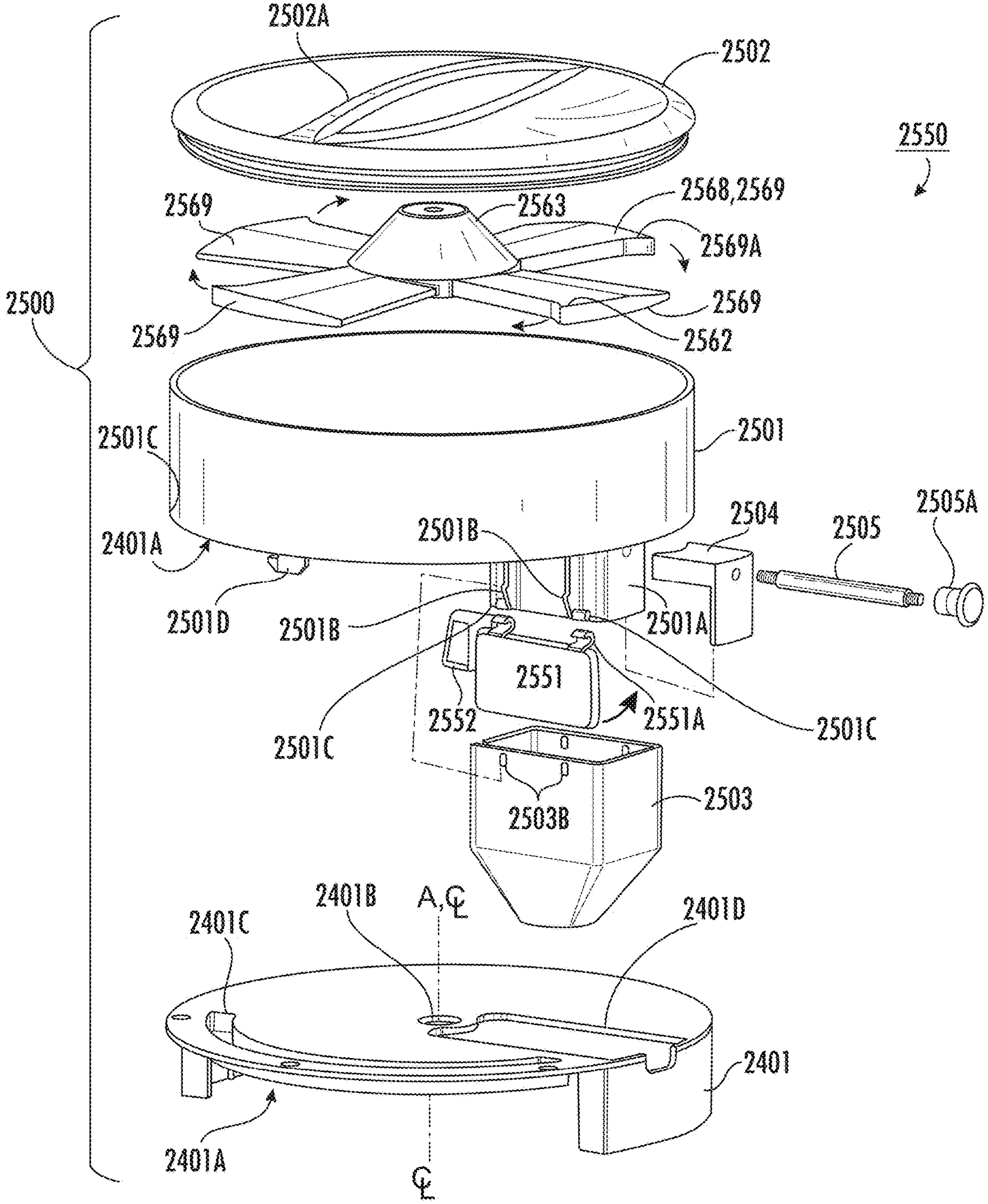
FIG. 44 is a partial exploded perspective view of portions of a cartridge filling and dispensing assembly.

A above lower post collar 2760 and below split clutch ring 2890 is at mid portion collar 2754 securing indexer lower pin assembly 2895 including a pin 2895A that indexes inwardly and outwardly with an outward-urging spring 2895B (see FIG. 42). When pin 2895A is pressed inwardly, but a cup base 2301 being within opening 2560A of portion carrier 2560, pin engages one of four respective engagement grooves 2751A, B, C, D on central pivot post 2751 (see FIG. 45), and in this manner, link central pivot post 2751 to post end cap 2752 and drive via handle assembly 2850 respective sloped ramps 2562A1, A2 etc. to rotate carrier portion 2560 about central axis A. It will be understood, that if there is no Beverage cartridge 2300 within a respective opening 2560A, then pin 2895A will not be pressed and will not engage central pivot post 2751 (as free spin); e.g., due to extending finger 2701 engaging with receiving slots 2561 on portion carrier 2560 rotation is in one direction, and will continue to rotate as handle 2851 rotates through approximately 90-degrees, but the portion dispensing system 2550 will not be triggered and no dispensing will occur unless a cup base 2301 is in place pressing pin 2895A.

Above portion carrier 2560 is a support spacer 2580 that is fixed to central pivot post 2751 and is slidably and pivotably supported on portion carrier 2560 (e.g., spacer 2580 rotates driven by post 2751 and slides over carrier 2560 (or operates together when dispensing is driven).

At a top of support post 2751 is a driving collar 2581 with engaging fingers 2581 that finger-engage with portions of rotor 2568 having rotor blades 2569 with clearing lip 2969A.

A bottom portion of driving collar 2581 includes a stepped turret portion 2851A having a plurality of sloped stepped ramps 2581A1, 2581A2, 2581A3, 2581A4 on a lower surface thereof (facing downwardly). An upper stepped driving collar 2583 is attached to the upper portion of central pivot post 2751 and is driven when the handle moves. On an upper surface of upper stepped driving collar 2583 are a plurality of sloped stepped ramps 2583A1, 2581A2, 2581A3, and 2581A4 on an upper surface thereof (facing upwardly). Upper stepped driving collar 2583 is springably-linked (moves up and down along the rotation axis) to pivot post 2751. During rotation forward, respective upward facing ramps 2583A1-A4 engage and drive-rotationally downwardly facing ramps 2581A1-A4 and drive rotor 2568 in a forward direction (only, not reverse). As handle assembly 2850 rotates to return location, the stepped ramps side and spring apart to disengage and then spring upwardly to engage for forward driving.

On a top surface of the downward facing steps 2581A are a series of indents 2581B that engage with the free end of spring arm trigger 2401E so as to engage with force resistance both a top side and a bottom side of downward facing steps 2581A1-2581A4.

Figures 52, 52A, 52B, 52C, 52D:
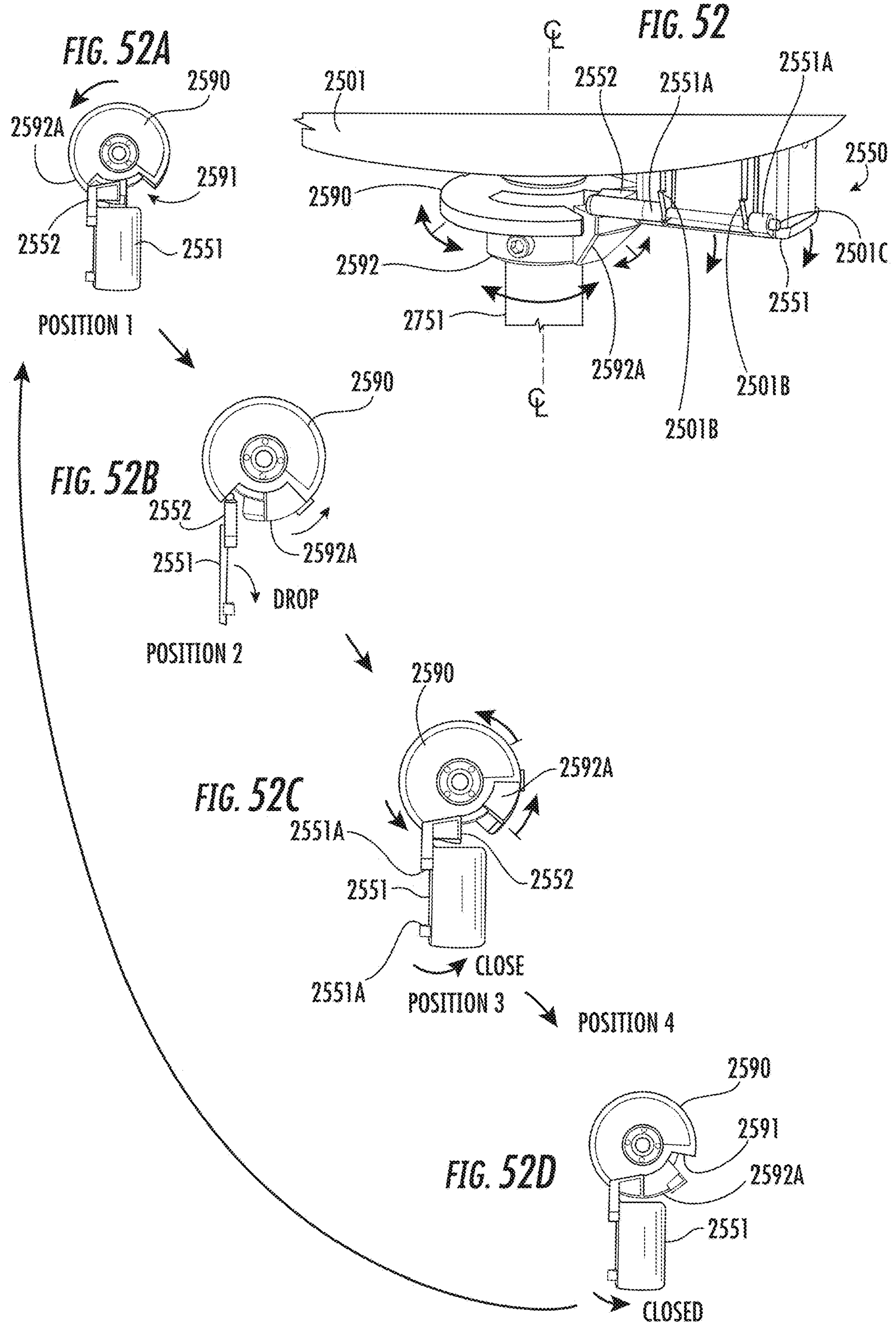
FIGS. 52, 52A to 52D are illustrative partial views of the movement and rotational guide for dispensing, as discussed herein.
Figure 53:
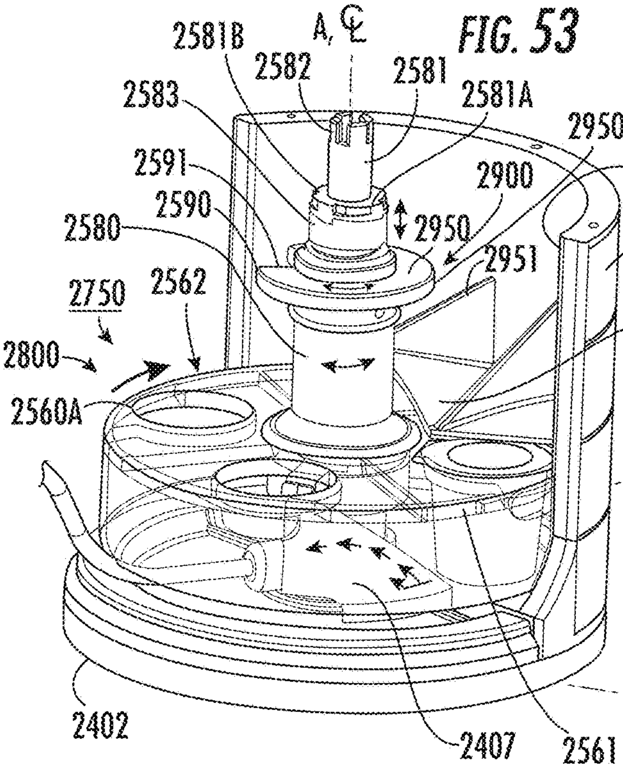
FIG. 53 is a partial perspective view of a cartridge ejection process following a lid pressing process.
Figure 53A:
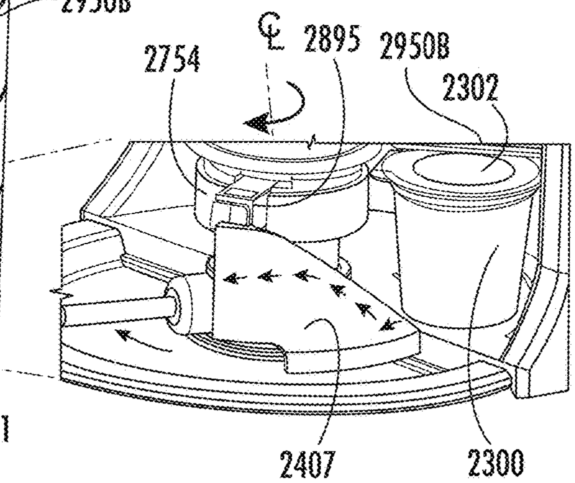
FIG. 53A is a partial expanded view of FIG. 53 to illustrate the cartridge displacement ramp fixed to the frame assembly for cartridge ejectment.

Above spacer 2580 is a bigger support cam 2590 that is split (has a gap 2591 in its circumference). Support cam 2590 is on pivot post 2751 and rotates about the same. A driver cam 2592 includes an extending cam member 2592A and is rotationally fixed to pivot post 2751 and rotates 90-degrees on each use. As shown (FIG. 52) extending cam member 2592A has a surface and a profile that is the same as that of bigger support cam 2590 and rotates back-and-forth within gap 2591. The upper surface of extending cam member 2592A and bigger support cam 2590 is at the same location as pivot trigger 2552 of dispensing door 2551 and slides relative thereto. Referring additionally now to FIG. 52-FIG. 52D, during initial rotation (without depressing engaging pin 2895A) cam 2590 supports pivot trigger 2552 and door 2551 remains closed. However, when a cup base is in position and engages pin 2895A, drive cam 2592 is engaged and rotates through gap 2591 and engages a side wall of the gap 2591 and rotates support cam 2590 out of a neutral support position (Position 1, FIG. 52A) pivot trigger 2552, and then continue rotating thus releasing pivot trigger 2552 to dispense (Position 2, FIG. 52B). Upon the return rotation, driver cam 2592 rotates and cam member 2592A traverses gap 2591 to engage the other side wall of gap 2591 (Position 3, FIG. 52C) and rotate support cam 2590 back into the neutral support position (see Position 1, Position 4 FIG. 52D) thus driving closed pivot trigger 2552 and closing dispensing door 2551 for receipt of the next portion to be dispensed.

Recognizing that bigger support cam 2590 projects axially away from the center axis A, a cam supporting system 3000 that includes a sliding support groove 3001 that is in a sliding and receiving contact with the upper and lower surfaces of bigger support cam 2590 as it moves back-and-forth in rotation. As a result, there is no unintended displacement and door 2551 remains closed between triggering actions.

Further referring now additionally to FIGS. 55-58 a further modification of a manual system for preparing beverage cartridges 2000A provides a further related frame assembly 2400A as related to the earlier discussed systems and assemblies.

In system 2000A, a further modification of the movement support guide 2700A of a related cartridge handling system 2600A for a cartridge filling system 2500A is provided now with a sealing system 2900A having a brace member 2960 rigidly projecting from the back wall frame (shown) and guiding a roller member 2961 pivotable about a roller pivot 2962, to roll flush with the top of a rotating portion carrier assembly 2560A' about rotation axis A during a use so as to press lids 2302 flush to a respective opening 2560A" and so fully press and urge closed and sealed respective beverage cartridges prior to ejection.

Figure 54:
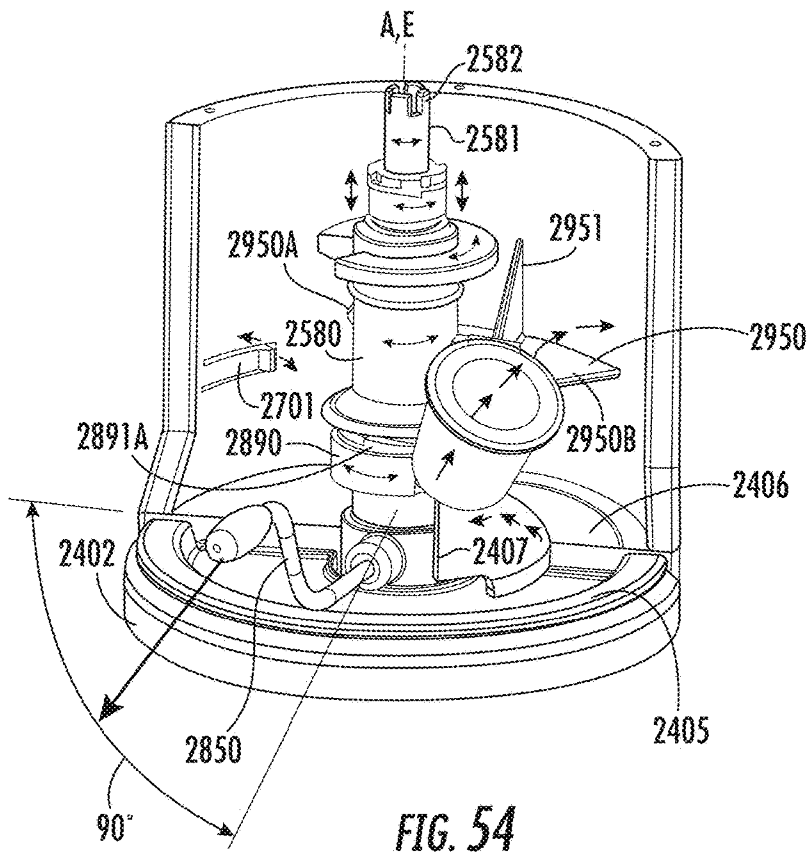
FIG. 54 is a partial exploded perspective view of FIG. 53 (without the cartridge handling table shown), to illustrate the upward and outward ejection motion provided by the ramp.
Figure 55:
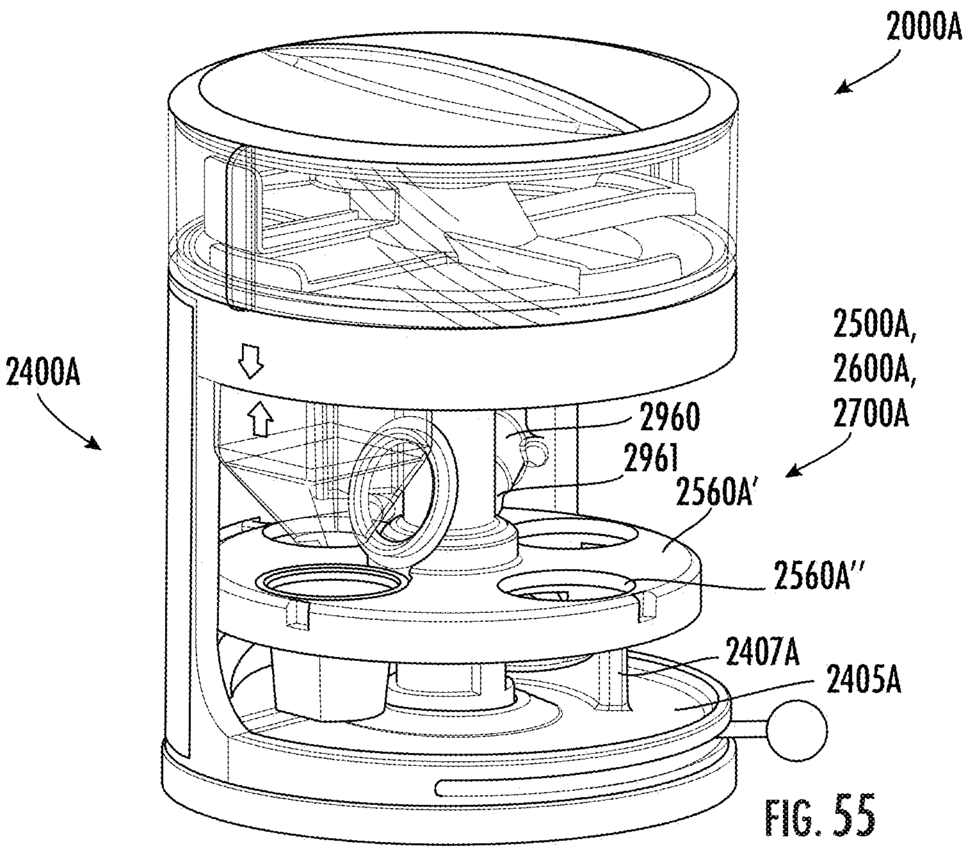
FIG. 55 is a perspective view of a further alternative manual system for preparing beverage cartridges as a cartridge filling and dispensing assembly, with an open beverage cartridge in place (lid open) ready for dispensment and filling and a roller sealing assembly arrangement.
Figure 56:
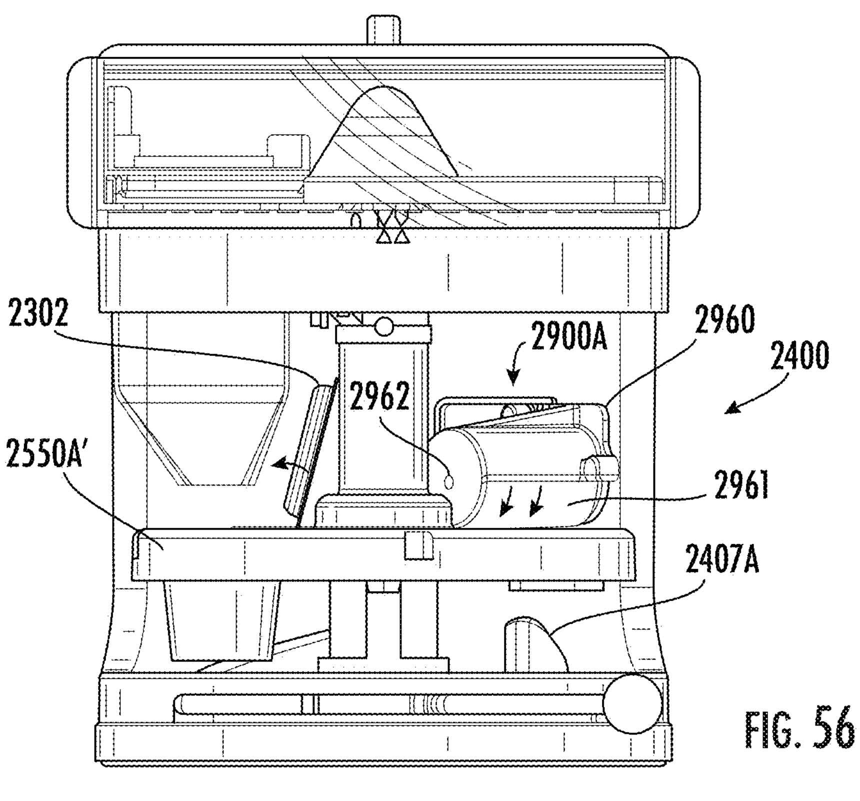
FIG. 56 is a front view of FIG. 55 disclosing the roller in an alternative sealing assembly.
Figure 57:
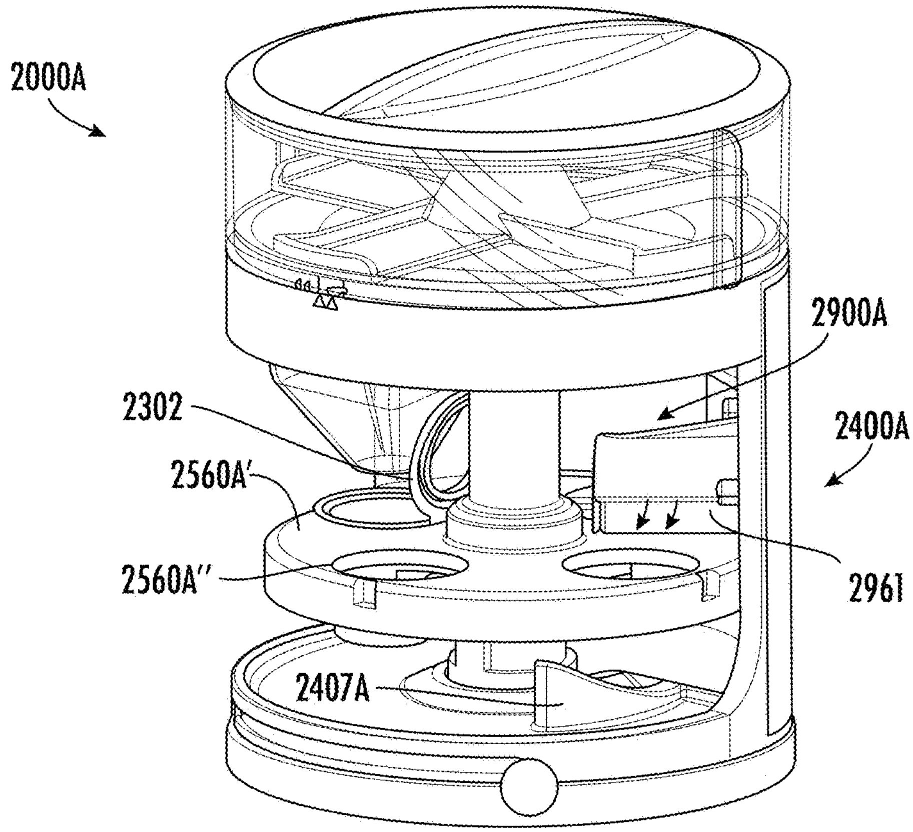
FIG. 57 in a further perspective view of FIG. 55.

As additionally noted, there is a base shield 2405A having an ejection slide guide ramp 2407A operating as related ejection slide guide frame 2407 in FIG. 54 to guidingly urge an ejection of a filled beverage cartridge.

Figure 58:
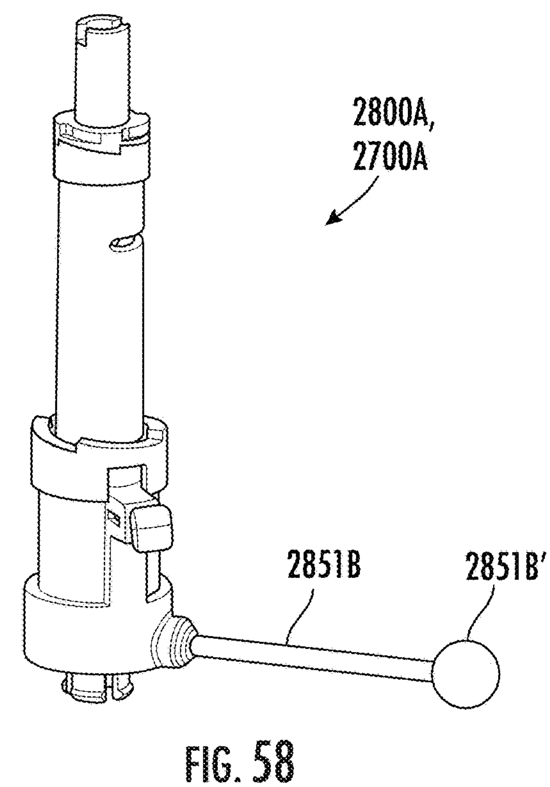
FIG. 58 is a modified motion system of a pivotable and displaceable handle assembly for a movement guide system (related to FIG. 23) operating a motion system and triggering a sealing press assembly of a sealing system.
Figure 59:
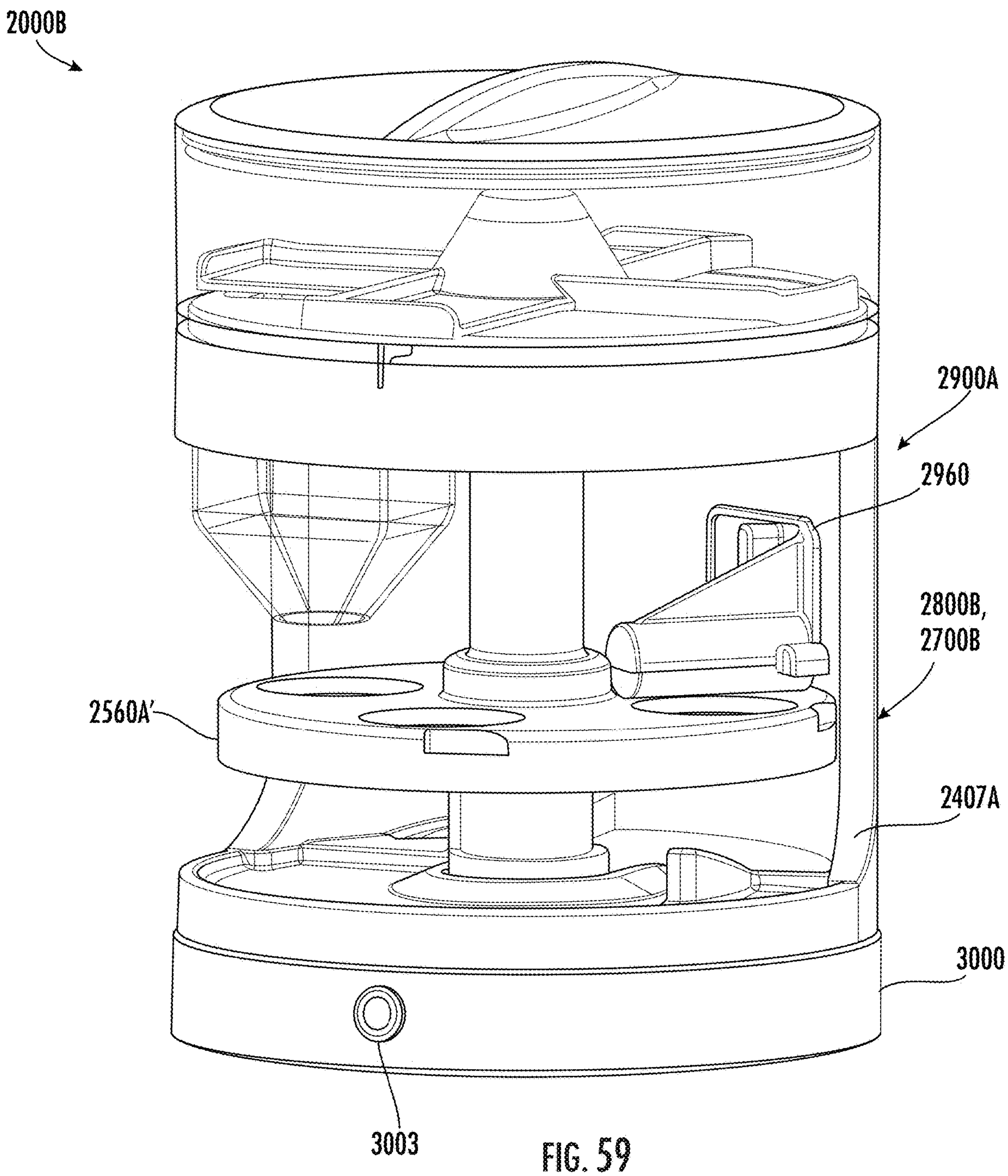
FIG. 59 is a perspective view of a further alternative embodiment for a motorized system for preparing beverage cartridges with an alternative motorized cartridge filing and dispensing assembly adapted to using the roller closing sealing arrangement of FIG. 55 but any other prior closing or sealing assembly or arrangement.
Figure 60:
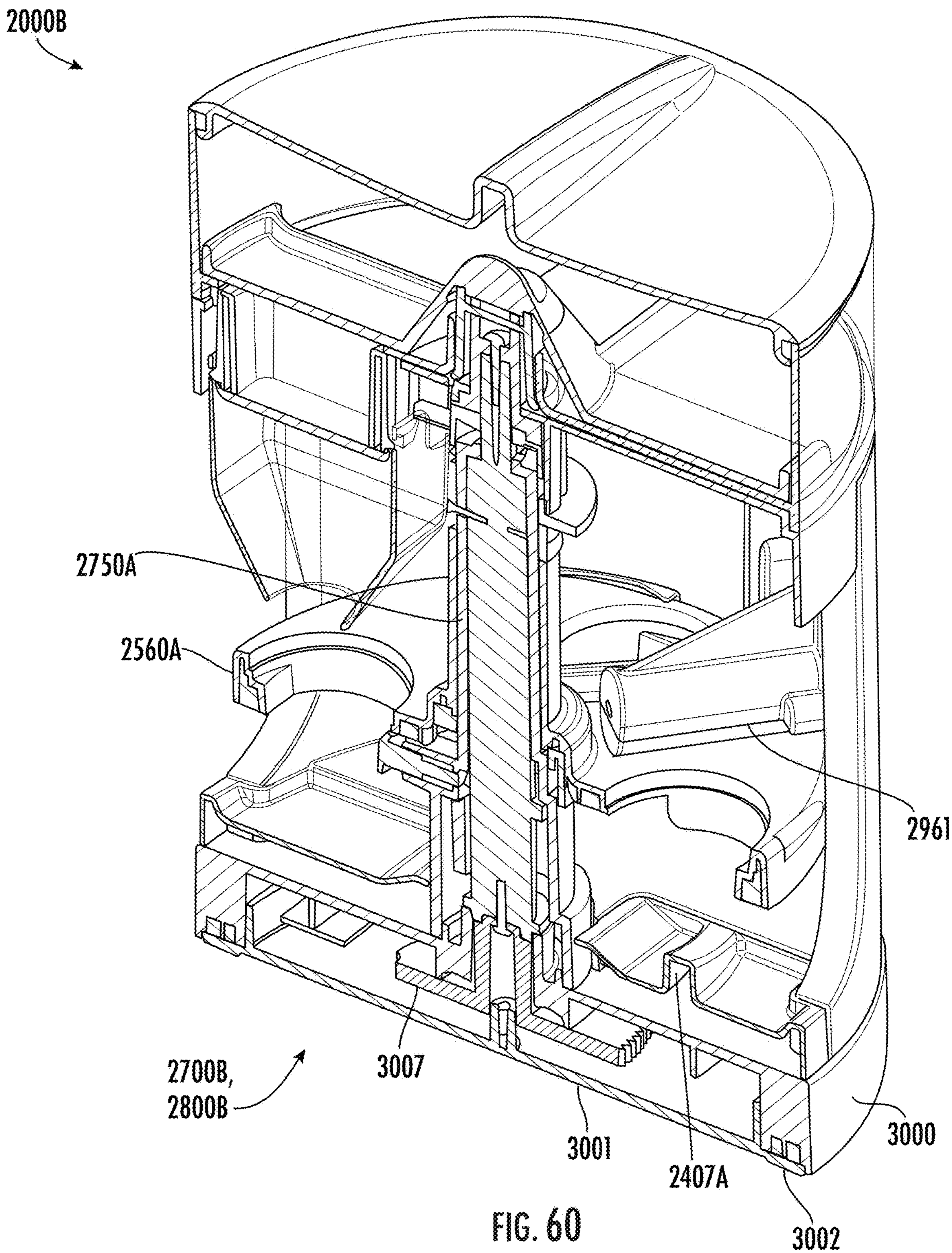
FIG. 60 is a partial top perspective sectional view, of FIG. 59.
Figure 61:
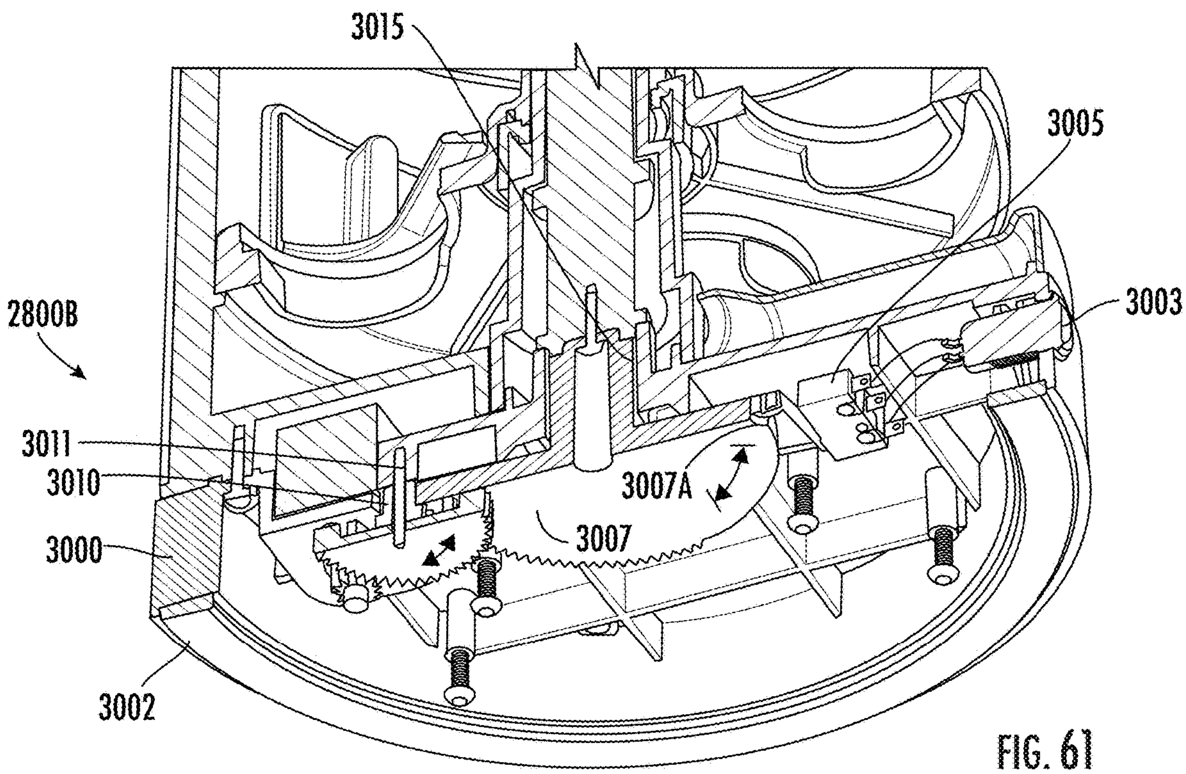
FIG. 61 is a partial bottom sectional perspective view of FIG. 60.
Figure 62:
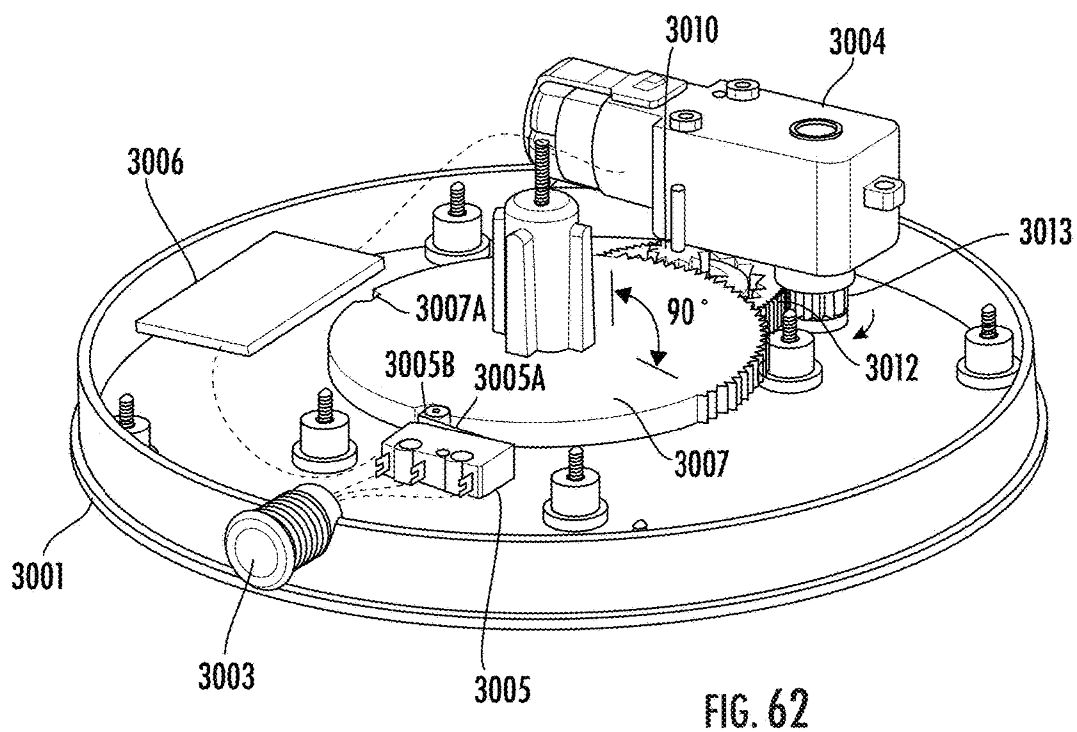
FIG. 62 is a partial perspective view of FIG. 59 noting a motorized and gearing arrangement.

As noted in FIGS. 55-58, and particularly in FIG. 58, components of a movement guide system 2700A and a motion system 2800A for moving movement guide system 2700A including a repositioned handle 2851B with a handle end 2851B1, which operate movement guide system 2700A and motion system 2800A in a similar manner to movement guide system 2700 and motion system 2800 noted previously, in a similar indexed, back-and-forth matter to advance and fill and seal and eject beverage cartridges. Those of skill in this art, having studied the present disclosure will appreciate the related operative elements modified within the alternative embodiment shown in FIG. 55-58.

Referring additionally to FIGS. 59-62 a motorized and motor driven system for preparing beverage cartridges 2000B is provided which maintains many of the components, assemblies, and systems of the embodiment noted in FIGS. 55-58, as well as other elements of the related embodiments noted herein, now operatively motivated by a driving motor, as will be discussed.

As illustrated a related driving movement guide system 2700B and a motion system 2800B for moving movement guide system 2700B is operatively driven (instead of a manual motion system as noted) a motorized assembly as shown.

Driving movement guide system 2700B, is positioned with a base 3000 having a base cap 3001 and a supporting slip resistant footing 3002. A switch 3003 operative to drive a powered preliminary motor 3004 secured within an opening in base 3000 and receiving a power supply (not shown) from an external source or internal battery (both not shown) to operate as noted. A micro switch 3005 is in electrical communication with switch 3005, motor 3004, and a base printed circuit board (PCB) 3006 for basic operating driving as will be discussed. As shown, micro switch 3005 includes a projecting arm 3005A and a detent bearing 3005B, as will be discussed, shaped to be slidingly received in respective recesses 3007A in a center post partial gear 3007.

Reverse motor 3004 is linked to a driving gear pinion 3013 that engages an outer profile of a second clutch gear 3012.

The center post partial gear 3007 includes an outer profile that contains two respective recess 3007A for receiving detent bearings 3005B and triggering projecting arm 3005A to reverse motor 3004 for indexed operation between respective stages as will be understood. A clutch gear 3010 operates about a clutch gear axel 3011 and within second clutch gear 3012 while engaging the partial outer portion of partial gear 3007, as shown. As a result, partial gear 3007 is transitory in an indexed fashion (back and forth) through an arc controlled by microswitch 3005 triggered by arm 3005A when detent bearing 3005B slips within recesses 3007A. As noted, engaging splines 3015 drivingly engage the rotational support assembly 2750A of the motorized embodiment shown.

Figure 63:
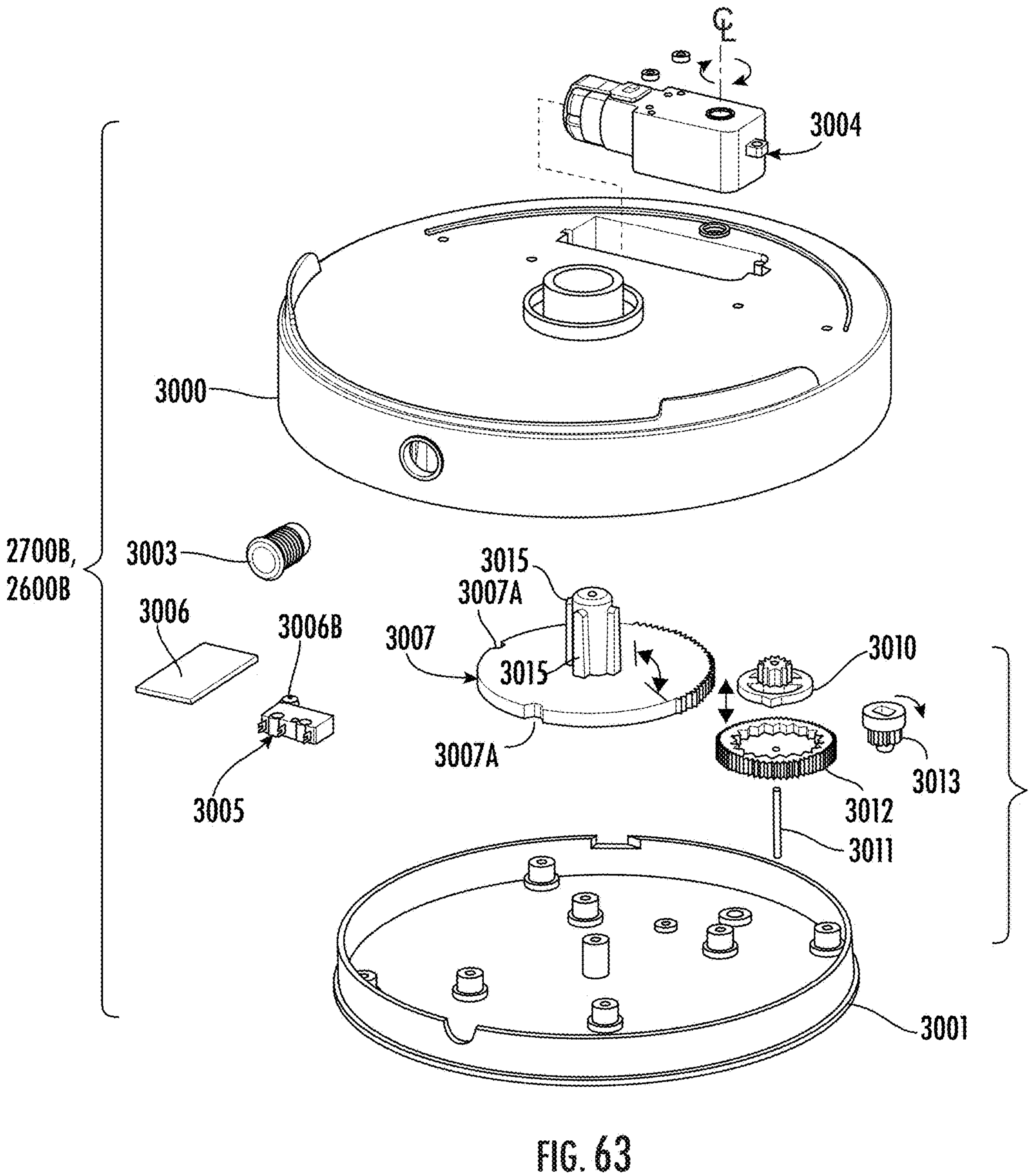
FIG. 63 is a partial perspective bottom exploded view of FIG. 59 noting component arrangements.

In a motive operation, when switch 3005 is triggered, the motor 3004 starts to drive and rotates the center post key until the internal micro switch 3005 and detent bearing 3005B reaches the recess 3007A at 90-degrees of rotation and disengages stopping the motor (for a four (4) position arrangement, different numerical positions are adapted relatively). When the micro switch 3005 disengages, it tells the PCB 3006 to reverse motor 3004 and the center post gear 3007 reverses rotating backwards until the micro switch 3005 again the starting notch 3007A and disengages again and stops back in the initial start condition. The clutch gearing 3010, 3012 minimizes damage to the mechanism in the event of a jam or failure to rotate. As noted in FIG. 63, arms of the sides of the first clutch gearing 3010 are thin relative to the projections and can flex, where the projections fit within the inner recesses of second clutch gear 3012. As a result, with this flex, a driving force that urges against a jam, allows the motor to run, flexing the arms, allowing the projections to skip forward within second clutch gear 3012 preventing damage to reverse motor 3004.

It will be recognized be recognized of skill in this art, having studied the disclosure that the embodiments noted in FIG. 55-58 or 59-62 may be accomplished by other structures and steps without departing from the scope and spirit of the present invention. For example, different manual indexing structures may be used. Similarly, alternative motor-driving arrangements and step-clutch arrangements may be employed while accomplishing similar results with related structures.

Figure 11:
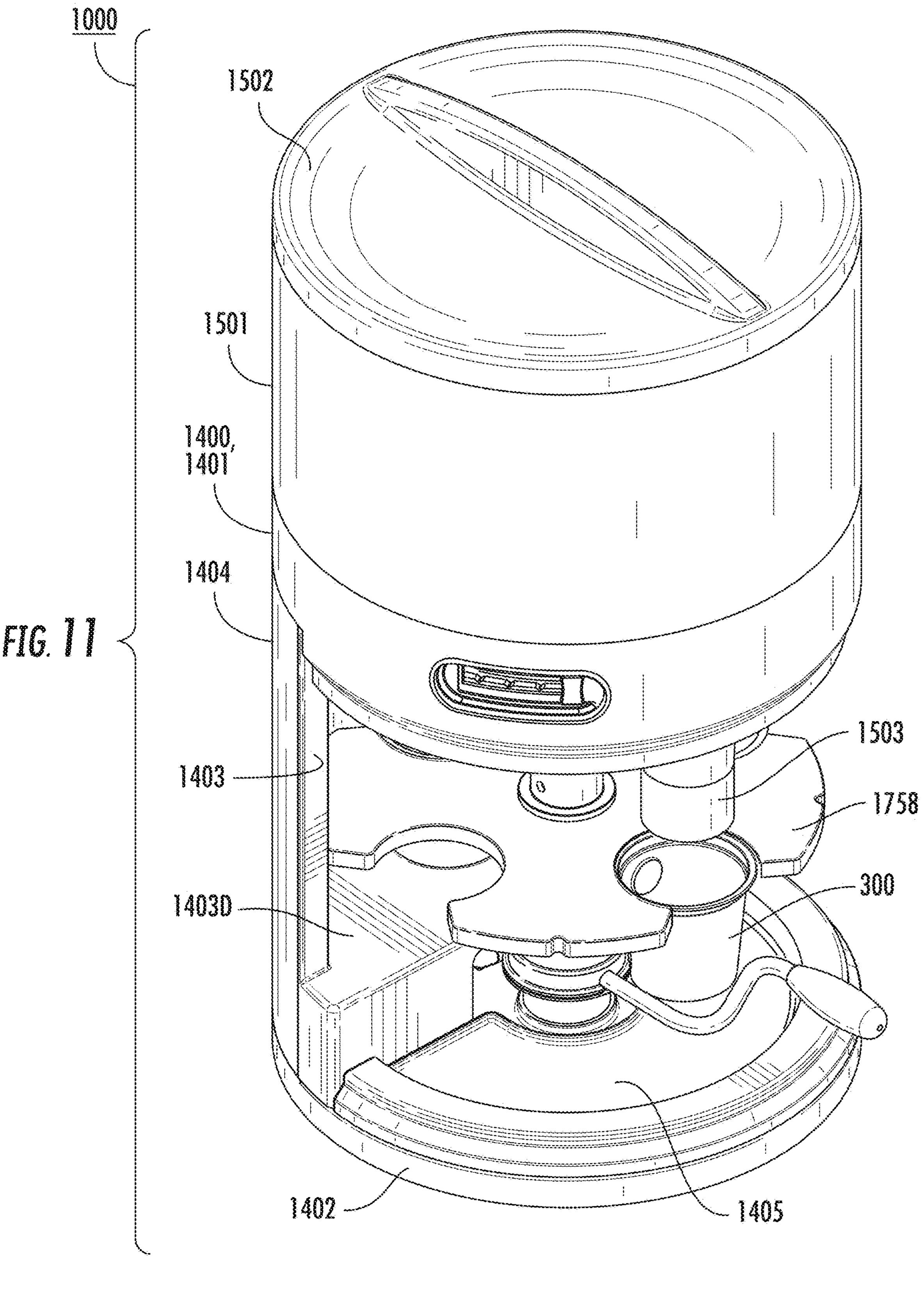
FIGS. 11 and 12 illustrate a perspective and a front view of an alternative embodiment of the present invention. It will be understood that FIGS. 11-39 illustrate a perspective view of another adaptive and alternative embodiment of the present invention containing similar operations, assemblies, and components that may be adapted and modified to operate with any of the other embodiments noted herein without departing from the scope and spirit of the present invention.

It will also be recognized that the embodiment in FIGS. 40-54 that the steps of beverage cartridge 2300 insert, fill, close, and eject may be rotationally positioned in this order, but in any location relative to an open-user front face. For example, in FIG. 40, dispensement occurs close to one side support of support bridge 2403, but may, via basic re-design be formed to be in a front-side of the support bridge (e.g., 90-degrees counter-clockwise as shown in FIG. 11), without departing from the scope and spirit of the present invention.

It will be additionally understood by those of skill in the art that the relative motions and engagements as discussed herein are non-limiting and may be adapted within the scope and spirit of the present invention. As a non-limiting example, the motion of the lever (left-right, or in-out, or up-down) may be performed in a single-step manner (e.g., left, right, up, down, in, out etc.) or in a relatively combined angular manner (e.g., left-right-left, up-down, right-left-right, or inward-outward, left-right, etc.) or may be performed in a different flow (e.g., left, right, down, left, up, right etc.) depending upon a user's desire and the relative sequenced position of the system, or if the elements and functions herein are arranged differently but within the scope of one of skill in the art. As a result, it will be understood that the present invention includes all such adaptive modifications within the scope and spirit of the present disclosure without need for a specific diagram or drawing.

It will also be understood by those of skill in the art that the proposed system further enables a kit containing the system and system components and a method for operating the beverage cartridge preparation device so as to result in a sealed beverage cartridge ready for storage, transport, or other use in a convenient manner.

It will be understood by those of skill in the art having studied this disclosure that the phrases beverage fillers, brewing components, contents, coffee, tea, flavored fillers, brewing materials, etc. will be recognized as the portions retained within the bounding cartridge, and without limitation thereon and such descriptions may be used interchangeably without departing from the scope and spirit of the present invention. For example, a user may wish to blend coffee and hot chocolate components in a single user-determined component to suit a particular preference. Alternatively, while the use of a thermal brewing cycle is preferred, noting herein is so limiting, and it will be understood that cold brewing cycles are also enabled by this device. For example, a cold-tea and a cold-lemonade cartridge may be prepared as well without departing from the scope and spirit of the present invention.

It will be further understood by those of skill in the art that the proposed system may be further expanded to contain a feeding or supply apparatus for continuously supplying a stack of empty beverage cartridge for filling to a location proximate to the mobile support for speedy filling of the same.

It will be further understood in the art that as used herein beverage simply means for use in preparing a fluid of any kind, such that a beverage container is used in preparing a fluid (e.g., a beverage (not a solid)), despite the contents of the cartridge being a solid (coffee grounds, tea leaves, flavor crystals, etc.), without limitation.

It will be understood herein that beverage cartridge may be cartridge assemblies or cups all as shown in the drawings and within the scope and spirit of the present invention Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A system, for preparing a beverage cartridge, comprising:

a frame assembly providing a support base portion spaced from a top support portion;

a cartridge handling system on said support base portion for positioning said beverage cartridge in at least one of a filling position and a sealing position relative to said support base portion;

a cartridge filling system positioned proximate said cartridge handling system and containing at least one fillable container for retaining for dispensment during a filling use a brewing component into said beverage cartridge;

said at least one fillable container on said top support portion;

said cartridge filling system, further comprising:

a portion dispensing system that dispenses a selectable portion of said brewing component from said at least one fillable container to said beverage cartridge in said filling position;

said cartridge handling system, further comprising:

a movement guide system that guides a rotational support assembly shaped to removably retain at least one said beverage cartridge relative to said fillable container and said filling position for a filling with said selectable volume of said brewing component during said use;

a sealing system containing a sealing press assembly operative to seal a filled said beverage cartridge positioned by said rotational support assembly in said sealing position;

a motion system containing at least one of a pivoting and a displaceable handle assembly, and a motorized assembly, each respectively operative to drive said movement guide system and said portion dispensing system to dispense said selectable portion filling said beverage cartridge and to actuate said sealing system to seal said filled beverage cartridge during said use.

2. The system, according to claim 1, wherein:

said sealing system includes in said sealing press assembly a first sloped portion having a greater slope angle and a second sloped portion having a lesser slope angle;

said sealing press assembly having a guiding contact on a lid of said beverage cartridge along said first sloped portion and guiding said cup lid into a base of said beverage cartridge; and said sealing press assembly second sloped portion providing a sealing pressure during a rotation of said rotation support assembly to seal said beverage cartridge.

3. The system, according to claim 1, further comprising:

an ejection slide guide ramp member extending from a base support portion;

said ejection slide guide ramp member in a guiding contact with said beverage cartridge; and wherein as said beverage cartridge rotates along said rotation support assembly beyond said sealing position said slide guide ramp member upwardly urging and outwardly directing said beverage cartridge away from said rotation support assembly.

4. The system, according to claim 1, wherein:

said sealing system includes in said sealing press assembly a rolling assembly having a guiding contact on a lid of said beverage cartridge and urgingly guiding said cup lid into a base of said beverage cartridge to seal said cup lid to said base.

* * * * *